United States Patent [19]

Maitani et al.

[11] Patent Number: 4,589,754
[45] Date of Patent: May 20, 1986

[54] CAMERA

[75] Inventors: Yoshihisa Maitani; Katsuhiko Tsunefuji; Masafumi Yamasaki, all of Hachioji, Japan

[73] Assignee: Olympus Optical Co., Ltd., Tokyo, Japan

[21] Appl. No.: 485,432

[22] Filed: Apr. 15, 1983

[30] Foreign Application Priority Data

Apr. 21, 1982 [JP] Japan ................................. 57-65385

[51] Int. Cl.⁴ ............................................. G03B 17/20
[52] U.S. Cl. .................................... 354/431; 354/472; 354/474
[58] Field of Search ............... 354/429, 433, 434, 465, 354/471–475, 481, 431, 432, 289.1, 289.12, 412, 410; 356/215, 218, 221, 222, 223, 226, 227

[56] References Cited

U.S. PATENT DOCUMENTS

| | | | |
|---|---|---|---|
| 4,176,955 | 12/1979 | Yamada et al. | 356/226 X |
| 4,309,090 | 1/1982 | Yamada | 354/474 X |
| 4,401,386 | 8/1983 | Yuasa | 356/226 |
| 4,453,811 | 6/1984 | Yamasaki | 354/425 X |

FOREIGN PATENT DOCUMENTS 0127542 10/1980 Japan ................................. 354/289

Primary Examiner—William B. Perkey
Attorney, Agent, or Firm—Louis Weinstein

[57] ABSTRACT

A multi-mode camera is provided which permits a selection from among a plurality of photographing modes including an automatic mode, a manual mode, an average photometry mode and a spotwise photometry mode. The camera includes a photographing information display which is located within a finder and which is formed by a liquid crystal display panel. The display includes a plurality of display regions, which enable necessary and sufficient photographing information to be displayed within the finder during a particular photographing mode selected, by providing a bar representation in which display regions from one end of the display and extending to a point corresponding to photographing information are activated and providing a point display in which a selected display region is activated which corresponds to photographing information.

2 Claims, 96 Drawing Figures

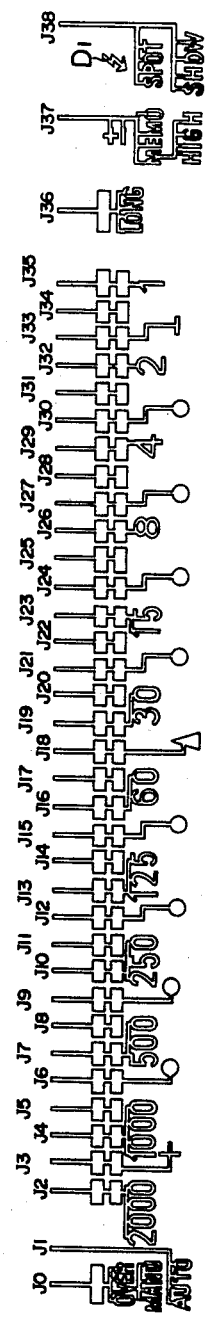
F I G. 19A
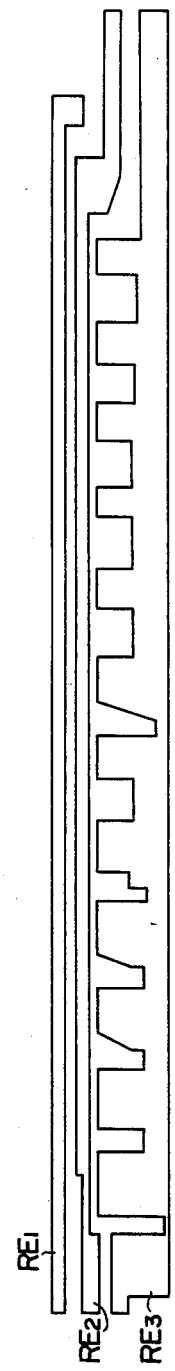
F I G. 19B

FIG. 57

OVER  2000 1000 500 250 125 60  30  15  8  4  2  1  LONG  MEMO
AUTO

FIG. 58

OVER  2000 1000 500 250 125 60  30  15  8  4  2  1  LONG  MEMO
AUTO

FIG. 59

OVER  2000 1000 500 250 125 60  30  15  8  4  2  1  LONG  ±  MEMO
AUTO

FIG. 60

OVER  2000 1000 500 250 125 60  30  15  8  4  2  1  LONG  MEMO  SPOT
AUTO

FIG. 61

MANU  +  •  •  •  •  60  ▲  •  •  •  •  −

FIG. 62

MANU  +  •  •  •  •  60  ▲  •  •  •  •  −  ±

CAMERA

BACKGROUND OF THE INVENTION

The invention relates to a photographic camera, and more particularly, to a camera which permits a selection among a plurality of photographing modes including an automatic exposure mode, a manual exposure mode, an average photometry mode, a localized or spotwise photometry mode and the like.

As is well recognized, the photometry used in the conventional cameras can be categorized into an average photometry and a localized (or spotwise) photometry. The average photometry can be classified into a photometry averaged over the entire image field and another which is centrally emphasized, the latter being generally employed. Such average photometry produces a passable result for the typical object and over the localized photometry in respect of the ease of use, and accordingly, this average photometry is employed in most cameras.

The localized or spotwise photometry can be effectively used for an object having a high ratio of highlight and shadow when it is desired to control the exposure in accordance with the brightness of either the highlight or the shadow. However, it requires a troublesome operation and is likely to cause a photographing operation with an improper exposure. In the past, there has been a camera offered on the market which allows the photometry of only the central region of an image field, but this makes the photographic composition difficult. Accordingly, at the present time, cameras seldom adopt such a technique.

For the reasons mentioned above, the average photometry technique an excellent technique as compared with the localized or spotwise photometry when taking a picture of an ordinary object being photographed. However, in practice, objects being photographed are not limited to those having a reduced ratio of highlight and shadow, but include a number of objects having a greater ratio of highlight and shadow such as objects in the rear light, objects on a stage and objects in a composition which is formed when viewing the outdoors through a window. In particular, it is to be noted that the chance to take a picture of an object having a higher ratio of highlight and shadow increases as a photographer makes progress in his photographing skill. If an automatic exposure camera which operates on the basis of the average photometry is used to take a picture of an object having a high ratio of highlight and shadow, the exposure is controlled in accordance with the average brightness of the object, and hence prevents the intended composition of a photographer from being achieved when it is desired to control the exposure in accordance with the brightness level of a selected region of such object.

In the prior art practice, when taking a picture of such a special object, a so-called spot meter which utilizes a very limited angle for photometry is used to determine the brightness of an object being photographed at a plurality of locations. Based on the information representing the brightness of the object thus obtained and the intended composition to impart a proper exposure to a selected region and to determine the brightness level of the shadow, exposure factors such as a diaphragm aperture and an exposure period are determined, followed by taking a picture by manual operation of the camera. Where an object is accessible as when taking a picture in a studio, an incident-light exposure meter is used to determine the brightness of an object being photographed at a plurality of desired locations in order to determine exposure factors in the similar manner as mentioned above, thus allowing a picture to be taken by manual operation. However, the use of an exposure meter which is separate from the camera to perform the localized or spotwise photometry in order to determine the exposure factors requires a troublesome procedure, an increased length of time and a complex calculation, all of which represent disadvantages.

A so-called multi-mode camera is available in the prior art. This represents a camera which allows a selection among a plurality of photographing modes including an automatic and a manual exposure mode. However, such camera does not afford a display of adequate and full photographing information within a finder since such information varies from mode to mode.

SUMMARY OF THE INVENTION

It is an object of the invention to provide a camera of the multi-mode type having a finder within a photographing information display comprising a linear succession of a plurality of display regions is defined so that photographing information is indicated in the form of a bar by activating the display from a display region located at one end thereof to a particular display region which corresponds to the particular photographing information to be indicated and in, whenever a photographing mode is changed, the display is once entirely deactivated, followed by the activation of the display from a display region located at one end thereof to another display region which corresponds to the photographing information to be used in a new photographing mode, thus providing a positive indication that the photographing mode has been changed.

It is another object of the invention to provide a camera having localized or spotwise photometric means which is used to obtain the values of the brightness of an object being photographed at a plurality of locations and in which such values as well as result of arithmetic operations performed on these values are displayed, with the values of the brightness being directly displayed while the result of arithmetic operations are corrected before display if an exposure correction is made.

It is a further object of the invention to provide a camera having localized or spotwise photometric means which may be used to determine the values of brightness of an object being photographed at a plurality of locations, which values are subject to an arithmetic operation to determine an exposure level, and also having a finder in which a first and a second photographing information display are defined, each comprising a linear succession of a plurality of display regions, the photometric values obtained at individual locations being indicated by separately activating corresponding display regions of the first display and the result of the arithmetic operation being indicated in the form of the bar by activating the second display from a display region located at one end thereof to another display region which corresponds to the result.

It is still another object of the invention to provide a camera having localized or spotwise photometric means which is used to determine photometric values of an object being photographed at a plurality of locations, which values are indicated within a finder on a photographing information display comprising a linear succession of a plurality of display regions, and in a photometric value which has already been determined is fixedly displayed on a corresponding display region of the display while a photometric value which is currently is determined being displayed on a corresponding display region of the display. It is a corollary object of the invention to provide a camera of the type mentioned above in which a photometric value which is being currently determined is displayed on a corresponding display region of the display in a flashing mode. It is an associated object of the invention to provide a camera of the type mentioned above in which a photometric value which is being currently determined is predominantly displayed whenever a display region which is used for the flashing display coincides with the display region in which the previous photometric value is to be fixedly displayed.

It is a stil further object of the invention to provide a camera having localized or spotwise photometric means which is used to obtain values of the brightness of an object being photographed at a plurality of locations in a time sequence and in which an arithmetic operation is performed on these values in order to control an exposure, with these photometric values and/or results of the arithmetic operation being properly stored so that they are displayed in a photographing information display whenever such photometric values and/or results of the arithmetic operation are located within the extent of the display while a display region or display pattern representing an overexposure or an underexposure is activated if they are located outside the extent of the display, and in which whenever a new brightness value is inputted, the arithmetic operation is performed again, thereby assuring that a correct result of arithmetic operation is always available.

It is an additional object of the invention to provide a camera which permits an average photometry mode and a localized or spotwise photometry mode to be selectively used and in which when changing from the average to the spotwise photometry, the spotwise photometry mode can be established by actuating an operating member and can be reset to the average photometry mode whenever the photographing operation with the spotwise photometry is completed.

It is an yet additional object of the invention to provide a camera which permits an average photometry mode and a localized or spotwise photometry mode to be selectively used and in which the photographing mode is automatically changed from the average photometry to the spotwise photometry in response to an operation to input a spotwise photometric value.

It is yet another object of the invention to provide a camera which permits an average photometry mode and a localized or spotwise photometry mode to be selectively used and having localized or spotwise photometric means to obtain spotwise photometric values on which an arithmetic operation is applied to determine an exposure level during the localized or spotwise photometry mode, the camera also including a data erasure member to cancel the spotwise photometric values and the corresponding results of the arithmetic operation, the operation of the erasure member automatically changing the photographing mode from the localized or spotwise photometry to the average photometry mode.

It is an yet further object of the invention to provide a camera having localized or spotwise photometric means which is used to obtain values of the brightness, from which an arithmetic mean or a weighted mean is derived to determine an exposure level during a normal spotwise photographing mode, from which the maximum value is chosen to determine another exposure level which is by a given number of exposure steps above such maximum value during a highlight referenced photographing mode, and from which the minimum value is chosen to determine a further exposure level which is by a given number of exposure steps below the minimum value during a shadow referenced photographing mode, thereby allowing the operation of the camera to be selectively changed between these three modes. It is an attendant object of the invention to provide such a camera in which the highlight- or shadow-referenced photographing mode is disabled whenever at least one or more spotwise photometric values are not inputted.

It is an yet additional object of the invention to provide a camera having localized or spotwise photometric means which is used to obtain values of the brightness, which are then stored and in which the maximum value of the brightness is chosen as a reference to determine an exposure level which exceeds the reference by a given number of exposure steps so that an exposure period is delayed by an amount corresponding to the given number of exposure steps as compared with a shutter period which corresponds to a proper exposure for the maximum value and in which the delayed exposure period is displayed within a finder of the camera. It is an attendant object of the invention to provide such a camera in which whenever a fresh value of the brightness is inputted which exceeds the maximum value of the brightness, the fresh value is chosen as the reference to repeat the arithmetic operation to determine the shutter period.

It is also an object of the invention to provide a camera having localized or spotwise photometric means which is used to obtain values of the brightness which are then stored and in which the minimum value is chosen as a reference to determine an exposure level which is below the reference by a given number of exposure steps so that an exposure period which is actually used may be shortened by an amount corresponding to the given number of exposure steps from an exposure period which represents a proper exposure for the minimum value and in which such shortened exposure period is also displayed within a finder of the camera. It is an attendant object of the invention to provide such a camera in which whenever a fresh value of the brightness is inputted which is below the minimum value, the fresh value is chosen as the minimum value to repeat the arithmetic operation to determine an exposure period.

It is another object of the invention to provide an automatic exposure camera including a storage member, commanding an exposure level to be stored, and in which during an initial photographing operation after a stored exposure level photographing mode has been selected by the actuation of the storage member, an exposure level which is actually used during this photographing operation and which is determined in accordance with exposure factors such as a preset diaphragm aperture, film speed or the like as well as an exposure period which is automatically controlled in accordance with the brightness of an object being photographed is stored, so that unless the stored exposure level photo-.

graphing mode is reset, the given exposure level is maintained during subsequent photographing operations. It is an associated object of the invention to provide such a camera in which the stored value of the exposure level as well as a value of the exposure level which is determined in accordance with the photometric value being currently determined are displayed together within a finder of the camera. It is an attendant object of the invention to provide such a camera in which after the storage of the exposure level, a change in one of exposure factors causes the stored value of the exposure level to be varied in a corresponding manner. It is a corollary object of the invention to provide such a camera in which after the storage of the exposure level, the stored value of the exposure level is varied in response to an exposure correction so that the new exposure level represents a sum of the old exposure level and the amount of correction.

It is a further object of the invention to provide a camera having localized or spotwise photometric means which is used to obtain photometric values of an object being photographed at various locations and in which such photometric values as well as results of an arithmetic operation performed thereon are displayed as deviations from a standard exposure level which is calculated in accordance with a selected exposure period, diaphragm aperture, film speed and the like. It is a corollary object of the invention to provide such a camera in which the exposure level which is determined on the basis of results of the arithmetic operation is brought into coincidence with a fixed index representing a standard exposure level and in which the various locations on an object being photographed, the spotwise photometry of which has been made, are taken with a differential exposure level from the standard level which corresponds to the deviation from the fixed index.

It is an additional object of the invention to provide a camera of automatic exposure control type in which whenever an electronic flash is mounted on the camera, an exposure period is automatically established which is synchronized with the operation of the electronic flash and in which a fixed point index is caused to appear within a finder to indicate brightness information as a deviation from the index.

In accordance with the invention, there is provided a multi-mode camera in which whenever a photographing mode is changed, all the display regions of a photographing information display are once deactivated, followed by the activation of selected display regions, thereby providing a positive indication that the photographing mode has been changed.

Values of the brightness which are obtained by the localized or spotwise photometric means are displayed without any correction while results of an arithmetic operation performed on these values are displayed with correction. In this manner, the result of the arithmetic operation, representing an exposure level to be used, is allowed to shift through a plurality of distributed values of the brightness.

Spotwise photometric values are displayed in terms of points while the result of the arithmetic operation is displayed in the form of a bar graph, thereby facilitating a discrimination therebetween. The bar graph display assists a photographer to get the sense of the result of the arithmetic operation.

Spotwise photometric values which have already been inputted are fixedly displayed while a spotwise photometric value which is being currently determined is also displayed, thereby facilitating a recognition of the both.

In the event the spotwise photometric values and the result of the arithmetic operation lie outside the display regions of the photographing information display, a positive indication of an overexposure or underexposure is given, thereby preventing an inadvertent photographing operation with an improper exposure. Even though the overexposure or underexposure is displayed, the spotwise photometric values as well as the result of the arithmetic operation are properly stored. Hence, if the spotwise photometric values and the result of the arithmetic operation come into the display regions of the display due to a subsequent change in other exposure factors, they can be properly displayed.

The photographing mode is automatically changed from the localized or spotwise photometry mode to the average photometry mode in response to the completion of the spotwise photometry photographing operation, thus avoiding the likelihood that improper pictures may be taken as a result of a continued photographing operation in the spotwise photometry mode. The reason for resetting the operation to the average photometry mode after completion of the spotwise photometry operation is because the spotwise photometry is only rarely used and because the average photometry generally produces a passable result.

The operation is automatically changed from the average photometry to the spotwise photometry mode in response to an operation to input a spotwise photometric value. This eliminates the need for the provision of a separate member which is to be disposed on the camera to select the spotwise photometry mode, thus effectively preventing a failure in the photographing operation as a result of an inadvertent operation of or forgetting to operate such member.

The provision of a data erasure member permits the spotwise photometric values and the result of the arithmetic operation to be cancelled, facilitating the spotwise photometry to be repeated after it has once been attempted. At the same time, the actuation of the erasure member automatically changes the operation from the spotwise photometry to the average photometry mode, providing a greater convenience in use.

A selection is enabled among a normal spotwise photographing mode in which an exposure level is determined on the basis of an arithmetic mean or a weighted means of photometric values obtained with the spotwise photometric means, a highlight referenced photographing mode in which an exposure level is determined which exceeds, by a given number of exposure steps, a reference which represents the maximum one of the photometric values, and a shadow referenced photographing mode in which an exposure level is determined which is, by a given number of exposure steps, below a reference which represents the minimum one of the photometric values. Such selection enables a photographing operation which fully reflects the composition intended by a photographer. The highlight or the shadow referenced photographing mode is disabled if at least one or more photometric values from the spotwise photometry is not inputted, thus eliminating the need to reset such mode if it is inadvertently selected and thus avoiding the likelihood to miss a shutter chance.

In the highlight referenced photographing mode, an exposure period is delayed by an amount corresponding to the given number of exposure steps, as compared with an exposure period which would represent a proper exposure for the maximum value of the brightness. This permits a picture to be taken with an appropriate ratio of highlight and shadow, as referenced to an intended region of an object being photographed. The display of an actual exposure period within a finder assists a photographer in taking a picture since it is available to him beforehand. Furthermore, if a fresh value of the brightness is inputted which exceeds the maximum value of the brightness, the arithmetic operation to determine an exposure period is automatically repeated, allowing a photographer to take a picture while only paying attention to the exposure period displayed within the finder and without being troubled by a complex calculation.

In the shadow referenced photographing mode, an exposure period is shortened, by an amount corresponding to a given number of exposure steps, as compared with an exposure period which would represent a proper exposure for the minimum value of the brightness. This also permits a photographer to take a picture with an appropriate ratio of highlight and shadow as referenced to a desired region of an object being photographed. The display of an actual exposure period within the finder assists a photographer in taking a picture since it is available to him beforehand. Furthermore, if a fresh value of the brightness is inputted which is below the minimum value of the brightness, the arithmetic operation to determine an exposure period is automatically repeated, allowing a photographer to take a picture while only paying attention to an exposure period displayed within the finder and without being troubled by a complex calculation.

When a storage member is actuated, an exposure level which is stored during the initial automatic exposure is utilized during the subsequent photographing operation, permitting a plurality of frames to be exposed at the same exposure level. The stored exposure level is displayed within a finder concurrently with an exposure level which corresponds to the brightness of an object being photographed which is being currently determined, thus facilitating a comparison of the exposure levels. In the event an exposure factor other than the stored exposure level varies, the stored exposure level is also varied in accordance with the change in the exposure factor, allowing pictures to be taken always at a given exposure level. If an exposure correction is made, the stored exposure level can be changed in accordance with such correction, thus allowing the exposure level to be shifted only for those frames which require such correction.

An exposure level which is based on the spotwise photometric values and the result of the arithmetic operation is displayed as a deviation from a standard exposure level, providing a clear indication of the distribution of the brightness of an object being photographed as well as its deviation from the standard exposure level. This greatly facilitates a multiple point photometry during a manual photographing operation.

When utilizing an electronic flash, an exposure level which will be attained under natural light alone at a timing which is synchronized with the operation of the electronic flash is displayed as a deviation from the standard exposure level, allowing a photographer to recognize the degree of exposure which would be achieved with natural light alone. Hence, it is possible to determine beforehand whether or not the brightness of an object being photographed is high enough to obviate the use of an electronic flash or the degree to which a background will be over- or under-exposed when performing a daytime synchronized photographing operation.

BRIEF DESCRIPTION OF THE DRAWINGS

FIGS. 19A and B are plan views of display segment electrodes and back electrodes of a liquid crystal display panel which essentially comprises a photographing information display shown at 39 in FIG. 3;

FIG. 45 represents a bar graph of a Tv value produced within the extent of display, FIG. 46 shows a bar representation of Tv value which exceeds the extent of display, and FIG. 47 illustrates a bar representation of Tv value which is less than the lower limit of the extent of display;

FIG. 48 shows a bar representation of average Tv value which is within the extent of display, FIG. 49 a bar representation of average Tv value which exceeds the upper limit of the extent of display, and FIG. 50 illustrates the application of a correction;

FIG. 51 shows a bar representation of Tv value which has once extended to a position corresponding to the maximum value of the brightness, FIG. 52 is a bar representation of Tv value which is by $2\frac{1}{3}$ Ev shifted in the negative direction from the condition shown in FIG. 51, FIG. 53 shows a bar representation of Tv value which is shifted from the condition shown in FIG. 52 by changing Sv−Av value, and FIG. 54 shows the application of a correction to the condition shown in FIG. 53;

FIG. 55 shows a bar representation of Tv value which has once retracted to a position corresponding to the minimum value of the brightness, and FIG. 56 shows a bar representation of Tv value which is shifted by $2\frac{2}{3}$ Ev in the positive direction from the condition shown in FIG. 55;

FIGS. 57 to 59 show the manner of display by the photographing information display during a direct, automatic memory photographing mode; specifically, FIG. 57 represents a memory set condition, FIG. 58 a memory hold condition, and FIG. 59 the result of applying a correction in the memory hold condition;

FIG. 60 shows the manner of display by the photographing information display during the spotwise photometry, automatic memory photographing mode;

FIGS. 61 and 62 show the manner of display by the photographing information display during the normal manual photographing mode; specifically, FIG. 61 shows a bar representation of a deviation from a standard exposure level, and FIG. 62 the result of applying a correction to the bar representation;

FIG. 63 shows a bar representation of an arithmetic mean of deviations from a standard exposure level, FIG. 64 shows the bar rerpresentation when a new spotwise photometric input is applied to the condition shown in FIG. 63, and FIG. 65 shows the result of applying a correction to the condition shown in FIG. 64;

FIG. 68 shows a point display of a deviation from a standard exposure level, FIG. 69 shows the result of applying a correction to the condition shown in FIG. 68, FIG. 70 illustrates the indication of an overexposure which is found after the photographing operation, FIG. 71 illustrates an underexposure which is found after the photographing operation, and FIG. 72 illustrates a proper exposure which is found after the photographing operation.

DETAILED DESCRIPTION OF PREFERRED EMBODIMENT

Figure 1:
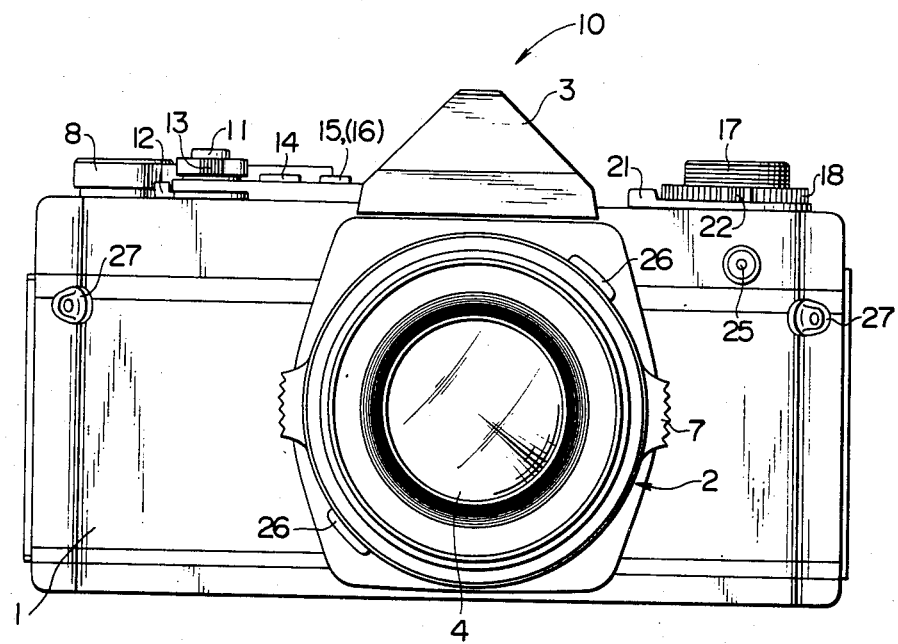
FIG. 1 is a front view of a camera constructed in accordance with one embodiment of the invention.
Figure 2:
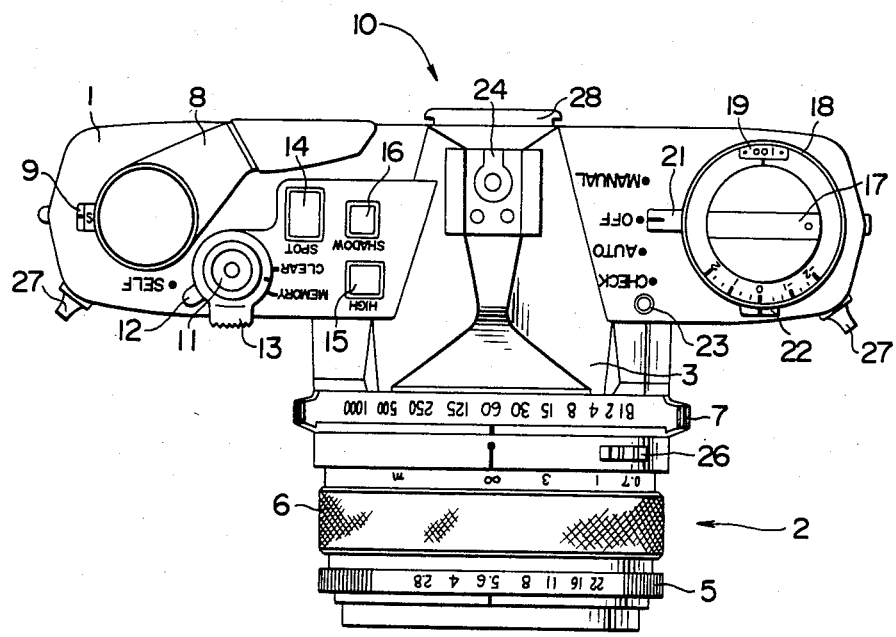
FIG. 2 is a top plan view of the camera shown in FIG. 1.

FIGS. 1 and 2 show a front view and a plan view of a camera constructed in accordance with one embodiment of the invention. A camera 10 shown represents a single lens reflex camera including a body 1, and a lens barrel 2 for a taking lens is detachably mounted centrally on the front side of the body 1. A triangular pentaprism housing 3 projects upwardly from the central portion of the top side of the body 1. As is well recognized, barrel 2 contains and carries a taking lens 4. Disposed around the periphery of the barrel 2 in a rotatable manner are a diaphragm aperture presetting ring 5, a distance presetting ring 6 and a manual exposure period presetting ring 7 in the sequence named as viewed from the front side of the barrel. Disposed on the top side of the body 1 and to the left of the pentaprism housing 3 are a plurality of operating members including a film winding lever 8, a number of film frames indicator window 9, a shutter release button 11, a self-timer operating knob 12, a memory command knob 13, a spotwise photometric data entry button 14, a highlight command button 15 and a shadow command button 16. Disposed on the top side of the body 1 and to the right of the pentaprism housing are a film rewind knob 17, a film speed presetting dial 18, a film speed indicator window 19, a mode changing knob 21, an exposure correction knob 22 and a light emission window 23 associated with a battery checker. An electronic flash mounting shoe 24 is disposed on the top surface of the pentaprism housing 3 toward the rear end thereof while a connector 25 for connection with an electronic flash, not shown, through a cord, not shown, is disposed on the front side of the body 1 toward the upper, right-hand corner thereof. In FIGS. 1 and 2, numeral 26 represents an operating button which is used to mount the barrel 2 on the body 1, numeral 27 a fixture for connecting a strap, not shown, to the body 1, and 28 a window frame for a finder eyepiece assembly.

The memory command knob 13 is rotatably disposed on the pedestal of the shutter release button 11, and is normally biased to assume its stop position where a pointer inscribed thereon is located intermediate indices "MEMORY" and "CLEAR" inscribed on the top surface of the body 1. The memory command knob 13 is provided for selecting and resetting a memory photographing mode (hereafter simply referred to as memory mode) in which pictures are taken over a plurality of frames at a given exposure level which is once stored. The knob 13 is mechanically interlocked with a memory switch SW6 (FIG. 7) and a clear switch SW7, which will be described later. Specifically, the knob 13 may be turned to bring the pointer thereon into alignment with the index "MEMORY", whereupon the memory switch SW6 is closed to establish a memory photographing mode. When the knob 13 is turned to bring the pointer into alignment with the index "CLEAR", the clear switch SW7 is closed to terminate or reset the memory photographing mode. When the knob 13 is released, it automatically returns to its normal position under the bias applied thereto while maintaining the memory photographing mode or the reset condition. This operation will be dealt with in more detail in connection with FIG. 7.

The spotwise photometric data entry button 14 is formed by a self-resetting pushbutton which is effective to enter a value of the brightness of an object being photographed which is determined by the spotwise photometry through the taking lens 4, into an electrical circuit of the camera 10 for storage. The entry button 14 is mechanically interlocked with a spotwise photometric data entry switch SW8 (FIG. 7) to be described later. When the entry button 14 is depressed, the entry switch SW8 is closed, selecting a spotwise photographing mode in which an exposure level is controlled in accordance with spotwise photometric values which are stored. When the entry button 14 is depressed a plurality of times, a corresponding value of the brightness which is determined by the spotwise photometry is stored each time, whereby a plurality of photometric values are saved within the camera 10. It is to be understood that the self-resetting operation of the entry button 14 does not reset the spotwise photometry mode, which is reset in connection with the completion of a single photographing operation.

The highlight command button 15 is formed by a self-resetting pushbutton which selects a highlight referenced photographing mode (hereafter simply referred to as highlight mode) in which an exposure value used is chosen to be 2⅓ Ev less than the maximum value of spotwise photometric values which have been stored as a result of operating the spotwise photometry entry button 14, and is mechanically interlocked with a highlight switch SW9 (FIG. 7) to be described later. The highlight mode is selected by depressing the highlight command button 15 an odd number of times, and is reset by depressing it an even number of times. Similarly, the shadow command button 16 is formed by a self-resetting pushbutton which selects a shadow referenced photographing mode (hereinafter simply referred to as a shadow mode) in which an exposure value is chosen to be 2⅜ Ev higher than the minimum value of the spotwise photometric values which have been stored as a result of operating the spotwise photometry entry button 14, and is mechanically interlocked with a shadow switch SW10 (FIG. 7) to be described later. The shadow mode is selected by depressing the shadow command button 16 an odd number of times, and is reset by depressing it at even number of times. The selection of either highlight or shadow mode is inhibited whenever there are no spotwise photometric values stored at the time when the highlight or the shadow command button 15 or 16 is depressed. In is to be noted that the depression of the shadow command button 16 when the highlight mode is selected resets the highlight mode and establishes or selects the shadow mode. Conversely, the depression of the highlight command button 15 when the shadow mode is established resets the shadow mode and selects the highlight mode.

Figure 11:
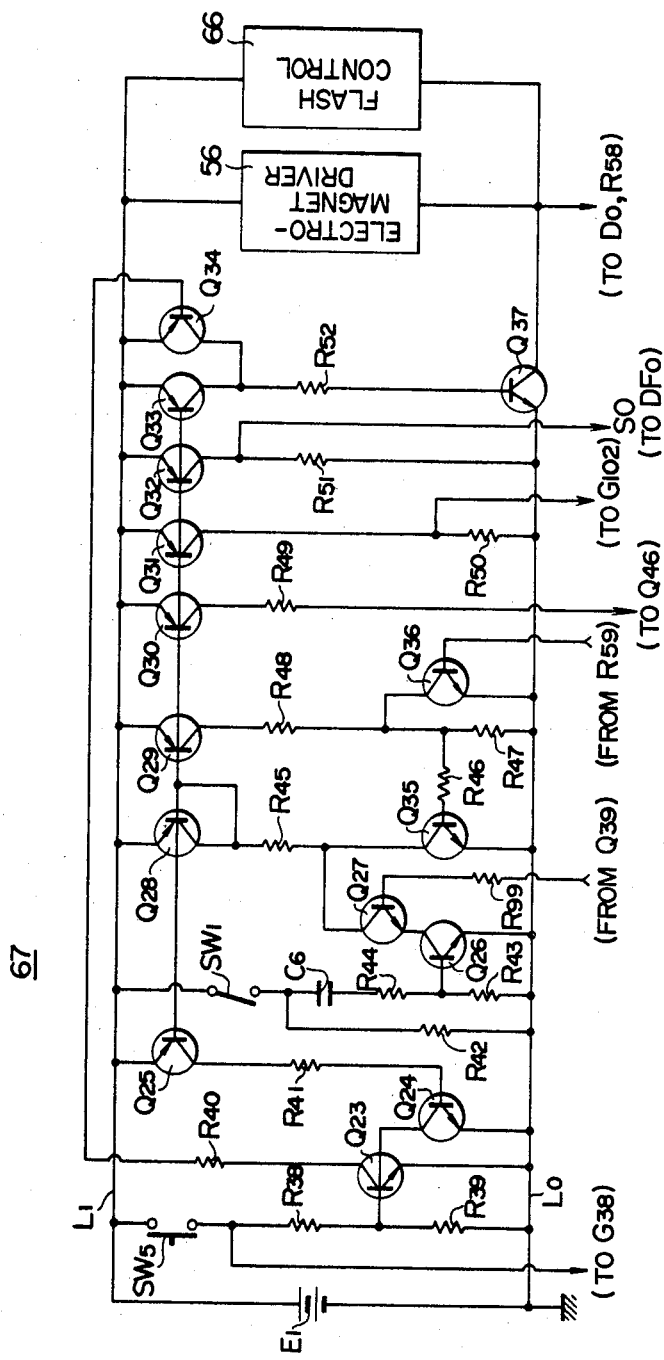
FIG. 11 is a circuit diagram of an electrical circuit of a power supply sustain circuit shown in FIG. 5.

The mode changing knob 21 is rotatably disposed on the pedestal of the film rewind knob 17, and can be moved into alignment with one of indices "MANUAL", "OFF", "AUTO" and "CHECK" inscribed on the top side of the body 1. A click stop mechanism cooperates with the knob 21 to maintain it temporarily at one of such positions. The mode changing knob 21 is mechanically interlocked with a manual switch SW3 (FIG. 7), an auto switch SW4 (FIG. 7) and a battery check switch SW5 (FIG. 11). When the knob 21 is turned into alignment with an index "MANUAL", the manual switch SW3 is closed, establishing a manual exposure photographing mode (hereafter simply referred to as a manual mode) in which an exposure control is performed by operating a shutter, not shown, with an exposure period which is manually chosen. When the knob 21 is turned into alignment with the index "OFF", the circuit establishes an off photographing mode (hereafter simply referred to as off mode) in which the shutter is operated at a given exposure period. When the knob 21 is turned into alignment with the index "AUTO", the auto switch SW4 is closed, and an automatic exposure photographing mode (hereafter simply referred to as automatic mode) is established in which an exposure control takes place by operating the shutter at an exposure period which is calculated on the basis of photometric values of an object being photographed. When the knob 21 is turned into alignment with the index "CHECK", the battery check switch SW5 is closed, allowing a light emission to be visible through the window 23 whenever a supply voltage Vcc is equal to or greater than a given value.

Figure 3:
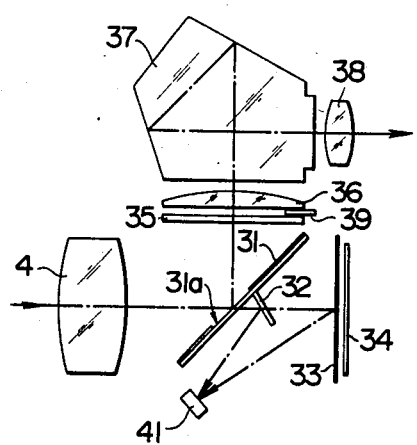
FIG. 3 is a schematic side elevation of the optics contained within the camera of FIG. 1.
Figure 4:
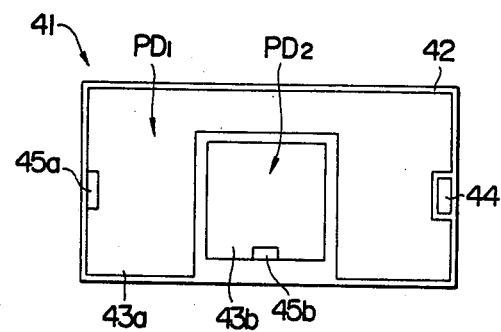
FIG. 4 is a front view of a photometric light receiver contained in the optics of FIG. 3.

FIG. 3 shows the optics of the single lens reflex camera 10 according to the invention. As is well known, the optics of a single lens reflex camera includes a movable reflecting mirror 31 which is disposed so as to be angularly movable and which is normally disposed at an angle of 45° with respect to a taking light path wherein a finder light path is defined. At this time, light from an object being photographed which impinges on the camera 10 through the taking lens 4 is diverted at right angles so as to be reflected upward for incidence onto a finder optics. The finder optics includes a focussing glass 35 which is located so as to be optically conjugate to the photosensitive surface of a photographic film 34, a condenser lens 36 disposed directly above the focussing glass 35, a pentaprism 37 disposed directly above the condenser lens 36, and a finder eyepiece lens 38 which is disposed so as to be opposite to the rear end face of the pentaprism 37 which represents an emitting end face thereof. A photographing information display 39 which comprises a liquid crystal display panel of transmission type, as will be described later, is interposed between the focussing glass 35 and the condenser lens 36 at their rear ends. It is to be understood that a central area of the movable reflecting mirror 31 is processed to form a half mirror or processed to provide a plurality of juxtaposed slits which allow a full transmission, thereby providing a semi-transmitting area 31a. A totally reflecting mirror 32 is mounted on the backside of the movable reflecting mirror 31 in a region corresponding to the semi-transmitting area 31a so as to be movable and forming a given angle with the movable mirror 31. The purpose of the totally reflecting mirror 32 is to redirect light from an object being photographed which has passed through the semi-transmitting area 31a toward a light receiver 41 disposed toward the bottom of the camera 10 for purpose of photometry. As shown in FIG. 4, the light receiver 41 is rectangular in configuration, and is disposed toward the front end of the bottom of the camera body 1 so as to face the photosensitive surface of the photographic film 34 or the surface of a focal plane shutter 33 which is disposed in the rear portion of the body 1 as well as to the totally reflecting mirror 32. The light receiver 41 comprises a substrate 42 of N-type semiconductor, on the surface of which are formed P-type semiconductor regions 43a, 43b having an inverted channel configuration and a square configuration, respectively. A cathode electrode 44 is applied to the substrate 42 while anode electrodes 45a, 45b are applied to the respective P-type regions 43a, 43b. The combination of the region 43a and the substrate 42 forms a photovoltaic element PD1 (FIG. 8) which effects a direct average photometry of light from an object being photographed which is reflected by either the photosensitive surface of the film 34 or the surface of the focal plane shutter 33. The combination of the region 43b and the substrate 42 forms another photovoltaic element PD2 (FIG. 8) which effects a spotwise photometry of light from an object being photographed which is reflected by the totally reflecting mirror 32.

Figure 5:
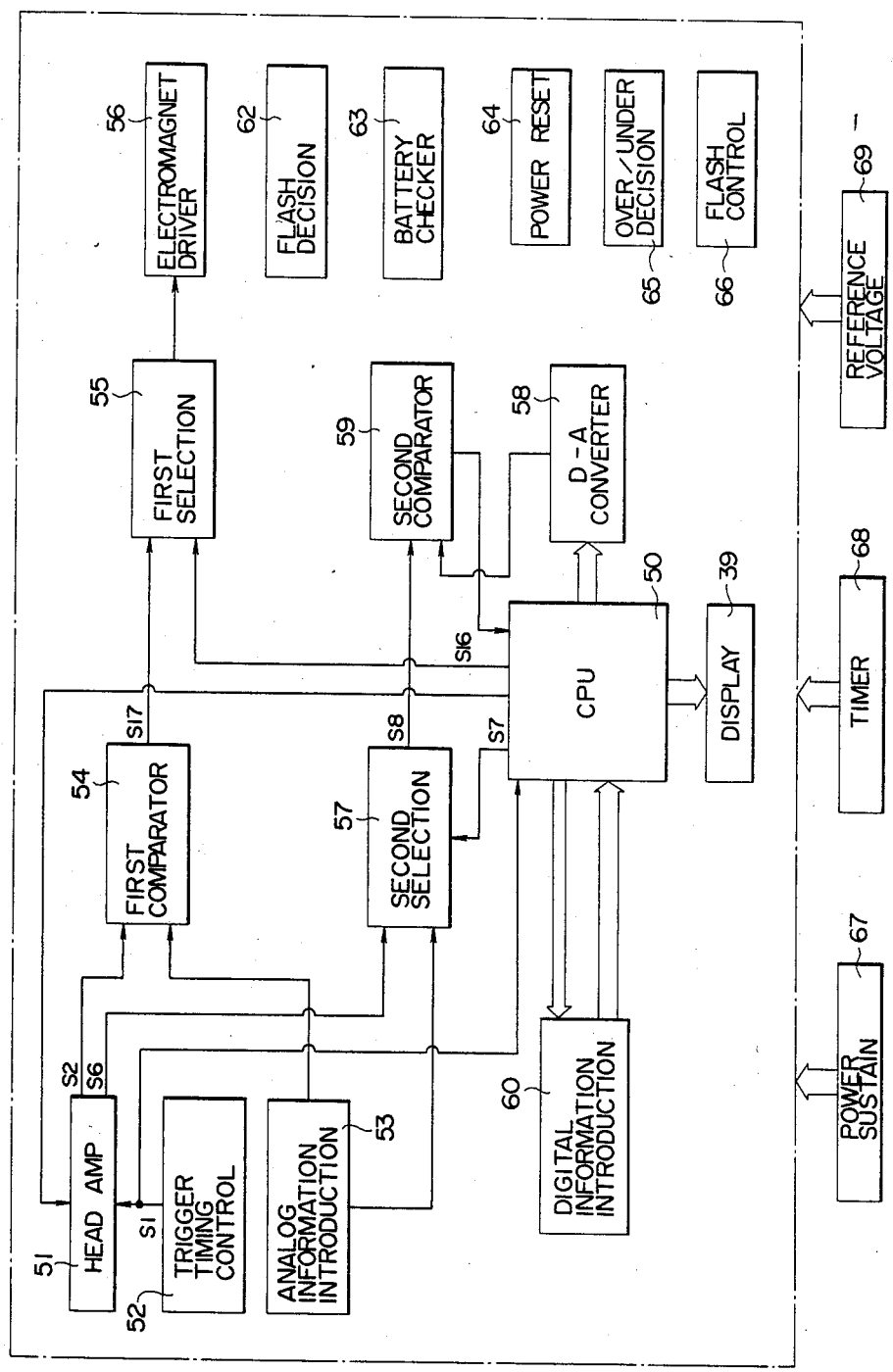
FIG. 5 is a block diagram of the general arrangement of an electrical circuit contained in the camera shown in FIG. 1.

FIG. 5 is a block diagram of the general arrangement of an electrical circuit contained in the camera 10 of the invention. The electrical circuit comprises a mircocomputer (hereafter referred to as CPU, central processing unit) functioning as a central processing unit which controls the operation of the entire circuit, a head amplifier 51 which effects photometry of light from an object being photographed to produce a photometric integral output S2 and a brightness signal S6, a trigger timing control circuit 52 for producing a trigger signal S1 which in turn controls the timing of the initiation of photometry by the head amplifier 51, an analog exposure information introduction circuit 53 for introducing into the circuit analog exposure information such as a diaphragm aperture, film speed, a correction value or the like, a first comparator 54 for comparing the photometric integral output S2 from the head amplifier 51 and an output from the introduction circuit 53 against each other to derive a shutter control signal S17 which is used during the direct photometry, a first selection circuit 55 which receives and selectively outputs one of the shutter control signal S17 from the first comparator 54 produced during the direct photometry and a shutter control signal S16 which is outputted by CPU50 during the memory mode, the manual mode and the spotwise mode; an electromagnet driver circuit 56 which is energized by the shutter control signal from the first selection circuit 55; a second selection circuit 57 for selectively outputting the brightness signal S6 from the head amplifier 51 or (film speed - diaphragm aperture) signal (SV - AV) from the introduction circuit 53 in accordance with an input select signal S7 supplied from CPU50; a D/A converter 58 which converts an 8-bit digital information supplied from CPU50 into a corresponding analog form; a second comparator 59 for comparing an analog output signal from the converter 58 and an analog signal S8 supplied as an output from the second selection circuit 57 against each other to provide a digital output which is supplied to CPU50; a digital exposure information introduction circuit 60 for inputting to CPU50 digital exposure information including a manual exposure period and a correction value; and the photographing information display 39 mentioned above which is activated in accordance with an output from CPU50. Furthermore, the electrical circuit includes an electronic flash decision circuit 62 which causes the completion of a charging operation within an electronic flash to be indicated, a battery checker circuit 63 which determines if a supply voltage Vcc is equal to or greater than a given value, a power supply sustain reset circuit 64 which resets the self-holding or sustaining action for the power supply, a flash over- and under-exposure decision circuit 65 which determines if an exposure provided by flashlight from an electronic flash resulted in an over- or an under-exposure, and an electronic flash control circuit 66 which produces an automatic emission terminate signal which causes the light emission from the electronic flash to be terminated. Also associated with the electrical circuit are a power supply sustain circuit 67, a timer circuit 68 which produces a variety of timing signals and a voltage reference circuit 69 which produces a variety of reference voltages.

Figure 6:
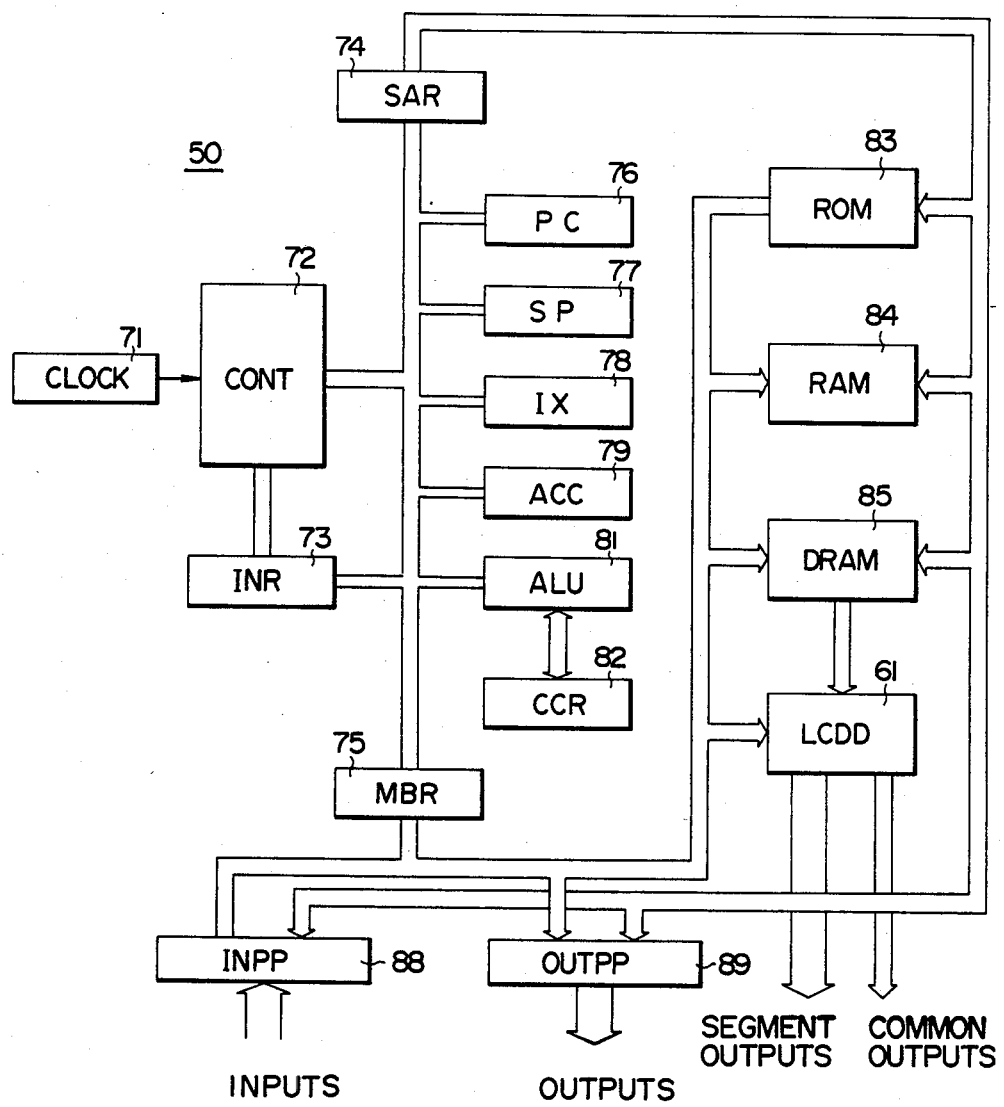
FIG. 6 is a block diagram of the internal arrangement of a microcomputer serving as a central processing unit shown in FIG. 5.

FIG. 6 is a block diagram showing the internal arrangement of CPU50 which represents the heart of a control system incorporated into the camera 10 of the invention. In this Figure, a clock generator (CLOCK) 71 produces pulses to which the operation of CPU50 is referenced. A control circuit (CONT) 72 basically controls the entire operation of CPU50. It is necessary that CPU50 transfers and processes various data in binary notation in proper sequence, in accordance with a predetermined sequence of programs. To this end, CPU50 must be internally provided with means which determines which gate or gates within CPU50 are to be opened and the duration during which they should be opened and what flipflops should be set or reset, in accordance with the status within CPU50 as well as input conditions. This job is performed by CONT72. An instruction register (INR) 73 serves for temporarily holding the content of a random access memory (RAM) 84 to be described later, and CONT72 determines, on the basis of the content in the INR73, the status which the various parts of CPU50 should assume. A program counter (PC) 76 stores the addresses of instructions to be executed in order to enable a program to be performed in a proper sequence. Specifically, the address in the program counter starts with a smallest address within a memory and is sequentially incremented by one in the sequence of execution. A stack pointer (SP) 77 is a register which temporarily stores the content of PC76, an accumulator (ACC) 79, to be described later, and an index register (IX) 78, also to be described later, without destroying such content, in order to permit its re-use after returning from an interrupt instruction or a transfer instruction to a subroutine. The index register IX78 is a register for storing the address of instructions to be executed in the event instructions are to be executed in an index address form. An arithmetic and logical unit (ALU) 81 performs those portions of the instructions which relate to an arithmetic operation and a logical operation such as performing an addition or subtraction, inverting the content of a memory ("1" or "0") or forming a logical sum or product of two data. A condition code register (CCR) 82 operates to store a code to be used in the detection of a status in the form of a flag when executing an instruction which requires a decision relating to a branch instruction. It is to be understood that the decision function plays an important role within CUP50, and as will be described later, when controlling the camera 10 of the invention, it is a frequent occurrence to execute a branch instruction which requires to determine the status (either "1" or "0") at each input port to change the flow of a program to be executed next or to maintain the original flow. This is accomplished by determining the status of a flag within CCR82. CCR82 contains a variety of flags including a negative flag which will be "1" when a result obtained by the execution of an instruction is negative in the form of 2's complement and will be "0" when the result is positive; a zero flag which will be "1" when the result is "0" and will be "0" otherwise; an overflow flag which will be "1" when the result produces an overflow in 2's complement from and will be "0" otherwise; a carry flat which will be "1" when a result of an arithmetic operation produces a carry or borrow from a binary number without sign and will be "0" otherwise, etc. A memory buffer register (MBR) 75 represents a register into which the content stored within a memory at a specified address is read in response to a read-out instruction applied to the memory when an address from which the content is to be read out is stored in a storage address register (SAR) 74.

A read only memory (ROM) 83 is provided to allow CPU50 to read its content in a sequential manner for executing the instructions. A random access memory (RAM) 84 temporarily stores data used in the course of an arithmetic and logical operation or the result of such operation and various other inpuht information. A display random access memory (DRAM) 85 includes areas which are related, by a one-to-one correspondence, to the individual segments of a liquid crystal display panel which forms the photographing information display 39, as will be described in detail in connection with FIG. 19A. If the content at a specified address of DRAM85 assumes "1", a corresponding segment of the liquid crystal display panel will be activated for emission of light. A liquid crystal driver circuit (LCDD) 61 activates the photographing information display 39, which is formed by the liquid crystal display panel for emission of light in a manner mentioned above. In the camera 10 of the invention, the display 39 employs a control technique which utilizes ⅓ duty and ⅓ bias drive, and hence includes 39 segment lines and 3 common lines. An input port assembly (INPP) 88 includes seventeen input ports I0 to I16 as will be mentioned further later while an output port assembly (OUTPP) 89 includes ten output ports 00 to 09 as will be similarly described later (see FIG. 7). It is to be understood that outputs from OUTPP89 represent latched outputs.

A control operation by CPU50 will be initially mentioned briefly. CPU50 repeats a pair of cycles, one a fetch cycle in which an instruction stored within a memory at an address specified by PC76 is loaded and the other an execute cycle in which that instruction is executed. Initially, a count in PC76 is transferred to SAR74, and PC76 then is incremented by one. When an address where a read operation is to be performed is stored in SAR74, a read command applied to the memory causes the content of that memory at the specified address to be read into MBR75 after a given time interval. An instruction code of that instruction is then transferred to INR73. This represents a fetch cycle, and is followed by an execute cycle, the operation of which depends on the content stored in INR73. By way of example, it is assumed that an instruction (LDA instruction) to load the content of the memory into ACC79 is stored in INR73. An address portion of the instruction which remains within MBR75 is transferred to SAR74. Subsequently, a read command is applied to the memory, whereby data is read into MBR75, and is then transferred to ACC79 therefrom, thus completing the execution of that instruction. By way of another example, the execution of a conditional branch instruction, which frequently appears in the flowcharts to be described later, will be described. Suppose that a conditional branch takes place by determining the status at a selected port, which is assumed to be port A, of the input port assembly. In this instance, the content of the port A is read into MBR75 during the fetch cycle in the same manner as mentioned above. It is assumed that the bit at the port A represents the most significant bit stored in a memory. Assuming that INR73 contains LDA instruction which requires the content of the memory to be stored in ACC79, the content at port A is transferred to ACC79 in the same manner as mentioned above. PC76 then indicates an address of an instruction to be executed next, and the instruction is similarly stored in MBR75. Assuming that INR73 contains an instruction (ROL instruction) to shift the most significant bit within ACC79 to the carry flag in CCR82, the status at port A (either "0" or "1") is stored in the carry flag during the following execute cycle. The status of the carry flag is then determined and an instruction (BCS instruction) may be executed which requires a branch if the carry flag is "1" and to execute the next instruction in the program otherwise, thus completing the intended operation. In this example, three instructions LDA, ROL and BCS have been used, but it will be understood that a desired control can be performed by utilizing an arbitrary combination of as many as several tens of instructions.

The flowcharts to be described later do not specifically describe, in machine language, the manner of utilizing the various blocks shown in FIG. 6 to execute each particular program. However, it will be understood that instructions in a program which command a transfer, an addition, a subtraction or the like can be simply implemented in known manners.

Figure 7:
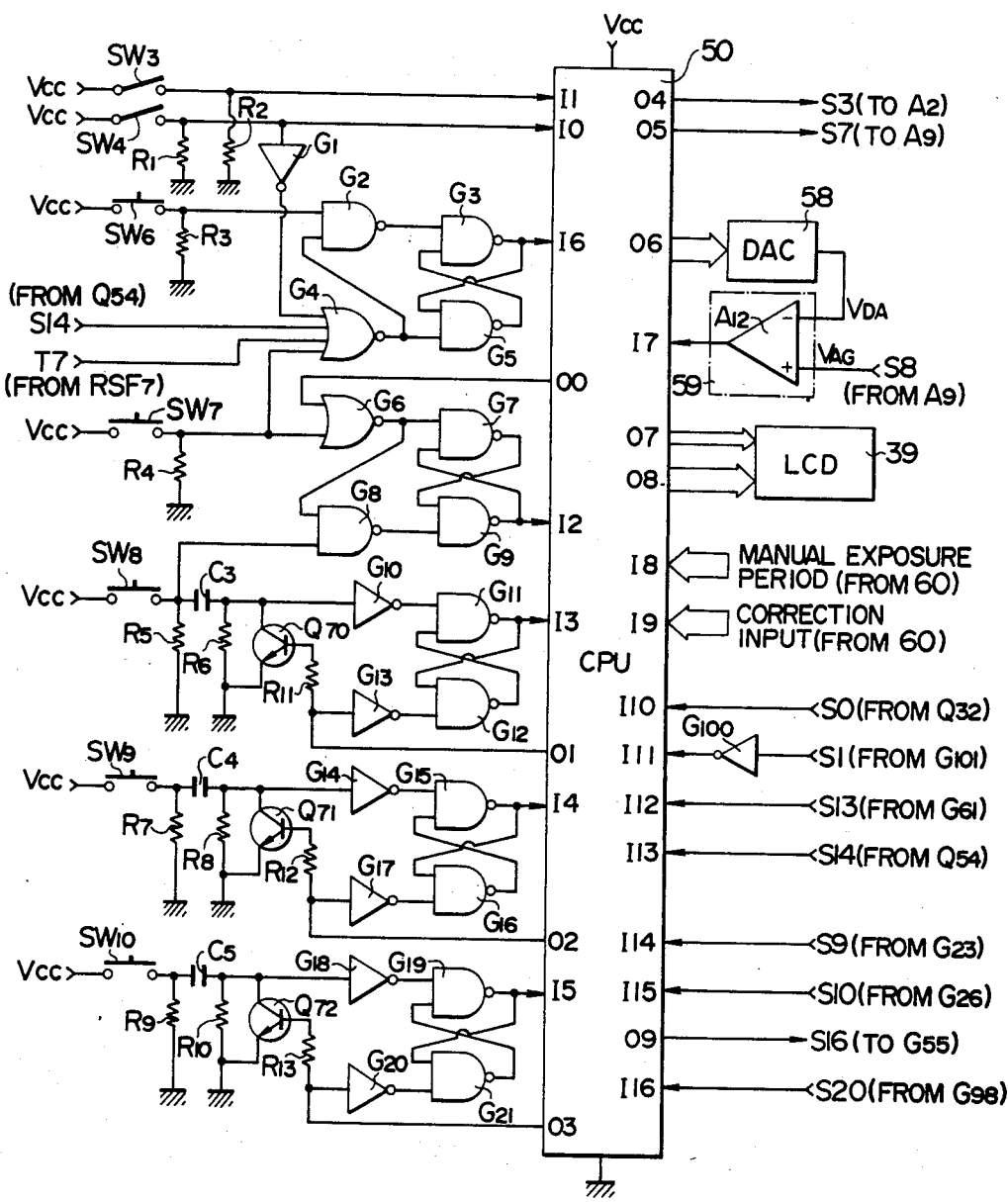
FIG. 7 is a circuit diagram of an interface utilized as a peripheral unit of the microcomputer shown in FIG. 6.

FIG. 7 shows an interface which is peripheral to CPU50. In this Figure, reference characters I0 to I16 represent individual input ports and reference characters O0 to O9 represent individual output ports of CPU50. The input port I0 serves the purpose of detecting whether or not an automatic mode is called for, and is connected to one end of the auto switch SW4 which is mechanically interlocked with the mode changing knob 21 and is also connected to the ground through a pull-down resistor R1. A supply voltage Vcc is applied to the other end of the auto switch SW4. Accordingly, the input port I0 assumes a level which will be "L" or "0" when the auto switch SW4 is open and which will be "H" or "1" when the switch is closed. The "1" level of this input port represents the detection of the automatic mode. Said one end of the auto switch SW4 is connected through NOT circuit G1 to a first input of NOR circuit G4, which will be described later. The input port I1 serves the purpose of detecting whether or not a manual mode is called for, and is connected to one end of the manual switch SW3 which is mechanically interlocked with the mode changing knob 21 and is also connected to the ground through a pull-down resistor R2. The supply voltage Vcc is applied to the other end of the manual switch SW3. Accordingly, the input port I1 assumes a level which will be "L" or "0" when the manual switch SW3 is open and which will be "H" or "1" when the switch is closed. The "1" level of the input port I1 represents the detection of the manual mode.

The input port I6 serves the purpose of detecting whether or not a memory mode is called for, and is connected to the output of NAND circuit G3. The output of NAND circuit G3 is also connected to one input of NAND circuit G5, the output of which is connected to one input of NAND circuit G3, whereby the circuits G3, G5 form together an RS flipflop which detects the memory mode. The other input of NAND circuit G3, which represents a reset input to the RS flipflop, is connected to the output of NAND circuit G2, and the other input of NAND circuit G5, which represents a set input to the RS flipflop, is connected to the output of NOR circuit G4. The output of NOR circuit G4 is also connected to one input of NAND circuit G2. The other input of NAND circuit G2 is connected to one end of a memory switch SW6 which is mechanically interlocked with the memory command knob 13, and is also connected to the ground through a resistor R3. The memory switch SW6 is formed by a self-resetting switch and has the supply voltage Vcc applied to its other end. NOR circuit G4 also includes a second input to which a signal S14 which indicates that the power supply of an electronic flash is turned on is applied, a third input to which a memory timer signal T7 is applied, and a fourth input which is connected to one end of the clear switch SW7, to be described later. NOR gate G4 represents a resetting gate, which operates to reset the memory mode whenever the input port I0 assumes "0" level, indicating a mode other than the auto mode is selected, whenever an electronic flash is mounted on the camera 10 and the power supply for the electronic flash is turned on, whenever the memory timer has timed out and whenever the clear signal is manually inputted. The purpose of NAND circuit G2 is to reset the RS flipflop in response to an output from NOR circuit G4 in preference to a memory mode select signal.

The input port I2 serves the purpose of detecting whether or not the spotwise mode is called for, and is connected to the output of NAND gate G9. When this output assumes the "H" level, the input port I2 assumes the "1" level, indicating that the spotwise mode is called for. In a manner similar to NAND circuits G3 and G5, NAND circuit G9 forms together with NAND circuit G7 and RS flipflop having a set input which is formed by one input to NAND circuit G7 which is connected to the output of NOR circuit G6, and having a reset input formed by one input to NAND circuit G9 which is connected to the output of NAND circuit G8. The output of NOR circuit G6 is connected to one input of NAND circuit G8. One input to NOR circuit G6 is connected to the output port 00 which is used when resetting the spotwise mode while its other input is connected to one end of the self-resetting clear switch SW7 which is mechanically interlocked with the memory command knob 13 and also connected to the ground through a resistor R4. The supply voltage Vcc is applied to the other end of the clear switch SW7. NOR circuit G6 represents a resetting gate, which resets the spotwise mode when the clear switch SW7 is depressed or a program causes a pulse signal to be present on the output port 00. The other input of NAND circuit G8 is connected to one end of the spotwise photometry data entry switch SW8. NAND circuit G8 functions to reset the RS flipflop in response to an output from NOR circuit G6 in preference to the spotwise data entry signal.

The input port I3 serves the purpose of detecting the presence or absence of spotwise photometry data input, and is connected to the output of NAND circuit G11. It assumes the "1" level when the output of gate G11 assumes the "H" level, this indicating the presence of a spotwise photometry input. In the a manner similar to as the combination of NAND circuits G3 and G5, NAND circuit G11 forms together with NAND circuit G12 an RS flipflop having a reset input which is formed by one input to NAND circuit G11 which is connected to the output of NOT circuit G10 and having a set input formed by the other input of NAND circuit G12 which is connected to the output of NOT circuit G13. The input of NOT circuit G10 is connected through a capacitor C3 to one end of the self-resetting spotwise data entry switch SW8 and is also connected to the ground through a resistor R6. It is also connected to the collector of an NPN transistor Q70, which has its emitter connected to the ground. The base of the transistor Q70 is connected through a resistor R11 to an output port 01 which is used when resetting spotwise data entry. The output port 01 is also connected to the input of NOT circuit G13. As mentioned previously, one end of the entry switch SW8 is connected to the other input of NAND circuit G8 and is also connected to the ground through a resistor R5. The supply voltage Vcc is applied to the other end of the switch SW8. The RS flipflop formed by NAND circuits G11 anbd G12 operates to maintain a signal each time the spotwise data entry switch SW8 is closed in order to enter a plurality of spotwise photometric signals during the spotwise mode. After the entry of spotwise photometric signals and the calculation of an exposure period is completed within CPU50, a positive pulse signal is outputted to the output port 01 to set the RS flipflop, thus causing it to wait for another spotwise photometric signal input.

The input port I4 serves the purpose of detecting whether or not the highlight mode is called for, and is connected to the output of NAND circuit G15 so that it assumes the "1" level whenever the output of NAND circuit G15 assumes the "H" level, thus indicating the highlight mode. A self-resetting switch SW9 is a switch which commands a highlight reference photographing operation, and when the switch SW9 is closed, the RS flipflop formed by NAND circuits G15 and G16 produces an output of "H" level, thus selecting the highlight mode. The highlight mode is reset by producing a positive pulse at the output port 02. The input port I5 serves the purpose of detecting whether or not the shadow mode is called for, and is connected to the output of NAND circuit G19 so that it assumes the "1" level whenever this output assumes the "H" level, thus indicating the shadow mode. A self-resetting switch SW10 is a switch which commands a shadow referenced photographing operation, and when the switch SW10 is closed, an RS flipflop formed by NAND circuits G19 and G21 produces an output of "H" level, thus selecting the shadow mode. The shadow mode is reset by outputting a positive pulse at the output port 03. The highlight mode detecting circuit comprising the switch SW9, resistors R7, R8, R12, capacitor C4, NPN transistor Q71, NOT circuits G14, G17 and NAND circuits G15, G16 as well as the shadow mode detecting circuit comprising switch SW10, resistors R9, R10, R13, capacitor C5, NPN transistor Q72, NOT circuits G18, G20 and NAND circuits G19, G21 are connected in generally the same manner as the spotwise photometric data entry detecting circuit comprising the switch SW8, resistors R5, R6, R11, capacitor C3, NPN transistor Q70, NOT circuits G10, G13 and NAND circuits G11, G12, and therefore will not be described in detail.

Considering the operation of the spotwise photometric data entry detecting circuits, the highlight mode detecting circuit and the shadow mode detecting circuit, such operation can be exemplified by the operation of the spotwise photometric data entry detecting circuit. Initially when the spotwise entry switch SW8 is closed, a pulse signal of "H" level and having a short duration is applied to the input of NOT circuit G10 through the capacitor C3. The RS flipflop formed by NAND circuits G11 and G12 then produces an output of "H" level, applying "1" to the input port 13, informing CPU50 that the spotwise photometry has been selected. After a given time interval, CPU50 produces a pulse-like reset signal of "H" level at its output port 01, thus resetting the RS flipflop. If the time constant determined by the combination of the capacitor C3 and resistor R6 is greater than the given time interval, the RS flipflop is set again even though the reset signal has been outputted, giving rise to the likelihood of a wrong recognition by CPU50 that the spotwise photometry has been selected again. To accommodate for this possibility, the resistor R6 is shunted by the transistor Q70, which is turned on in response to the reset signal, thus forcing the capacitor C3 to be fully charged.

The output port 04 outputs a photometry mode command signal S3. When the signal S3 assumes the "1" level, the average photometry mode is selected in the head amplifier 51, which will be described in detail in connection with FIG. 8, while the "0" level of the signal S3 allows the spotwise photometry mode to be selected. The output port 05 outputs an input select signal S7. When the signal S7 assumes the "1" level, the second selection circuit 57, which will be described in detail later in connection with FIG. 9, outputs the brightness signal S6 as an analog signal S8 which is then subject to A/D conversion, while the "0" level of the signal S7 causes the circuit to output a signal (5V-AV) which is obtained by an analog calculation of a film speed and a diagram aperture as an analog signal S8 which is subject to A/D conversion. The output port 06 determines the sign of each bit from D/A conversion circuit (DAC) 58, and supplies eight bits in parallel. The input port I7 allows an entry of digital information, and is connected to the output of a comparator A12 functioning as the second comparator 59 which forms an A/D conversion circuit of sequential comparison type together with the D/A conversion circuit 58. The inverting input of the comparator A12 is connected to the output of the D/A conversion circuit 58 while its non-inverting input is connected to receive the analog signal S8 which is subject to A/D conversion.

The output port 07 represents a common output of the liquid crystal driver circuit 61 and includes a connection to three lines which are connected to the liquid crystal display panel (LCD) of the photographing information display 39. The output port 08 represents segment outputs for the liquid crystal driver circuit 61 including 39 lines, which are in turn connected to the display panel of the photographing information display 39. The input port I8 has a connection with four input lines which receive an input representing a manual exposure period. The input port I9 has a connection with four lines which receive an input representing a correction value. The both input ports I8 and I9 are connected to the digital exposure information introduction circuit 60. The input port I10 serves one purpose of detecting the presence of a release signal S0. The input port I11 serves the purpose of detecting a trigger signal, and is connected to receive the inversion of a trigger signals S1 through NOT circuit G100. The input port I12 serves the purpose of detecting an exposure terminate signal S13. The input port I13 serves the purpose of detecting an electronic flash power on signal S14. The input port I14 serves the purpose of detecting a flash overexposure signal S9 which indicates whether an exposure provided during a photographing operation with the aid of an electronic flash is an overexposure. The input port I15 serves the purpose of detecting a flash underexposure signal S10 which indicates that an exposure provided during a photographing operation performed with the aid of an electrical flash is an underexposure. The output port 09 outputs a shutter control signal S16 during the memory mode, the manual mode and the spotwide mode. The input port I16 is connected to receive a proper flashlight signal S20, indicating a proper exposure during a photographing operation performed with the aid of an electronic flash, in order to allow the display of a proper exposure to be given for about two seconds after the termination of the emission of flashlight from the electronic flash.

Figure 8:
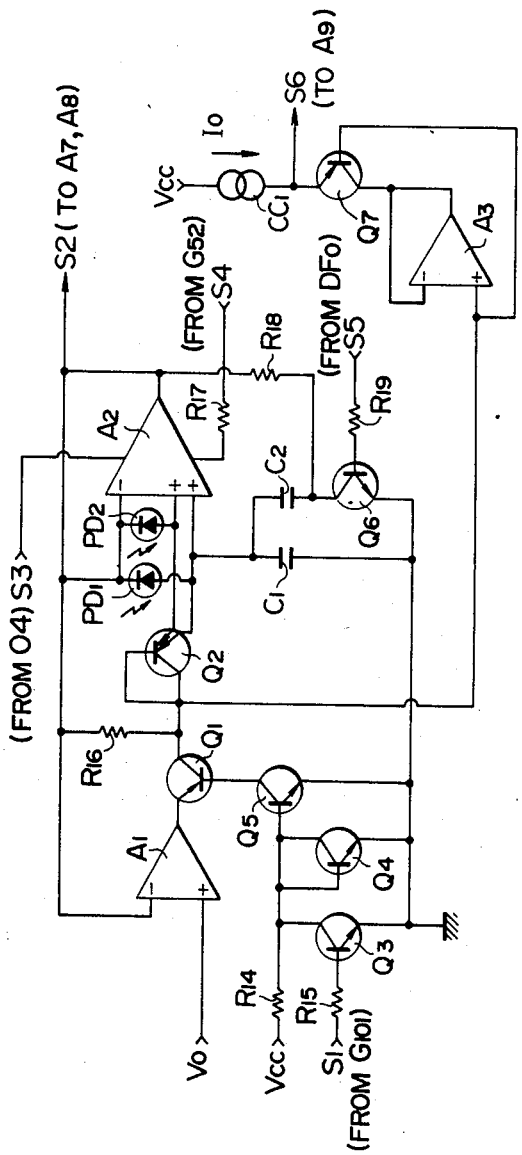
FIG. 8 is a circuit diagram of a head amplifier shown in FIG. 5.

FIG. 8 is a circuit diagram showing the detail of the head amplifier 51. It essentially comprises a circuit which produces brightness information during the open average photometry and during the open spotwise photometry, an integrating circuit which operates during the direct photometry, and an analog switch. It includes an operational amplifier A1 having a bipolar transistor input, and has its non-inverting input connected to receive a reference voltage $V_O$ and its inverting input connected to the output of another operational amplifier A2. The amplifier A1 is arranged to suppress an input offset voltage to be less than 1 mV, without requiring an offset adjustment. The output of the amplifier A1 is connected to the emitter of a PNP transistor Q1, which has its collector connected through a resistor R16 to the output of the amplifier A2 and also connected to the collector and base of a transistor Q2 which provides a logarithmic compression. The transistor Q2 represents a PNP transistor having multiple emitters, one of which is connected to the anode of the photovoltaic element PD1 which is used for average photometry, and the other of which is connected to the anode of the photovoltaic element PD2 which is used for spotwise photometry. The base and collector of the transistor Q2 are also connected to the non-inverting input of an operational amplifier A3. The cathodes of the photovoltaic elements PD1, PD2 are connected to the inverting input of the amplifier A2 while their anodes are connected to separate non-inverting inputs of the amplifier A2. The amplifier A2 has MOS transistor inputs and has a pair of non-inverting inputs, which are selectively effective depending on either the "H" or "L" level assumed by the photometry mode command signal S3 applied to its control signal input. Specifically, when the command signal S3 assumes the "H" level, one of the non-inverting inputs which is connected to the photovoltaic element PD1 becomes effective, maintaining a zero bias across its anode and cathode. In this manner, the potential across the base and collector of the transistor Q2 varies in accordance with the amount of light incident on the photovoltaic element PD1. When the command signal S3 assumes the "L" level, the other non-inverting input becomes effective to maintain a zero bias across the anode and cathode of the photovoltaic element PD2, whereby the potential across the emitter and collector of the transistor Q2 varies in accordance with the amount of light incident on the photovoltaic element PD2. The amplifier A2 also includes another input which is connected through a resistor R17 to receive a bias switching signal S4. When the signal S4 assumes its "H" level during the direct photometry, mode a bias current supplied to the amplifier A2 increases to enable its high speed operation. Conversely, when the signal S4 assumes its "L" level during the memory mode, the bias current supplied to the amplifier A2 reduces to achieve a saving in the power dissipation.

A pair of integrating capacitors C1, C2 which are used during the direct photometry mode have their one end connected to the anode of the photovoltaic element PD1 which is used for the purpose of average photometry. The other end of the capacitor C1 is connected to the ground while the other end of the capacitor C2 is connected to the collector of an NPN transistor Q6, which operates to switch an integrating capacitance. The transistor Q6 has its emitter connected to the ground and has its base connected through a resistor R19 to receive a capacitance switching signal S5. The collector of the transistor Q6 is also connected through a resistor R18 to the output of the amplifier A2. The capacitance switching signal S5 varies in accordance with a film speed, and is produced at the output Q of a latch circuit DFO (see FIG. 9). During the direct photometry, mode an exposure process is terminated when a photometric output S2 representing an integral of the integrating circuit or the output from the amplifier A2 reaches a given voltage level which corresponds to a film speed. The given voltage level may increase to the order of several millivolts as a higher film speed is employed, whereby the circuit is susceptible to the influence of noise such as static electricity. Accordingly, in the circuit shown, when a high film speed is employed, the capacitance switching signal S5 is changed to its "L" level, thus turning the transistor Q6 off. In this manner, the integrating capacitance is formed by the capacitor C1 alone, thus increasing the given voltage level against which an integrated voltage must be compared. Conversely, when a lower film speed is employed, the capacitance switching signal S5 is changed to its "H" level to turn the transistor Q6 on, thus using a parallel combination of the capacitors C1 and C2 for the integrating capacitor, thus reducing the voltage level against which an integrated voltage is compared.

In this manner, the dynamic range is extended. The purpose of connecting the collector of the transistor Q6 to the output of the amplifier A2 through the resistor R18 is to achieve a zero value of the capacitance of the capacitor C2 in practice when the transistor Q6 is turned off.

A buffer operational amplifier A3 has its output connected to the inverting input terminal thereof and also connected to the collector of a PNP transistor Q7. The transistor Q7 has its base connected to the non-inverting input of the amplifier A3 and its emitter connected to one of non-inverting inputs of an operational amplifier A9 (see FIG. 9), which forms the second selection circuit 57, and also connected to one end of a constant current source CC1. The supply voltage Vcc is applied to the other end of the source CC1 so that a constant current flow $I_O$ is maintained therethrough. A voltage which is proportional to the absolute value of a logarithmically compressed photocurrent of either photovoltaic element PD1 or PD2 appears at the emitter of the transistor Q7 and is derived as a brightness signal S6.

The base of the transistor Q1 is connected to the collector of an NPN transistor Q5, the base of which is fed with the supply voltage Vcc through a resistor R14. The emitter of the transistor Q5 is connected to the ground, and connected across the base and emitter of the transistor Q5 are an NPN transistor Q4 which is connected as a diode and another NPN transistor Q3. The base of the transistor Q3 is connected through a resistor R15 to the output of NOT circuit G101 (see FIG. 12) so as to be supplied with the trigger signal S1 therefrom.

In operation, assuming that the trigger signal S1 assumes its "L" level, the transistor Q3 is turned off while the transistor Q5 is turned on, allowing the transistor Q1 to be turned on. Consequently, the output from the amplifier A1 is fed back to its inverting input through a path including the transistors Q1 and Q2 and the amplifier A2, which represents a negative feedback path. Accordingly, the output voltage from the amplifier A2 is equal to the reference voltage $V_O$. A voltage which depends on the amount of light incident on either photovoltaic element PD1 or PD2 is developed at the emitter of the transistor Q7. During direct photometry, the trigger signal S1 turns to its "H" level simultaneously with the initiation of an exposure process, whereby the transistor Q3 is turned on while the transistor Q5 is turned off, thereby turning the transistor Q1 off. Consequently, the negative feedback path comprising the amplifiers A1 and A2 is disconnected, and a potential across the base and collector of the transistor Q2 assumes the same value as the output from the amplifier A2. Accordingly, the capacitors C1 and C2 begin to be charged in accordance with a photocurrent produced by the photovoltaic element PD1. At this time, the voltage across the emitter and base of transistor Q2 is fed by an offset voltage supplied to the amplifier A2, whereby a leakage current across the base and emitter as well as across the emitter and collector of the transistor Q2 are minimized. Since the amplifier A2 has MOS transistor inputs, the charging current to the capacitors C1 and C2 substantially conform to the photocurrent, allowing an exposure period of an increased length to be determined with a high accuracy. As the capacitors C1 and C2 continue to be charged, an integrated output S2 for the direct photometry is developed at the output of the amplifier A2. When the level of the integrated output S2 exceeds the collector potential of a transistor Q20 (see FIG. 9), the output of an operational amplifier A8 (see FIG. 10) reverses, thus terminating an exposure process.

Figure 9:
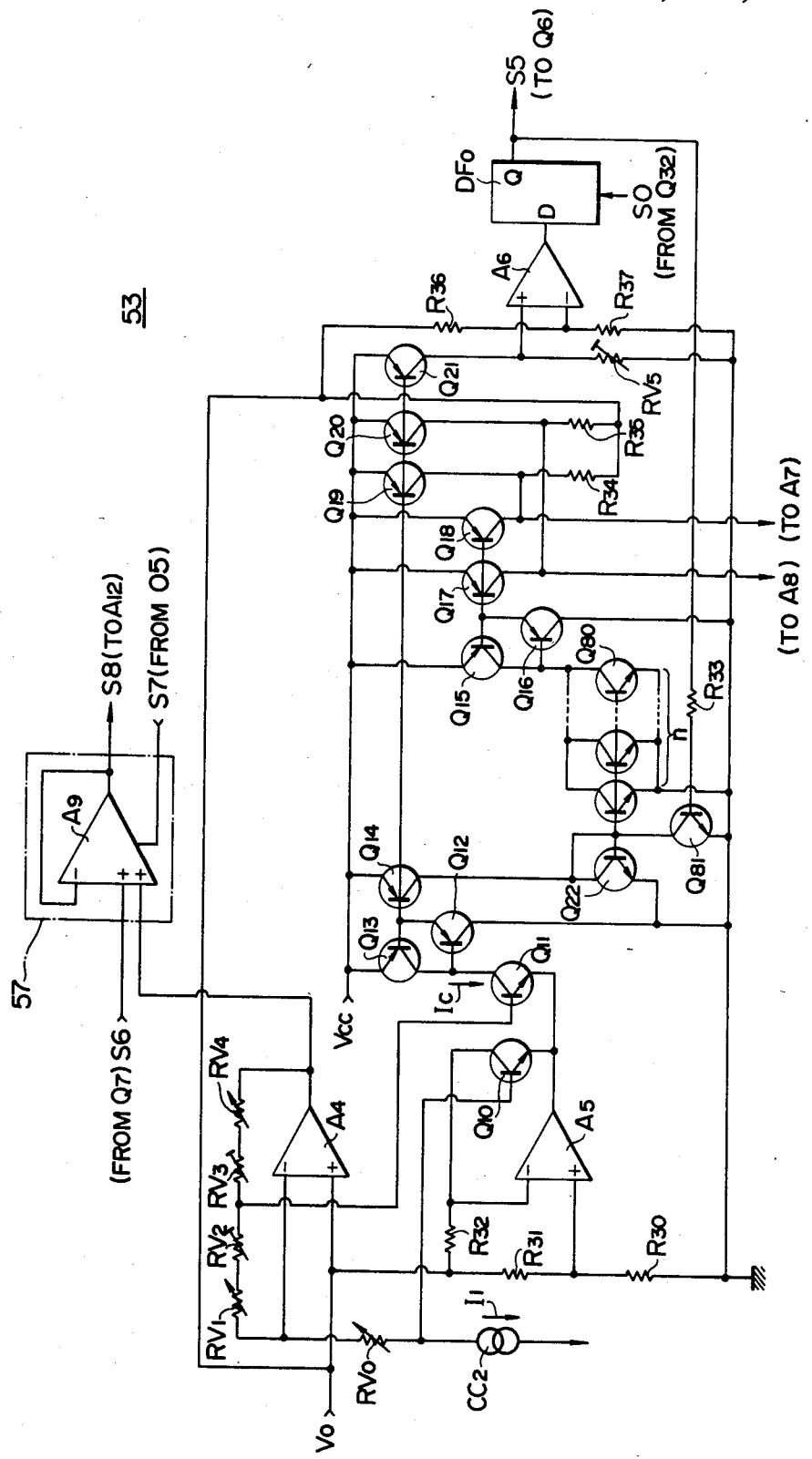
FIG. 9 is a circuit diagram of an analog exposure information introduction circuit and a second selection circuit, both shown in FIG. 5.

FIG. 9 is a circuit diagram showing the detail of the analog exposure information introduction circuit 53 and the second selection circuit 57. As shown, an operational amplifier A4 has a non-inverting input, to which the reference voltage $V_O$ is applied, and an inverting input, to which a current $I_1$ is supplied from a constant current source CC2 which is proportional to the absolute temperature, through a variable resistor RVO which is provided to permit the entry of a correction value. A series combination of a variable resistor RV1 which may be preset in accordance with a film speed, a semi-fixed resistor RV2 which is provided to permit an adjustment of exposure level during the direct photometry, another semi-fixed resistor RV3 which permits an adjustment of display level, and a variable resistor RV4 which permits the entry of diaphragm information is connected across the output and the inverting input of the amplifier A4. As a result, a voltage corresponding to a difference, in analog form, between the value of film speed Sv and diaphragm aperture Av or (Sv - Av) is developed at the output of the amplifier A4 for application to one of the non-inverting inputs of the operational amplifier A9 which forms the second selection circuit 57. The other non-inverting input of the amplifier A9 is fed with the brightness signal S6, which is supplied from the emitter of the transistor Q7 (FIG. 8). The output of the amplifier A9 is connected to the inverting input thereof and is also connected to the non-inverting input of the comparator A12 (FIG. 7). The amplifier A9 has a control signal input which is supplied with the input select signal S7 from the output port 05 (FIG. 7). When the signal S7 assumes its "H" level, the other non-inverting input becomes effective, whereby the brightness signal S6 is outputted from the amplifier A9 as the analog signal S8 which is subject to A/D conversion. When the signal S7 assumes its "L" level, said one non-inverting input becomes effective to permit a voltage corresponding to the calculated value (Sv - Av) to be outputted from the amplifier A9 as the analog signal S8 which is subject to A/D conversion., An operational amplifier A5 and a bank of transistors which follow the amplifier are provided in order to produce a given voltage level against which the output S2 from the integrating circuit must be compared during the direct photometry or the signal which switches the integrating capacitance (C1 and C2) in accordance with a film speed. Specifically, the amplifier A5 has a non-inverting input connected to the junction between a pair of voltage divider resistors R30 and R31, across which the reference voltage $V_O$ is applied. The amplifier A5 has an inverting input which is connected through a resistor R32 to receive the reference voltage $V_O$. An NPN transistor Q10 is connected across the output and the non-inverting input of the amplifier A5, and has its emitter connected to the output and its collector connected to the non-inverting input. The base of the transistor Q10 is connected to the junction between the variable resistor RVO and the constant current source CC2. It will be seen that the other end of the variable resistor RVO is connected to the inverting input of the amplifier A4. The output of the amplifier A5 is also connected to the emitter of an NPN transistor Q11, the base of which is connected to the junction between the semi-fixed resistors RV2 and RV3. The collector of the transistor Q11 is connected to the collector of a PNP transistor Q13 and to the base of a PNP transistor Q12. The supply voltage Vcc is applied to the emitter of the transistor Q13, the base of which is connected to the base of a PNP transistor Q14 and to the emitter of the transistor Q12. The collector of the transistor Q12 is connected to the ground. The supply voltage Vcc is applied to the emitter of the transistor Q14, the collector of which is connected to the collector and base of an NPN transistor Q22. The transistors Q13 and Q14 form a current mirror circuit which allows a current equal to the collector current of the transistor Q11 to be supplied to the collector of the transistor Q22. The transistor Q22 has its emitter connected to the ground and its base connected to the collector of an NPN transistor Q81 and to the bases of a plurality of NPN transistors Q80, which are equal to n in number. In the bank of the transistors Q80, each transistor has its emitter connected to the ground and its collector connected to the collector of a PNP transistor Q15 and to the base of a PNP transistor Q16. It is to be noted that the transistor Q22 as well as each transistor in the bank Q80 form a current mirror circuit, allowing a current which is n times the collector current of the transistor Q22 to be supplied to the collector of the transistor Q15. The transistor Q81 has its emitter connected to the ground and its base connected through a resistor R33 to the output Q of the latch circuit DFO. When the capacitance switching signal S5 produced by the latch circuit DFO assumes its "H" level, the transistor Q81 is turned on while the transistor Q22 and the transistors in the bank Q80 are turned off, reducing the collector current of the transistor Q15 to zero.

The supply voltage Vcc is applied to the emitter of the transistor Q15, which has its base connected to the bases of PNP transistors Q17 and Q18 and to the emitter of the transistor Q16. The collector of the transistor Q16 is connected to the ground. The supply voltage Vcc is applied to the emitter of the transistor Q17, which has is collector connected to the collector of a PNP transistor Q20 and connected to the inverting input of a comparator A8 (see FIG. 10). The supply voltage Vcc is also supplied to the emitter of the transistor Q18, which has its collector connected to the collector of a PNP transistor Q19 and also connected to the inverting input of a comparator A7 (see FIG. 10). The transistors Q15, Q17 and Q18 form a current mirror circuit, whereby a current equal to the collector current of the transistor Q15 is supplied to the collectors of the transistors Q17 and Q18. The supply voltage Vcc is applied to the emitters of the transistors Q19 and Q20, the collectors of which are connected through resistors R34 and R35, respectively, to receive the reference voltage $V_O$. The transistors Q19 and Q20 have their bases connected to the base of the transistor Q13, and thus form a current mirror circuit with respect to the transistor Q13. Accordingly, a current equal to the collector current of the transistor Q13 is supplied to the collector of each transistor Q19 and Q20. It will be seen that the base of the transistor Q13 is also connected to the base of a PNP transistor Q21, which is fed with the supply voltage Vcc at its emitter and which has its collector connected to the ground through a semi-fixed resistor RV5 which permits a point where the integrating capacitance is to be switched to be adjusted. Specifically, the collector of the transistor Q21 is connected to the non-inverting input of a comparator A6, the inverting input of which is connected to the junction between a pair of voltage divider resistors R36 and R37, across which the reference voltage $V_O$ is applied. The output of the comparator is connected to a D input of the latch circuit DFO. In this manner, the comparator A6 determines whether the integrating capacitance should be changed in accordance with a film speed. The latch circuit DFO has a control signal input, to which the release signal SO is applied from the collector of a transistor Q32 (see FIG. 11) to prevent a reversal of the capacitance switching signal S5, produced at its output Q, upon shutter release. It is to be noted that the resistor R34 has a resistance which is equal to $\sqrt{2}$ times the resistance of the resistor R35.

In operation, a voltage which is equal to the sum of the reference voltage $V_O$, and a voltage drop across the series combination of resistors RV1 and RV4, formed by a product of the total series resistance and the constant current $I_1$ which is proportional to the absolute temperature, is developed at the output of the amplifier A4. A voltage which corresponds to a change in a diaphragm aperture or a film speed by one step is approximately 18 mV under constant temperature. Accordingly, the output from the amplifier A4 is not influenced by a voltage drop across the variable resistor RVO which is used to enter a correction value. The transistor Q10 has a base potential which is less than the reference voltage $V_O$ by an amount corresponding to the voltage drop across the resistor RVO. On the other hand, the transistor Q11 has a base potential which is higher than the reference voltage $V_O$ by an amount corresponding to the voltage drop across the series combination of the variable resistor RV1 and the semi-fixed resistor RV2, which are used to preset a film speed and to adjust an exposure level. Accordingly, a difference in the base potential between the transistors Q10 and Q11 corresponds to the film speed and the correction value used. Representing the collector current of the transistor Q11 by Ic, the current flow through each of the resistors R34 and R35 will be equal to $(1+n)$ Ic when the transistor Q81 is turned on. When the variable resistor RV1 has a low value or when a photographic film having a high film speed is employed, the magnitude of the collector current Ic of the transistor Q11 will be reduced, and accordingly, the collector potential of the transistor Q21, represented by the resistance of the variable resistor RV5 multiplied by the collector current Ic of the transistor Q21, will be reduced, whereby the output from the comparator A6 changes to its "L" level. Consequently, the transistor Q81 is turned off, increasing the voltage drop across the resistors R34 and R35. This increases the voltage applied to the inverting inputs of comparators A7, A8. This means that the given voltage level against which an output from the integrating circuit should be compared during the direct photometry is increased, increasing the latitude of the voltage level. Though the latitude of the voltage level increases, the integrating capacitor is reduced to that defined by the capacitor C1 alone, thereby assuring a proper exposure. A particular level of film speed where the switching takes place is previously determined by an adjustment of the semi-fixed resistor RV5. After a shutter release operation, the release signal SO assumes its "H" level to latch the output from the latch circuit DFO since an error in the exposure may be produced as a voltage difference between the two inputs of the comparator A6 decreases to produce an instability in the output from the comparator A6 during the exposure process, such as by noise.

Figure 10:
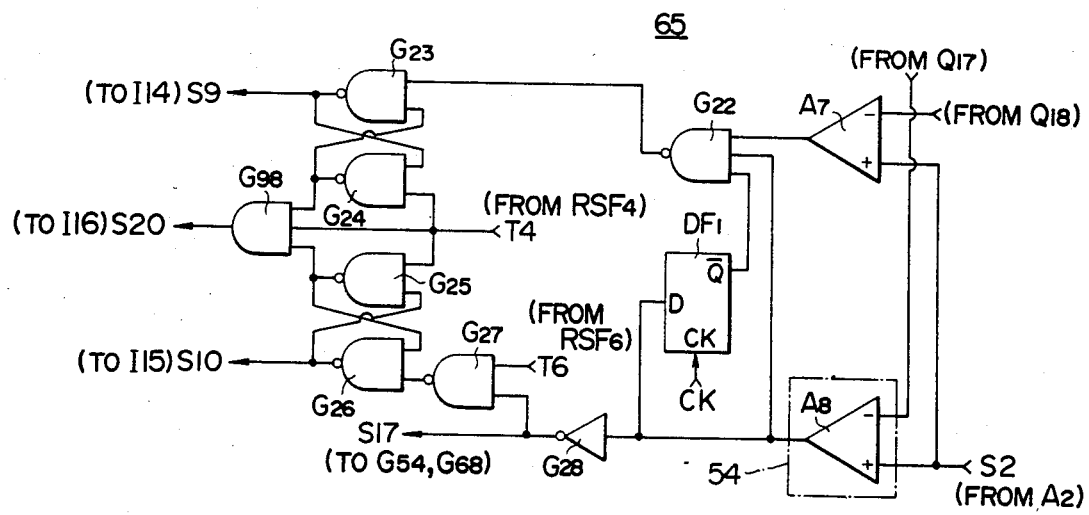
FIG. 10 is a circuit diagram of an over- and underexposure decision circuit associated with an electronic flash and a first comparator, both shown in FIG. 5.
Figure 18:
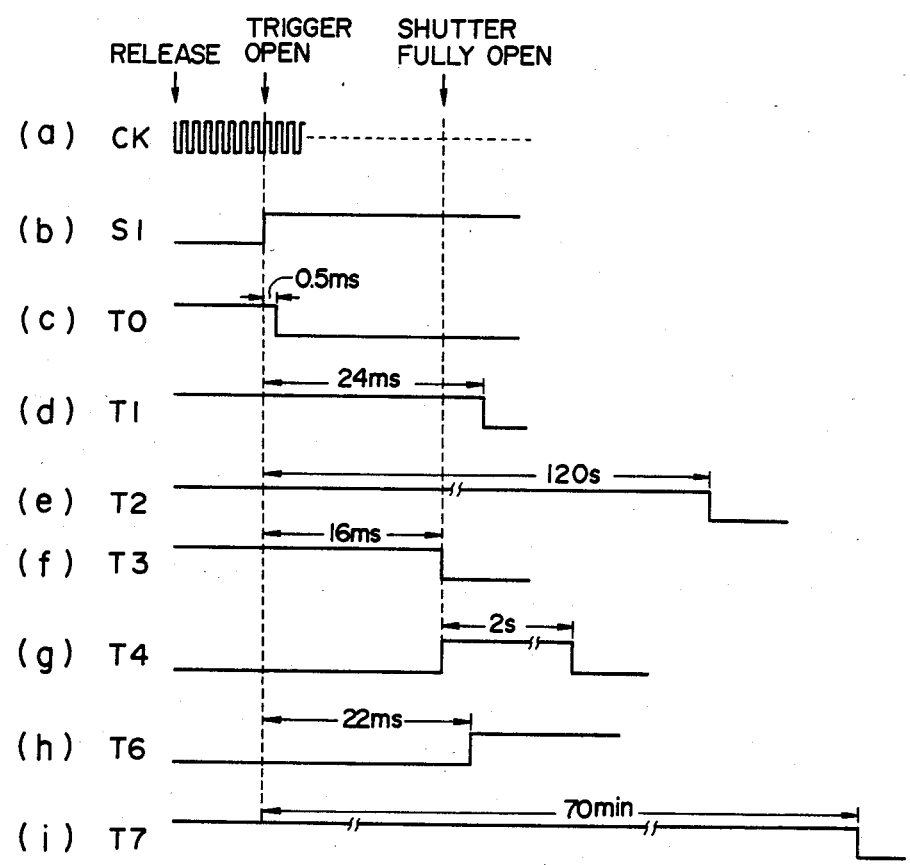
FIGS. 18a and i are a series of timing charts, illustrating the waveform of various timing signals derived from the timer circuit shown in FIG. 16.

FIG. 10 is a circuit diagram showing the detail of the flash over- and under-exposure decision circuit 65 and the first comparator 54. The decision circuit 65 determines whether an exposure level has been an overexposure or an underexposure during a photographing operation performed with the aid of an electronic flash and utilizing direct photometry. It includes comparators A7 and A8 which have their inverting inputs connected to the collectors of the transistors Q18 and Q17 (FIG. 9), respectively, as mentioned previously. The integrated output S2 of the direct photometry which is supplied from the amplifier A2 (FIG. 8) is applied to the non-inverting input of each comparator A7, A8. The output of the comparator A7 is connected to a first input of a three input NAND circuit G22 while the output of the comparator A8 is connected to a second input of NAND circuit G22, a D input of D-type flipflop DF1 and the input of NOT circuit G28. The comparator A8 functions to control the exposure during direct photometry, and defines the first comparator 54 which determines an exposure level to be used during direct photometry by comparing the integrated output S2 from the head amplifier 51 against an output from the analog exposure information introduction circuit 53. The comparator A7 also compares the integrated output S2, but compares it against a level which is chosen to be $\sqrt{2}$ times the decision level used in the comparator A8. This is because the resistance of the resistors R34 and R35 is in the ratio of $\sqrt{2}$. The flipflop DF1 has a clock input to which a clock pulse CK is applied and a $\overline{Q}$ output which is connected to a third input of NAND circuit G22. The output of NAND circuit G22 is connected to one input of NAND circuit G23, which represents a reset input of an RS flipflop formed by a combination of NAND circuits G23 and G24. The RS flipflop has a set input, defined by one input to NAND circuit G24 which is connected to receive an electronic flash charging gate signal T4 from the $\overline{Q}$ output of an RS flipflop RSF4 (see FIG. 16). The output of NAND circuit G23, which represents the output of the RS flipflop, produces the flash overexposure signal S9 of "H" level to be delivered to the input port I14 of CPU50 only during the time the electronic flash charging gate signal T4 remains at its "H" level, if a photographing operation with the aid of the electronic flash in the direct photometry mode results in an overexposure. The output of NAND cricuit G24, which represents the $\overline{Q}$ output of the RS flipflop, is connected to a first input of a three input AND circuit G98. The output of NOT circuit G28 produces a shutter control signal S17 to be delivered to the first selection circuit 55 (see FIG. 15) during the direct photometry. The signal S17 is also supplied to one input of NAND circuit G27, the other input of which receives a flash underexposure limiter signal T6 which is produced at the $\overline{Q}$ output of an RS flipflop RSF6 (see FIG. 16). The output of NAND circuit G27 is applied to one input of NAND circuit G26, which represents the reset input to an RS flipflop formed by a combination of NAND circuits G25 and G26. One input of NAND circuit G25, which represents the set input to the RS flipflop, receives the flash charging gate signal T4. The output of NAND circuit G26, which represents the output of the RS flipflop, produces the flash underexposure signal S10 of "H" level to be delivered to the input port I15 of CPU50 only during the time the flash charging gate signal T4 remains at its "H" level, if a photographing operation with the aid of the electronic flash resulted in an underexposure during the direct photometry. The output of NAND gate G25, which represents the $\overline{Q}$ output of the RS flipflop, is connected to a third input of NAND circuit G98, the second input of which receives the flash charging gate signal T4. The output of AND gate G98 is connected to the input port I16, and produces a flash proper emission signal S20 of "H" level during an interval of about two seconds only when a proper exposure is found after the emission of a flashlight from the electronic flash. Referring to FIG. 18g, it is to be noted that the flash charging gate signal T4 changes to its "H" level at the same time as a flash synchronized timing signal T3 reverts to its "L" level, and then remains at its "H" level for an interval of two seconds. As indicated in FIG. 18h, the flash underexposure limiter signal T6 changes to its "H" level 22 milliseconds after the trigger signal S1 has changed to its "H" level. As shown in FIG. 18a, the clock pulse CK represents a square wave signal which repetitively changes between its "H" and "L" levels at a frequency of 32.768 kHz.

Figure 12:
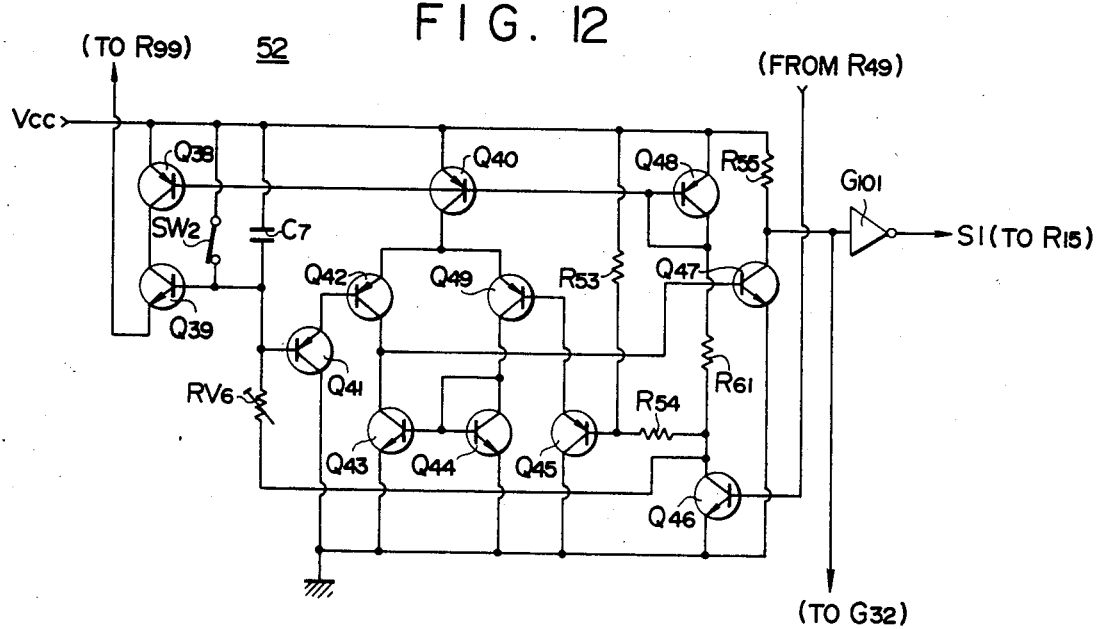
FIG. 12 is a circuit diagram of a trigger timing control circuit shown in FIG. 5.

The operation of the flash over- and under-exposure decision circuit 65 will be described briefly. Immediately after the shutter release, the low magnitude of the integrated output S2 causes the comparator A8 to produce an output of "L" level. At this time, the $\overline{Q}$ output of D-type flipflop DF1 and the output of NOT circuit G28 both assume the "H" level. However, the second input to NAND circuit G22 and one input to NAND circuit G27 both assume "L" level, whereby the output from NAND circuits G22 and G27 assume the "H" level. As will be understood from FIG. 18g, the flash charging gate signal T4 assumes the "L" level immediately after the shutter release and the output signals S9 and S10 from the RS flipflops which represent the overexposure and the underexposure of a photographing operation performed with the aid of the electronic flash are in their "L" level. Assume now that a picture is taken with the camera 10 in its direct photometry mode. When a trigger switch SW2 shown in FIG. 12 is opened, the potential of the integrated output S2 from the head amplifier 51 shown in FIG. 8 increases gradually. When the shutter becomes fully open, and thyristor SCR1, serving as X-contacts shown in FIG. 15 to trigger the electronic flash, is turned on, the flashlight is emitted from the electronic flash. As the potential of the integrated output S2 exceeds the potential at the non-inverting input of the comparator A8, its output changes to its "H" level. Simultaneously, the $\overline{Q}$ output from the flipflop DF1 changes to its "L" level with a time delay corresponding to one clock pulse CK. As a consequence, the inversion of the output from the comparator A7 is developed at the output of NAND circuit G22 for a duration corresponding to one period of the clock pulse CK since the output from the comparator A8 has changed to its "H" level. As mentioned previously, the decision level used in the comparator A7 is chosen to be greater than the decision level used in the comparator A8 by a factor of $\sqrt{2}$, so that if the exposure is equal to or greater than 0.5 Ev within 100 μS, representing one period of the clock pulse CK, since the output of the comparator A8, which when passed through NOT circuit G28 represents the shutter control signal S17, has changed to its "H" level, the output from the comparator A7 will be at its "H" level. Accordingly, the output from NAND circuit G22 will be at its "L" level, causing the RS flipflop comprised of circuit G23, G24 to output the flash overexposure S9 of "H"

level, causing the display to alert the overexposure, as will be further described later.

On the other hand, if the output from the comparator A8 remains at its "L" level 6 milliseconds after the emission of flashlight from the electronic flash, or if the exposure is still at a low level, the flash underexposure limiter signal T6 changes to its "H" level, whereby the output from NAND circuit G27 reverts to its "L" level, causing the RS flipflop comprised of circuits G25, G26 to produce the flash underexposure signal S10 of "H" level. In this manner, a display is provided to alert the underexposure. The decision of the underexposure is delayed since it takes about 6 milliseconds for the second blind of the shutter to move into the image field since the occurrence of the shutter control signal S17.

It is to be understood that a display to alert either the overexposure or the underexposure is given only when taking a picture with the aid of the electronic flash in the direct photometry mode, in accordance with the decision of the photographing mode rendered by CPU50. Such display is interrupted by the reverting of the signals S9 and S10 to their "L" level as a result of the RS flipflops, formed by the combination of NAND circuits G23 and G24 and the combination of NAND circuits G25 and G26, being reset in response to the flash charging gate signal T4 which reverts to its "L" level after two seconds since the emission of the flashlight from the electronic flash.

When a photographing operation resulted in neither overexposure nor underexposure after the emission of the flashlight, the first and the third input to AND circuit G98 assume "H" level, whereby AND circuit G98 outputs the flash proper emission signal S20 of "H" level during the two second interval during which the flash charging gate signal T4 assumes its "H" level. This allows a program contained within CPU50 to provide a display of proper exposure during two seconds for the photographing operation which has taken place with the aid of the electronic flash in the direct photometry mode.

FIG. 11 is a circuit diagram showing the detail of the power supply sustain circuit 67. The purpose of the power supply sustain circuit 67 is to feed the electromagnet driver circuit 56 and the flash control circuit 66 upon shutter release, and to cut off the power supply automatically upon termination of the exposure process. Specifically, the circuit 67 includes a supply battery E1, the positive terminal of which is connected to a bus L1 and the negative terminal of which is connected to a common bus or return line L0. It will be seen that the common bus is connected to the ground. A series circuit including a battery check switch SW5, and resistors R38 and R39 is connected across the buses L1, L0. The battery check switch SW5 is formed by a self-resetting switch which is mechanically interlocked with a movement of the mode changing knob 21 into alignment with the index "CHECK". The junction between the switch SW5 and the resistor R38 is connected to one input of AND circuit G38 (see FIG. 13). The junction between the resistors R38 and R39 is connected to the base of an NPN transistor Q23, the collector of which is connected through a resistor R40 to the base of a PNP transistor Q34 and the emitter of which is connected to the ground or the common bus L0. The transistor Q23 has its base also connected to the collector of an NPN transistor Q24, the emitter of which is connected to the ground and the base of which is connected through a resistor R41 to the collector of a PNP transistor Q25.

The transistor Q25 has its emitter connected to the bus L1 and has its base connected to the bases of PNP transistors Q28, Q29, Q30, Q31, Q32 and Q33. Each of the transistors Q25 and Q29 to Q33 has its emitter connected to the bus L1, forming a current mirror circuit with respect to the transistor Q28.

Figure 13:
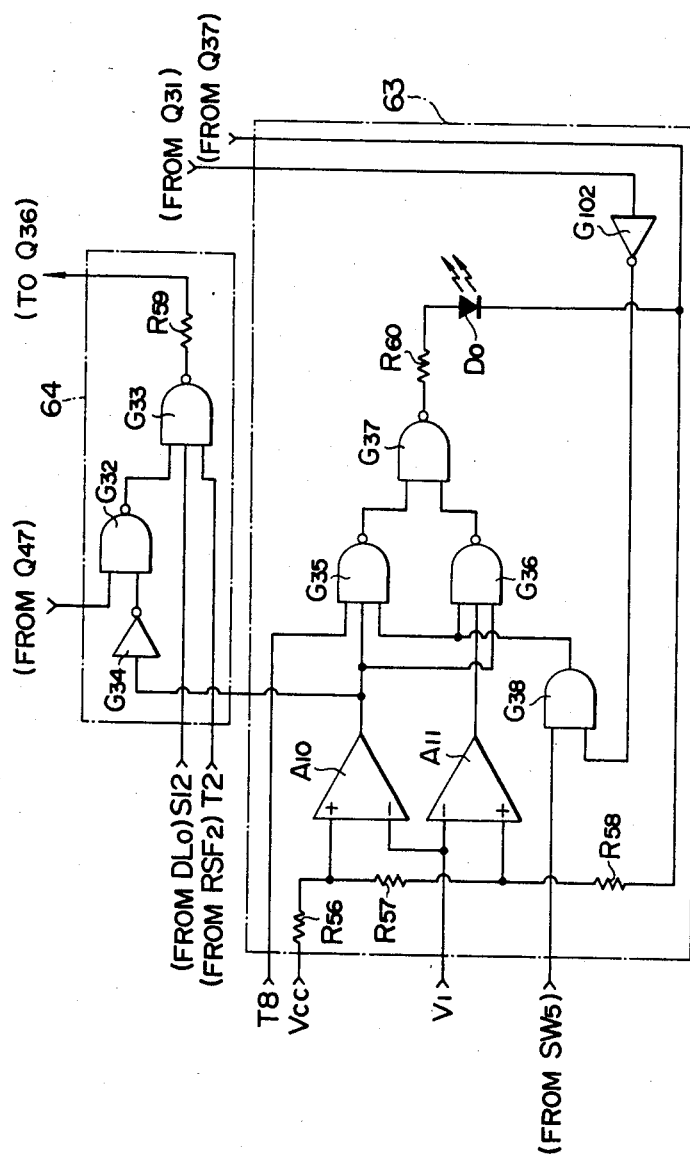
FIG. 13 is a circuit diagram of a battery checker circuit and a power supply reset circuit, both shown in FIG. 5.

Also connected across the buses L1 and L0 is a series circuit including a release switch SW1, capacitor C6 and resistors R44 and R43. The release switch SW1 is mechanically interlocked with the movable reflecting mirror 31, and is closed during the initial phase of the upward movement of the mirror 31 and is opened toward the end of its downward movement. The junction between the release switch SW1 and capacitor C6 is connected to the ground through a resistor R42. The junction between the resistors R44 and R43 is connected to the base of an NPN transistor Q26, which has its emitter connected to the ground and which has its collector connected to the emitter of an NPN transistor Q27. The transistor Q27 has its base connected through a resistor R99 to the emitter of an NPN transistor Q39 (see FIG. 12) and has its collector connected to the collector of an NPN transistor Q35. The transistor Q35 has its collector connected through a resistor R45 to the collector and base of the transistor Q28 and has its emitter connected to the ground while its base is connected through a resistor R46 to the junction between resistors R48 and R47. The resistor R48 has its remote end connected to the collector of the transistor Q29 while the remote end of the resistor R47 is connected to the ground. The junction between the resistors R48 and R47 is also connected to the collector of an NPN transistor Q36, which has its emitter connected to the ground and which has its base connected through a resistor R59 (see FIG. 13) to the output of NAND circuit G33 (see FIG. 13). The transistor Q30 has its collector connected through a resistor R49 to the base of an NPN transistor Q46 (FIG. 12). The collector of the transistor Q31 is connected to the ground through a resistor R50 and is also connected to the input of NOT circuit G102 (FIG. 13). The collector of the transistor Q32 is connected to the ground through a resistor R51 and is also connected to the control signal input of the latch circuit DFO (FIG. 9), thereby supplying the collector voltage of the transistor Q32 thereto as the release signal S0. The collector of the transistor Q33 is connected to the collector of the transistor Q34 and is also connected through a resistor R52 to the base of an NPN transistor Q37. The transistor Q37 has its emitter connected to the ground and its collector connected to one end of the electromagnet driver circuit 56 and the flash control circuit 66, both of which have their other end connected to the common bus L1. Thus, the transistor Q37 functions as a switching transistor which selectively couples the power supply to the driver circuit 56 and the control circuit 66. In addition, the collector of the transistor Q37 is also connected to the cathode of a light emitting diode D0 (FIG. 13) which provides a display of the result of a battery check operation and to one end of a resistor R58 (FIG. 13). The transistor Q34 has its emitter connected to the bus L1 and its base connected through a resistor R40 to the collector of the transistor Q23. The transistor Q34 is forcibly turned on during the battery check operation to enable the battery to be checked under the condition that a maximum current is drawn therefrom by feeding the driver circuit 56 and the control circuit 66.

FIG. 12 is a circuit diagram showing the detail of the trigger timing control circuit 52 which operates to control the timing to initiate the photometry by the head amplifier 51. The trigger switch SW2 is opened in interlocked relationship with the beginning of running of the first blind of the shutter and is closed in interlocked relationship with the completion of a film winding operation. The supply voltage Vcc is applied to one end of the switch, the other end of which is connected to the base of an NPN transistor Q39. The transistor Q39 has its collector connected to the collector of a PNP transistor Q38 and has its emitter connected through a resistor R99 (FIG. 11) to the base of the transistor Q27 (FIG. 11). The transistor Q38 has its emitter connected to receive the supply voltage Vcc and has its base connected to the bases of PNP transistors Q40 and Q48. The trigger switch SW3 is shunted by a trigger timing delay capacitor C7. The terminal of the capacitor C7 connected to the base of the transistor Q39 is connected to the base of a PNP transistor Q41 and also to one end of a time constant semi-fixed resistor RV6, which determines a trigger delay time. The transistor Q41 has its collector connected to the ground and has its emitter connected to the base of a PNP transistor Q42, the emitter of which is connected to the collector of the transistor Q40, the emitter of which is in turn connected to receive the supply voltage Vcc. The collector of the transistor Q42 is connected to the base of an NPN transistor Q47 and also connected to the collector of an NPN transistor Q43. The transistor Q43 has its emitter connected to the ground and has its base connected to the base and collector of an NPN transistor Q44. The transistor Q44 has its emitter connected to the ground and has its collector connected to the collector of a PNP transistor Q49. The transistor Q49 has its emitter connected to the collector of the transistor Q40 and has its base connected to the emitter of a PNP transistor Q45. The transistor Q45 has its collector connected to the ground and has its base connected through a resistor R53 to receive the supply voltage Vdd and also connected through a resistor R54 to the collector of an NPN transistor Q46. The transistor Q46 has its emitter connected to the ground and has its base connected through a resistor R49 (FIG. 11) to the collector of the transistor Q30 (FIG. 11). The collector of the transistor Q46 is connected to the other end of the semi-fixed resistor RV6 and is also connected through a resistor R61 to the collector and base of the transistor Q48. The supply voltage Vcc is applied to the emitter of the transistor Q48, which forms a current mirror circuit with respect to the transistors Q38 and Q40, respectively. The transistor Q47 has its emitter connected to the ground and has its collector connected through a resistor R55 to be fed with the supply voltage Vcc, the collector being also connected to one input of NAND circuit G32 (FIG. 13) and to the input of NOT circuit G101. The combination of the transistors Q40 to Q49 and resistors R53 to R55 and R61 forms together a differential amplifier having a non-inverting input which is defined by the base of the transistor Q41, an inverting input which is defined by the base of the transistor Q46 and an output which is defined by the collector of the transistor Q47. NOT circuit G101, to the input of which the collector of the output transistor Q47 is connected, has its output connected through the resistor R15 (FIG. 8) to the base of the transistor Q3 (FIG. 8), thereby supplying this transistor Q3 with the trigger signal S1 (see FIG. 18b) which changes to its "H" level at a given time interval after the trigger switch SW2 has been opened.

Figure 15:
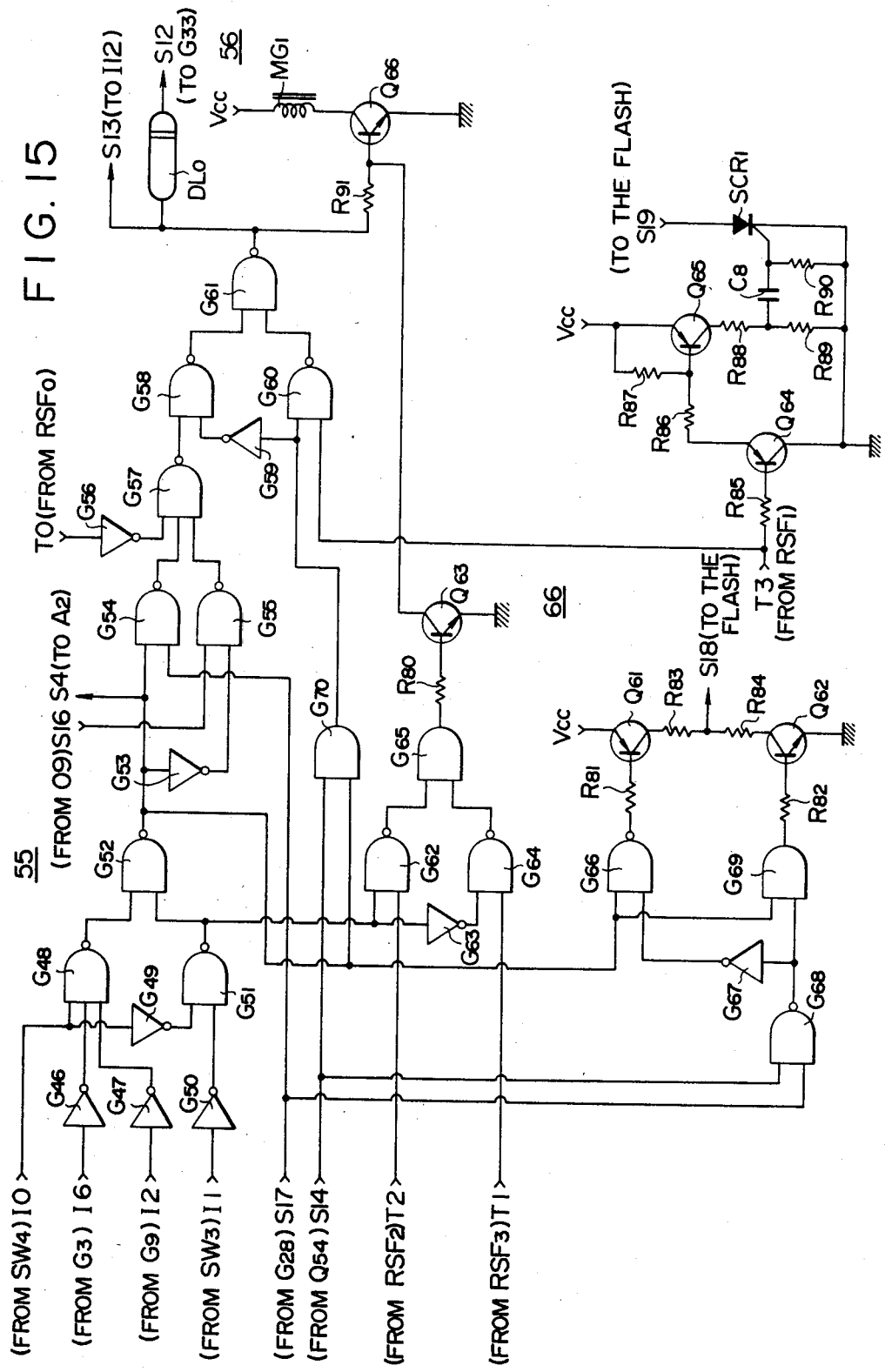
FIG. 15 is a circuit diagram of a first selection circuit, an electromagnet driver circuit and an electronic flash control circuit, all shown in FIG. 5.

FIG. 13 is a circuit diagram showing the detail of the battery check circuit 63 and the power supply reset circuit 64. The power supply reset circuit 64 will be initially considered. The purpose of the reset circuit 64 is to terminate the supply sustaining condition maintained by the power supply sustain circuit 67. The supply sustaining condition is terminated when the supply voltage Vcc is below a given value, when a given time interval has passed since the closure of the shutter, and when the exposure is to be forcibly terminated when it continues over a prolonged period of time. To this end, NAND circuit G33 which represents the output end of the reset circuit 64 has three inputs, including a first input from the output of NAND circuit G32. One input to NAND circuit G32 is connected to the collector of the transistor Q47 (FIG. 12) while the other input is connected through NOT circuit G34 to the output of comparator A10. When the supply voltage Vcc is below a given level, the comparator A10 produces an output of "L" level, whereby NAND circuit G32 produces an output of "L" level, resetting the supply sustaining action. However, it should be understood that since a resetting operation during the exposure process may cause a reduction in the magnitude of the supply voltage Vcc to increase an exposure error or to cause an unstable operation of the second blind retaining electromagnet MG1 (FIG. 15), such resetting operation takes place only before an exposure process is initiated. Specifically, a logical product of the collector voltage (trigger signal) of the transistor Q47 (FIG. 12) and the output from NOT circuit G34 is inverted to form a signal which requires the supply sustaining action to be reset. NAND circuit G33 has a second input, to which a supply reset signal S12 is applied, which is formed by a delayed version of the exposure terminate signal S13 from the delay circuit DLO (FIG. 15). NAND circuit G33 has a third input which is connected to the Q output of an RS flipflop RSF2 (FIG. 16) to receive the auto limiter signal T2 which also serves as the supply limiter signal. The output of NAND circuit G33 is connected through a resistor R59 to the base of the transistor Q36 (FIG. 11).

Figure 16:
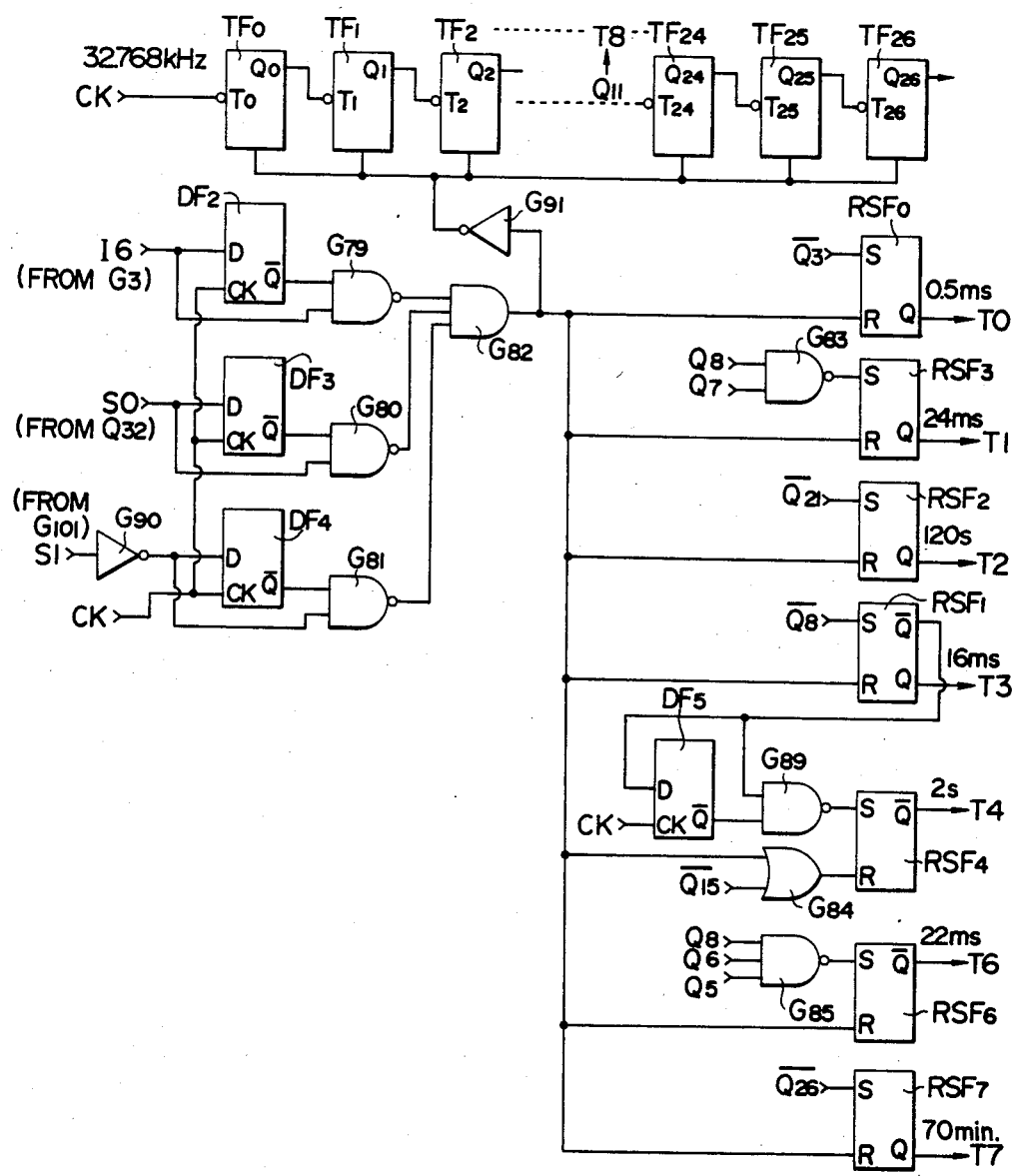
FIG. 16 is a circuit diagram of a timer circuit shown in FIG. 5.

On the other hand, the battery check circuit 63 determines whether or not the supply voltage Vcc is equal to or greater than a given value. The circuit includes a series combination of resistors R56, R57 and R58 having one end connected to receive the supply voltage Vcc. The junction between the resistors R56 and R57 is connected to the non-inverting input of the comparator A10 while the junction between the resistors R57 and R58 is connected to the non-inverting input of a comparator A11. A reference voltage $V_1$ is applied to the inverting input of each of the comparators A10 and A11. The output of the comparator A10 is connected to the second input of a three input NAND circuit G35, a third input of a three input NAND circuit G36 and the input of NOT circuit G34. The output of the comparator A11 is connected to a second input of NAND circuit G36. A flashing period signal T8, which comprises a pulse signal of about 10 Hz fed from a timer circuit 68 shown in FIG. 16, is applied to the first input of NAND circuit G35. The output of AND circuit G38 is connected to the third input of NAND circuit G35 and to the first input of NAND circuit G36. One input of AND circuit G38 is connected to one end of the battery check switch SW5 (FIG. 11) while the other input is connected through NOT circuit G102 to the collector of the transistor G31 (FIG. 11). The outputs of NAND circuits G35 and G36 are connected to respective inputs of NAND circuit G37, the output of which is connected through a resistor R60 to the anode of the light emitting diode DO, which provides a display of the result of a battery checking operation. The diode DO is disposed within the window 23 initially mentioned, and has its cathode connected to the collector of the transistor G37 (FIG. 11).

The operation of the power supply sustain circuit 67, the trigger timing control circuit 52, the supply reset circuit 64 and the battery check circuit 63 will now be described briefly. The depression of the shutter release button 11 (FIGS. 1 and 2) causes its interlocked release switch SW1 to be closed, whereby the transistor Q26 is turned on through the capacitor C6 and resistor R44. Since the trigger switch SW2 is closed at this time, the transistor Q27 is maintained on, which allows the transistor Q28 to be turned on through resistor R45 as are the transistors Q29 and Q35. Once the transistor Q35 is turned on, its base current is supplied from the collector of the transistor Q29 subsequently, thus maintaining the supply sustaining action. When the transistor Q28 is turned on, all of the transistors Q29 to Q33 are turned on, and thus the transistor Q37 is turned on, feeding the electromagnet driver circuit 56 and the flash control circuit 66. In the trigger timing control circuit 52, the transistor Q46 is supplied with its base current through the transistor Q30. When the movable reflecting mirror 31 has completed its upward movement and the first blind of the shutter begins running to open the trigger switch SW2, the base potential of the transistor Q41 decreases gradually to allow the output transistor Q47 to be turned on to change the output from NOT circuit G101 to its "H" level (see FIG. 18) after a delay time which is determined by the time constant of a delay circuit comprising the capacitor C7 and the semi-fixed resistor RV6 as well as the ratio of the resistance of the resistors R53 and R54. The signal of "H" level from NOT circuit G101 is fed through the resistor R15 (FIG. 8) to be applied to the base of the transistor Q3 as the trigger signal S1, thereby turning the transistor Q3 on. The transistors Q5 and Q1 are then turned off, enabling an integrating operation of a photocurrent during direct photometry. Subsequently, the electromagnet MG1 (FIG. 15) which retains the second blind against running is deenergized, allowing the second blind to begin running. At a given time delay after the initiation of running of the second blind, the delay circuit DLO (FIG. 15) produces the supply reset signal S12 of "L" level, whereby NAND circuit G33 produces an output of "H" level to turn the transistor Q36 on. This interrupts the flow of the base current to the transistor Q35, whereby the supply sustaining action is reset. Specifically, as the transistor Q35 is turned off, the transistors Q28, Q33 and Q37 are sequentially turned off, interrupting the power supply to the electromagnet driver circuit 56 and the flash control circuit 66.

When the supply voltage Vcc is below a given value, the comparator A10 produces an output of "L" level, whereby the output of NAND circuit G32 reverts to its "L" level since its one input is normally maintained at its "H" level. This turns the transistor Q36 off (through gate G33), whereby the supply sustaining action is reset in a manner similar to that mentioned above. If the magnitude of the supply voltage Vcc is reduced during the exposure process, an exposure error will increase or the operation of the electromagnet MG1 (FIG. 15) which retains the second blind will become unstable. To prevent these occurrences, resetting of the supply sustaining action due to a reduction in the magnitude of the supply voltage Vcc is prevented during the exposure process. Specifically, during the exposure process, the collector voltage of the transistor Q47 which represents the trigger signal is at its "L" level, and hence this signal is utilized by forming its logical product with the inversion of the output from the comparator A10 so as to be supplied to the first input of NAND circuit G33. Accordingly, the resetting of the supply sustaining action due to a reduction in the magnitude of the supply voltage Vcc takes place before the trigger switch SW2 is opened. If the resetting occurs before the trigger switch SW2 is opened, the movable reflecting mirror 31 is mechanically locked in the course of its upward movement.

The power supply sustain circuit 67 is arranged so that its sustaining action is forcibly interrupted when the exposure period exceeds a given value as when taking a picture under a very low brightness. This is because it is recognized that the dissipation of the supply battery E1 had better be prevented rather than allowing a photographing operation to be continued if the exposure period continues as long as several minutes. To this end, the auto limiter signal T2 which also serves as the supply limiter signal is supplied to the third input of NAND circuit G33. As shown in FIG. 18e, the signal T2 reverts to its "L" level at a given time interval (120 seconds) after the trigger swtich is opened, thus resetting the supply sustaining action in the manner mentioned above.

It will be noted that the emitter of the transistor Q39 feeds a signal to the transistor Q27 through a resistor R99. The purpose of the connection is to prevent the supply sustain circuit 67 from resuming the supply sustaining condition which might occur as a result of a chattering of the release switch SW1 when it is opened during the downward movement of the movable reflecting mirror 31, by turning the transistor Q27 off while the trigger switch SW2 is open.

When it is desired to check the battery, the mode changing knob 21 (FIG. 2) is turned into alignment with the index "CHECK". This turns the battery check switch SW5 on, supplying "H" level to one input of NAND circuit G38. NAND circuit G38 produces an output of "H" level since NOT circuit G102 produces an output of "H" level when the supply sustain circuit 67 is not in its supply sustaining condition, namely, during the normal time when the shutter release operation does not take place. In a first instance, which represents a normal condition, the supply voltage Vcc may be equal to or above a given value. In this instance, the comparators A10 and A11 both produce outputs of "H" level, whereby NAND circuit G35 outputs the flashing period signal T8, and NAND circuit G36 produces an output of "L" level. As a consequence, the "L" level output from NAND circuit G36 is predominant, and NAND circuit G37 produces an output of "H" level, allowing the light emitting diode DO to be illuminated in order to indicate that the supply voltage Vcc is equal to or above a given value. In a second instance, the supply voltage Vcc may be equal to or above a given value, but may be below another given value. Specifically, the potential at the junction between the resistors R56 and R57 may be higher than the reference voltage $V_1$, but the potential at the junction between the resistors R57 and R58 may be lower than the reference voltage. In this instance, the comparator A10 produces an output of "H" level while the comparator A11 produces an output of "L" level. Thus, NAND circuit G36 produces an output of "H" level while NAND circuit G35 outputs the flashing period signal T8. Accordingly, NAND circuit G37 now outputs the flashing period signal T8, which causes the light emitting diode DO to be flashed at a frequency of about 10 Hz. In this manner, the fact that the supply voltage Vcc tends to be reduced is displayed, urging an operator to change the supply battery E1. In a third instance, the supply voltage Vcc may be reduced below said another given value to prevent the electrical circuit within the camera 10 from operating properly. In this instance, the comparators A10 and A11 both produce outputs of "L" level, whereby NAND circuits G35 and G36 both produce outputs of "L" level. This in turn causes NAND circuit G37 to produce an output of "L" level. Hence, the light emitting diode DO remains deenergized, indicating that the supply voltage Vcc is less than the given value.

When the mode changing knob 21 is operated to close the battery check switch SW5 in the course of the shutter release operation, NOT circuit G102 produces an output of "L" level, whereby NAND circuit G38 produces an output of "L" level. This causes NAND circuit G37 to produce an output of "L" level, preventing an operation of the light emitting diode DO. As mentioned previously, during the battery check operation, the transistor Q23 operates to turn the transistor Q34 on forcibly to cause a forced energization of the electromagnet driver circuit 56 and the flash control circuit 66, thus performing the battery check operation under the condition that a current dissipation is at its maximum.

Figure 14:
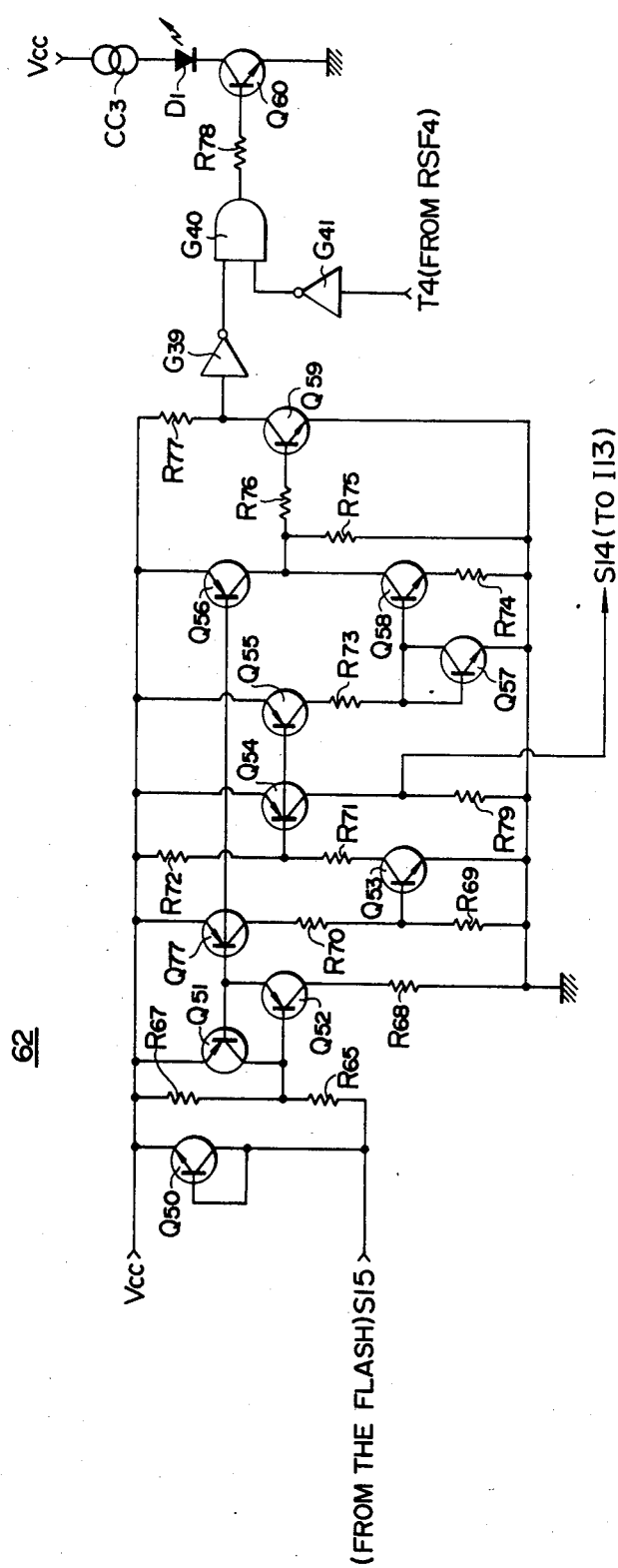
FIG. 14 is a circuit diagram of a decision circuit associated with an electronic flash shown in FIG. 5.

FIG. 14 is a circuit diagram showing the detail of the flash decision circuit 62. The flash decision circuit 62 operates to determine whether or not a power source within the electronic flash is turned on and whether a charging operation of the electronic flash is completed, by detecting the current level of a signal S15 which is supplied from the electronic flash through a single signal line. An NPN transistor Q50 is connected in a diode configuration, and is fed with the supply voltage Vcc at its emitter while its collector and base are adapted to be connected to the electrical circuit of an electronic flash, not shown, through an electrical contact provided on the flash mounting shoe 24 or flash interconnecting connector 25 (see FIGS. 1 and 2). A series combination of resistors R67 and R65 is connected in shunt with the transistor Q50. The resistor R67 is shunted by a PNP transistor Q51 having its emitter connected to the supply voltage and collector connected to the junction between the resistors R67 and R65. The collector of the transistor Q51 is also connected to the base of a PNP transistor Q52 while the base of the transistor Q51 is connected to the emitter of the transistor Q52 and to the base of PNP transistors Q77 and Q56. The collector of the transistor Q52 is connected to the ground through a resistor R68. The supply voltage Vcc is applied to the emitter of the transistor Q77, the collector of which is connected to the ground through a series combination of resistors R70 and R69. The junction between the resistors R70 and R69 is connected to the base of an NPN transistor Q53, the emitter of which is connected to the ground and the collector of which is connected to the supply voltage Vcc through a series combination of resistors R71 and R72. The junction between the resistors R71 and R72 is connected to the bases of PNP transistors Q54 and Q55. The supply voltage Vcc is applied to the emitter of the transistors Q54, the collector of which is connected to the ground through a resistor R79. The collector of the transistor Q54 is connected to a signal line which conveys the flash power on signal S14 for application to the input port I13 of CPU50 (FIG. 7). The supply voltage Vcc is applied to the emitter of the transistor Q55, the collector of which is connected through a resistor R73 to the base and collector of an NPN transistor Q57 and to the base of an NPN transistor Q58. The emitter of the transistor Q57 is connected to the ground while the collector of the transistor Q58 is connected to the collector of the transistor Q56 and the emitter of the transistor Q58 is connected to the ground through a resistor R74. The supply voltage Vcc is applied to the emitter of the transistor Q56, the collector of which is connected to the ground through a resistor R75 and also connected through a resistor R76 to the base of an NPN transistor Q59. The supply voltage Vcc is applied to the collector of the transistor Q59 through a resistor R77, and the emitter of the transistor Q59 is connected to the ground. The collector of the transistor Q59 is connected to the input of NOT circuit G39, the output of which is connected to one input of AND circuit G40. The other input of AND circuit G40 is connected to the $\bar{Q}$ output of the RS flipflop RSF4 (FIG. 16) through NOT circuit G41 so as to be fed with the inversion of the flash charging gate signal T4. The output of AND circuit G40 is connected through a resistor R78 to the base of an NPN transistor Q60, the emitter of which is connected to the ground and the collector of which is connected to the cathode of a light emitting diode D1, which operates to indicate the completion of a charging operation within the electronic flash. The diode D1 is assembled into the photographing information display 39 and is operative, when energized, to display a lightning symbol " ⚡ " to indicate the completion of a charging operation within the electronic flash. The anode of the diode D1 is connected to one end of a constant current source CC3, the other end of which is connected to receive the supply voltage Vcc.

In operation, when a power switch of the electronic flash, not shown, is turned on, a flash power source signal S15 having a magnitude on the order of about 10 $\mu$A flows toward the electronic flash. This turns the transistor Q52 on, followed by successive turn-on of the transistors Q51, Q77, Q53 and Q54. Accordingly, the collector of the transistors Q54 assumes its "H" level. The transistors Q55, Q56 and Q58 are also turned on, but the transistor Q59 remains off because the magnitude of the base current of the transistor Q56 is low for the source signal S15 on the order of 10 $\mu$A to prevent its collector potential from rising high enough to provide sufficient base current to the transistor Q59. Accordingly, NOT circuit G39 produces an output of "L" level as is the output from AND circuit G40, preventing the transistor Q60 from being turned on to cause an illumination of the diode D1. Subsequently, when charging operation within the electronic flash is completed, the flash charging signal S15 on the order of about 100 $\mu$A flows toward the electronic flash. This allows the collector potential of the transistor Q56 to rise sufficiently to supply sufficient base current to the transistor Q59, which is therefore turned on. This reduces the collector potential of the transistor Q59 to cause NOT circuit G39 to produce an output of "H" level. Since the flash charging gate signal T4 remains at its "H" level for a time interval of about two seconds since the initiation of emission of flashlight from the electronic flash, AND circuit G40 produces an output of "L" level during a two second interval after the emission of flashlight from the electronic flash. However, AND circuit G40 produces an output of "H" level at other times, thus turning the transistor Q60 on. This allows the diode D1 to be fed from the constant current circuit CC3 for illumination, thus indicating the completion of the charging operation within the electronic flash. The reason that the display of the completion of the charging operation is inhibited during the two second interval after the emission of flashlight from the electronic flash is because it is necessary to disable the operation of the diode D1 inasmuch as a proper exposure signal having a magnitude of about 100 $\mu$A is fed from the electronic flash after the emission of flashlight, in an on-and-off manner, through the same signal line on which the source signal and the flash charging signal S15 are conveyed. The display of a proper exposure is given by a flashing of the liquid crystal display panel in the photographing information display 39, as will be described later.

FIG. 15 is a circuit diagram showing the detail of the selection circuit 55, the electromagnet driver circuit 56 and the flash control circuit 66 shown in FIG. 5. The first selection circuit 55 determines which of a shutter control signal S17 produced by the direct photometry or the shutter control signal S16 outputted by CPU50 should be used to control the electromagnet driver circuit 56 in accordance with a photographing mode selected. It includes NAND circuit G48 having a first input which is connected to one end of the auto switch SW4 (FIG. 7). Accordingly, the signal to this input will be at its "H" level only during the automatic mode, and is the same as that supplied to the input port IO of CPU50. NAND circuit G48 has a second input which is connected to the output of NAND circuit G3 (FIG. 7) through NOT circuit G46 and which receives the inversion of the same signal as that supplied to the input port 16 of CPU50, which assumes its "H" level only during the memory mode. NAND circuit G48 has a third input which is connected to the output of NAND circuit G9 (FIG. 7) through NOT circuit G47 and which thus receives the inversion of the same signal as that supplied to the input port I2 of CPU50, which assumes its "H" level only during the spotwise mode. Accordingly, NAND circuit G48 receives three inputs of "H" level during the automatic mode and when neither the memory mode nor spotwise mode is selected, or when the average photometry, direct automatic mode is selected. At such time, it produces an output of "L" level. NAND circuit G51 has one input which is supplied with the signal applied to the first input of NAND circuit G48, as inverted by NOT circuit G49. The other input of NAND circuit G51 is connected to one end of the manual switch SW3 (FIG. 7) through NOT circuit G50, and thus receives the same signal as applied to the input port I1 of CPU50 which assumes its "H" level only during the manual operation, as inverted by NOT circuit G50. Thus NAND circuit G51 is enabled to produce an output of "L" level when neither the automatic mode nor the manual mode is selected, namely, only when the off mode is selected. The output of NAND circuit G48 is connected to one input of NAND circuit G52 while the output of NAND circuit G51 is connected to the other input of NAND circuit G52 and also connected to one input of NAND circuit G62 and connected through NOT circuit G63 to one input of NAND circuit G64. The output of NAND circuit G52 is connected to one input of AND circuit G70: and to one input of each of NAND circuit G66 and AND circuit G69. The output of NAND circuit G52 is also connected to one input of NAND circuit G54 and also connected through NOT circuit G53 to one input of NAND circuit G55. The output of NAND circuit G52 is at its "H" level whenever either output from NAND circuit G48 or G51 assumes its "L" level. Thus a discrimination is made between the average direct photometry, automatic mode or the off mode on one hand and other photographing modes on the other, and NAND circuit G52 produces an output of "H" level only during the average photometry, direct automatic mode or the off mode. This leads to the consequence that during the off mode, the maximum length of the exposure period is controlled, and the photographing operation takes place in the same manner as the average photometry, direct automatic mode in other respects. The output of NAND circuit G52 is fed as the bias switching signal S4 to the operational amplifier A2 (FIG. 8) to switch the bias current in the amplifier A2 in accordance with the photographing mode selected, as mentioned previously.

The other input to NAND circuit G54 is connected to the output of NOT circuit G28 (FIG. 10) so as to receive the shutter control signal S17 which is produced in accordance with the result of the direct photometry. The other input to NAND circuit G55 is connected to the output port 09 of CPU50 (FIG. 7) so as to receive the shutter control signal S16 which is produced during the memory, the manual and the spotwise mode. The output of NAND circuit G54 is connected to a second input of a three input NAND circuit G57, and the output of NAND circuit 55 is connected to a third input of the three input NAND circuit G57. The first input of NAND circuit G57 is connected to the Q output of an RS flipflop RSFO (FIG. 16) through NOT circuit G56 so as to receive the inversion of a high speed limiter signal TO (see FIG. 18c) which is maintained at its "H" level for an interval of about 500 $\mu$S after the trigger is opened. The high speed limiter signal TO determines the minimum exposure period. Specifically, assuming that the average photometry, direct automatic mode or the off mode is selected, the output from NAND circuit G54 remains at its "L" level only during the interval that the shutter control signal S17 produced in accordance with the result of the direct photometry assumes its "H" level. On the other hand, the output from NAND circuit G55 is at its "H" level independently from the level of the shutter control signal S16 which is produced during the manual mode or the like. Consequently, the output from NAND circuit G57 is controlled by the output from NAND circuit G54 if the output of NOT circuit G56 is at its "H" level, and assumes its "H" level only when the shutter control signal S17 is at its "H" level. In other words, the output of NAND circuit G57 produces the shutter control signal S17 which is produced in accordance with the result of the direct photometry. In a similar manner, the output of NAND circuit G57 produces the shutter control signal S16 during the memory hold, the manual mode and the spotwise mode. Referring to FIG. 18c, it will be seen that the high speed limiter signal TO is maintained at its "H" level for an interval of about 500 $\mu$S after the trigger has been opened. Hence, during such interval, the output from NAND circuit G57 assumes its "H"

level independently of the outputs from NAND circuits G54 and G55, thus preventing the electromagnet MG1 which constrains the second blind from being deenergized. In this manner, the minimum exposure period is limited by the signal TO to 1/2000 second.

The other input to AND circuit G70 is connected to the collector of the transistor G54 (FIG. 14) so as to receive the flash power on signal S14 therefrom. The output of AND circuit G70 is connected to one input of NAND circuit G60 and is also connected through NOT circuit G59 to one input of NAND circuit G58, the other input of which is connected to the output of NAND circuit G57. The other input to NAND circuit G60 is connected to the Q output of an RS flipflop RSF1 (FIG. 16) so as to receive the flash synchronized timing signal T3 therefrom. The timing signal T3 is maintained at its "H" level for an interval of 16 milliseconds after the opening of the trigger, as indicated in FIG. 18f. The output of NAND circuit G58 is connected to one input of NAND circuit G61, the other input of which is connected to the output of NAND circuit G60. Assume now that either the average photometry, direct automatic mode or the off mode is selected and the power source of the electronic flash is not turned on or the electronic flash is not mounted on the camera 10. At this time, the flash power on signal S14 is at its "L" level, whereby the same signal as the output signal from NAND circuit G57 is outputted from NAND circuit G61. If the electronic flash is then mounted on the camera and its power source turned on, the power on signal S14 changes to its "H" level, whereby NAND circuit G61 outputs the flash synchronized timing signal T3. This establishes an exposure period which is equal to a constant value of 1/60 second. During a photographing mode other than the average photometry, mode direct automatic mode or the off mode, the output of AND circuit G70 changes to its "L" level, and the flash synchronized timing signal T3 has nothing to do with the shutter control. The purpose of causing the emission of flashlight from the electronic flash with an exposure period synchronized with the operation of the flash as long as the power source of the electronic flash is maintained on is to provide a correction of the prior art practice which adopted a scheme to inhibit the emission of flashlight from the electronic flash whenever an exposure period is less than about 1/60 second. Specifically, in conventional cameras, when an object being photographed is under a bright illumination and the resulting exposure period is short, the emission of flashlight from the electronic flash is inhibited because it is almost unnecessary to flash and because this results in a saving in the power dissipation of the electronic flash. However, such practice may result in an inconvenience by failing to comply with the intended composition of a photographer. Accordingly, the exposure period is forcibly synchronized with the operation of the electronic flash, which is caused to emit flashlight.

The output of NAND circuit G61 is connected through a resistor R91 to the base of an NPN transistor Q66 having its emitter connected to the ground and its collector connected to receive the supply voltage Vcc through the coil of the electromagnet MG1 which constrains the second blind of the shutter in the electromagnet driver circuit 56. As mentioned previously, the supply voltage Vcc is applied to the transistor Q66 only during the time the supply sustain circuit 67 (FIG. 11) maintains the supply sustaining condition. The output of NAND circuit G61 is also connected to the input port I12 of CPU50 (FIG. 7) to supply an exposure terminate signal S13 thereto. The output of NAND circuit G61 is also connected to the second input of NAND circuit G33 (FIG. 13) through the delay circuit DLO. In this manner, the output of NAND circuit G61 is delayed by a given time interval by the delay circuit DLO before it is supplied to NAND circuit G33 as the supply reset signal S12. The purpose of providing the delay circuit DLO is to assure a proper functioning of the flash control circuit 66 since both the electromagnet driver circuit 56 and the flash control circuit 66 are fed from the supply sustain circuit 67 (FIG. 11) and hence the direct application of the exposure terminate signal S13 from NAND circuit G61 to the supply sustain circuit 67 may interfere with the functioning of the flash control circuit 66.

The output of NAND circuit G51 is connected to one input of AND circuit G62 and also connected through NOT circuit G63 to one input of NAND circuit G64, as mentioned previously. The other input of NAND circuit G62 is connected to the Q output of the RS flipflop RSF2 (FIG. 16) to be fed with the auto limiter signal T2 therefrom. Referring to FIG. 18e, it will be seen that the auto limiter signal T2 is maintained at its "H" level during an interval of 120 seconds after the trigger has been opened, thus defining the maximum length of the exposure period during the automatic mode. The other input of NAND circuit G64 is connected to the Q output of an RS flipflop RSF3 (FIG. 16) so as to be fed with an off limiter signal T1 therefrom. Referring to FIG. 18d, it will be seen that the off limiter signal T1 is maintained at its "H" level during an interval of 24 milliseconds after the trigger has been opened, thus determining an exposure period which should be used during the off mode. The output of NAND circuit G62 is connected to one input of AND circuit G65, the other input of which is connected to the output of NAND circuit G64. The output of AND circuit G65 is connected through a resistor R80 to the base of an NPN transistor Q63 which has its emitter connected to the ground and which has its collector connected to the base of the transistor Q66. When the output from NAND circuit G51 is at its "L" level or during the off mode, the output from NOT circuit G63 will be at its "H" level, whereby AND circuit G65 outputs the inversion of the off limiter signal T1. Consequently, when 24 milliseconds pass since the opening of the trigger, the transistor Q63 is turned on, and the transistor Q66 is turned off to deenergize the electromagnet MG1 to thereby close the shutter, independently from the output of NAND circuit G61. During a photographing mode other than the off mode, AND circuit G65 outputs the inversion of the auto limiter signal T2. Consequently, when about two minutes pass since the opening of the trigger, the transistor Q63 is turned on, thus forcibly closing the shutter in a similar manner.

Considering now the flash control circuit 66, it includes a PNP transistor Q64 having its base connected through a resistor R85 to Q output of the RS flipflop RSF1 (FIG. 16) so as to be fed with the flash synchronized timing signal T3 therefrom. The transistor Q64 has its collector connected to the ground and its emitter connected through a resistor R86 to the base of a PNP transistor Q65. The transistor Q65 has its base connected to the emitter thereof through a resistor R87, to which the supply voltage Vcc is applied. The collector of the transistor Q65 is connected to the ground through a series combination of resistors R88 and R89, with a junction therebetween being connected through a capacitor C8 to the gate of a thyristor SCR1 which is used to trigger the electronic flash. The gate is also connected to the ground through a resistor R90 while the cathode of the thyristor is directly connected to the ground. The anode of the thyristor SCR1 is adapted to be connected to the electrical circuit of the electronic flash through the flash mounting shoe 24 (FIG. 2) or the connector 25 (FIG. 1). A flash emit signal S19 is transmitted to the electronic flash whenever the thyristor SCR1 is to be fired. Assuming that the electronic flash is mounted on the camera 10 and the charging operation therein has been completed, the depression of the shutter release button 11 (FIGS. 1 and 2) allows the first blind of the shutter to begin running. When about 16 milliseconds pass since the opening of the trigger, the flash synchronized timing signal T3 assumes its "L" level, whereby the transistor Q64 is turned on as is the transistor Q65, thus applying a pulse voltage to the gate of thyristor SCR1 through the capacitor C8, thus turning the thyristor on. Thereupon, a trigger current passes through the thyristor SCR1 from the electronic flash in the form of a flash emit signal S19, thereby causing the electronic flash to emit flashlight.

NAND circuit G68 has one input which is connected to the collector of the transistor Q54 (FIG. 14) so as to be fed with the flash power on signal S14, and has the other input which is connected to the output of NOT circuit G28 (FIG. 10) so as to be fed with the shutter control signal S17 which is produced in accordance with the result of the direct photometry. The output of NAND circuit G68 is connected to one input of AND circuit G69 and also connected through NOT circuit G67 to one input of NAND circuit G66. The other input of each of NAND circuit G66 and AND circuit G69 is connected to the output of NAND circuit G52. The output of NAND circuit G66 is connected through a resistor R81 to the base of a PNP transistor Q61 while the output of AND circuit G69 is connected through a resistor R82 to the base of an NPN transistor Q62. The supply voltage Vcc is applied to the emitter of the transistor Q61, which has its collector connected to the collector of the transistor Q62 through a series combination of resistors R83 and R84. The transistor Q62 has its emitter connected to the ground. The junction between the resistors R83 and R84 is adapted to be connected to the electrical circuit of the electronic flash through an electrical contact of the flash mounting shoe 24 (FIG. 2) or the connector 25 (FIG. 1), thus transmitting an emission control signal S18 to the electronic flash. During the average photometry mode, direct automatic mode or the off mode, NAND circuit G52 produces an output of "H" level, so that both NAND circuit G66 and AND circuit G69 are enabled, whereby AND circuit G69 passes the output signal from NAND circuit G68 therethrough while NAND circuit G66 outputs the inversion of the output from NAND circuit G68. When a picture is to be taken in the direct photometry mode with the aid of the electronic flash which is mounted on the camera 10, the flash power on signal S14 assumes its "H" level, and hence NAND circuit G68 outputs the inversion of the shutter control signal S17 which is produced in accordance with the result of the direct photometry. If the shutter release button 11 (FIGS. 1 and 2) is now depressed to allow the first blind of the shutter to begin running to initiate the exposure process, the shutter control signal S17 assumes its "H" level before the proper exposure is reached. Accordingly, NAND circuit G66 produces an output of "L" level as is the output from AND circuit G69. Accordingly, the transistor Q61 is turned on while the transistor Q62 is turned off, whereby the junction between the resistors R83 and R84 is electrically connected with the power supply through the resistor R83, producing the emission control signal S18 of "H" level. When the electronic flash emits flashlight and the exposure reaches a proper level, the shutter control signal S17 reverts to its "L" level. This turns the transistor Q61 off and turns the transistor Q62 on, thus changing the emission control signal S18 to its "L" level. This operates on the emission control circuit, not shown, within the electronic flash to cease the emission of flashlight therefrom. When neither the average photometry mode, direct automatic mode nor the off mode is selected for the camera 10, NAND circuit G52 produces an output of "L" level, whereby NAND circuit G66 produces an output of "H" level while AND circuit G69 produces an output of "L" level, thus turning both transistors Q61 and Q62 off. In this manner, the emission control signal S18 has no influence whatsoever on the emission control circuit of the electronic flash.

FIG. 16 is a circuit diagram showing the detail of the timer circuit 68. The timer circuit 68 produces a variety of timing signals which are used to control the operation of the camera 10 of the invention. It comprises twenty-seven T-type flipflops TF0 to TF26 in cascade connection, a selector circuit which selectively combines the outputs from these flipflops to produce desired timing signals, and a reset circuit which initializes the timer circuit 68. It should be understood that a clock pulse CK (see FIG. 18a) having a fundamental frequency of 32.768 kHz is supplied to the flipflop TF0. The flipflops TF0 to TF26 in cascade connection form together a binary counter in which outputs Q0 to Q26 of the individual flipflops TF0 to TF26 produce pulse signals of respective frequencies which are represented by $2^{-(n+1)} \times 32.768$ kHz, where n is an arbitrary integer from Ea clock input CK, to which the clock pulse CK having the fundamental frequency of 32.768 kHz is applied. The flipflop DF2 has $\bar{Q}$ output which is connected to one input of NAND circuit G79, the other input of which is connected to receive the memory detecting signal which is the same as that supplied to the input port 16. The combination of the flipflop DF2 and NAND circuit G79 forms a synchronous differentiator which is known in itself. Specifically, NAND circuit G79 outputs a negative pulse synchronized with the clock pulse CK at the moment when the data input of flipflop DF2 changes to its "H" level. A similar D-type flipflop DF3 has data input D which is connected to the collector of the transistor Q32 (FIG. 11) so as to be fed with the release signal S0. This flipflop has a clock input CK, to which the clock pulse CK is applied. The $\bar{Q}$ output of the flipflop DF3 is connected to one input of NAND circuit G80, the other input of which is supplied with the release signal S0. In a manner similar to the combination of the circuit components DF2 and G79, the combination of the flipflop DF3 and NAND circuit G80 forms a synchronous differentiator. A further D-type flipflop DF4 has data input D which is connected through NOT circuit G90 to the output of NOT circuit G101 so as to be fed with the inversion of the trigger signal S1. This flipflop also has a clock input CK, to which the clock pulse CK is applied. The $\bar{Q}$ output of the flipflop DF4 is connected to one input of NAND circuit G81, the other input of which is connected to receive the inversion of the trigger signal S1. The combination of the flipflop DF4 and NAND circuit G81 also forms a synchronous differentiator. The three synchronous differentiators mentioned above constitute a circuit for resetting the timer circuit 68, and produce a reset pulse when the memory mode is selected, when the shutter is released (or actually when the supply sustain circuit 67 is energized) and when the exposure process is initiated (or when the trigger signal assumes its "L" level). The timer circuit 68 requires a start point to be specified for its functioning, which is provided by resetting the timer circuit 68 in accordance with the reset pulse. The outputs of NAND circuits G79, G80 and G81, which produce the reset pulse, are connected to different inputs of a three input AND circuit G82, the output of which is connected through NOT circuit G91 to each reset input of the T-type flip-flops TF0 to TF26. The output of AND circuit G82 is also connected to each reset input R of RS-flipflops RSF0 to RSF3, RSF6 and RSF7 which form together the selector circuit, and is also connected to one input of OR circuit G84.

The RS-flipflop RSF0 has a set input which is connected to the $\overline{Q3}$ output of the flipflop TF3, and produces at its Q output the high speed limiter signal T0 which is maintained at its "H" level for an interval of 0.5 millisecond after the trigger signal S1 has changed to its "H" level and which then reverts to its "L" level, as indicated in FIG. 18c. The flipflop RSF3 has a set input S which is connected to the output of NAND circuit G83, which has its one input connected to the Q8 output of the flipflop TF8 and which has other input connected to Q7 output of the flipflop TF7. Accordingly, the flipflop RSF3 produces at its Q output the off limiter signal T1 which is maintained at its "H" level for an interval of 24 milliseconds after the trigger signal S1 has changed to its "H" level and which then reverts to its "L" level, as indicated in FIG. 18d. The flipflop RSF2 has a set input S which is connected to $\overline{Q21}$ output of the flipflop TF21, and produces at its Q output the auto limiter signal T2 which is maintained at its "H" level for an interval of 120 seconds after the trigger signal S1 has changed to its "H" level and which then reverts to its "L" level, as indicated in FIG. 18e. The flipflop RSF1 has a set input S which is connected to $\overline{Q8}$ output of the flipflop TF8, and produces at its Q output the flash synchronized timing signal T3 which is maintained at its "H" level for an interval of 16 milliseconds after the trigger signal S1 has changed to its "H" level and which then reverts to its "L" level, as indicated in FIG. 18f. The $\overline{Q}$ output of the flipflop RSF1 is connected to the data input D of the flipflop DF5 and to one input of NAND gate G89, the other input of which is connected to the $\overline{Q}$ output of the flipflop DF5. The flipflop DF5 has a clock input CK, to which the clock pulse CK is applied. The output of NAND gate G89 is connected to the set input S of the flipflop RSF4, the reset input R of which is connected to the output of OR circuit G84. The other input of OR circuit G84 is connected to the $\overline{Q15}$ output of the flipflop TF15. Accordingly, the flipflop RSF4 produces at its $\overline{Q}$ output the flash charging gate signal T4 which changes to its "H" level simultaneously with a reverting of the flash synchronized timing signal T3 to its "L" level and which reverts to its "L" level after a time interval of about two seconds has passed thereafter. The RS flipflop RSF6 has a set input S which is connected to the output of a three input NAND circuit G85, which receives Q8, Q6 and Q5 outputs from the flipflops TF8, TF6 and TF5, respectively, at its three inputs. Accordingly, the flipflop RSF6 produces at its $\overline{Q}$ output the underexposure limiter signal T6 which changes to its "H" level after twenty-two milliseconds have passed since the trigger signal S1 has changed to its "H" level, as indicated in FIG. 18h. The flipflop RSF7 has a set input S which is connected to the $\overline{Q26}$ output of the flipflop TF26, and produces at its Q output the memory limiter signal T7 which reverts to its "L" level at an interval of about seventy minutes after the trigger signal S1 has changed to its "H" level, as indicated in FIG. 18i. It is also to be noted that the flip-flop TF11 produces at its Q11 output the flashing period signal T8 having a frequency which is close to 10 Hz.

Figure 17:
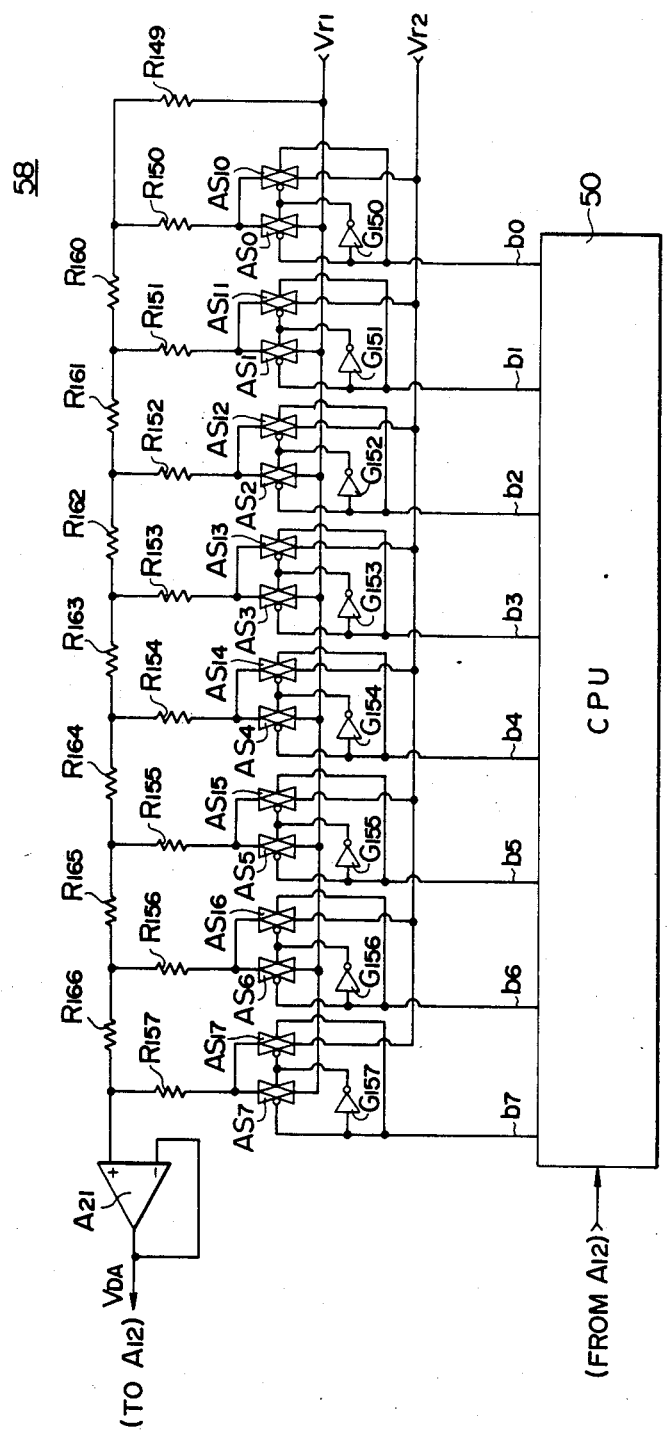
FIG. 17 is a circuit diagram of a D/A converter circuit shown in FIG. 5.

FIG. 17 is a circuit diagram showing the detail of the D/A conversion circuit 58. The D/A conversion circuit 58 forms an A/D conversion circuit of sequential comparison type, together with the comparator A12 (FIG. 7) which forms the second comparator 59, and operates to convert an analog value (SV - AV), which is calculated from the brightness signal S6 or film speed signal SV and diaphragm aperture AV, into digital format for input to CPU50. The D/A conversion circuit 58 is a digital-to-analog converter of eight bit ladder type comprising sixteen analog switches AS0 to AS7 and AS10 to AS17, eight NOT circuits G150 to G157, sixteen resistors R149 to R157 and R160 to R166, and an operational amplifier A21. A reference voltage Vr1 is applied to the input of one-half of the switch bank, namely, analog switches AS0 to AS7 while a reference voltage Vr2 having a greater magnitude than the reference voltage Vr1 is applied to the input of the remaining analog switches AS10 to AS17. Individual bit signals $b_0$ to $b_7$ supplied from the output port 06 of CPU50 are applied to one control input of each of the analog switches AS0 to AS7 and to the other control input of the analog switches AS10 to AS17. On the other hand, the inversion of the bit signals $b_0$ to $b_7$, formed by passing them through NOT circuits G150 to G157, are applied to the other control input of each of the analog switches AS0 to AS7 and to one control input of each of the analog switches AS10 to AS17. Pairs of outputs of the analog switches, each pair formed by the output of one of the analog switches AS0 to AS7 and the output of one of the analog switches AS10 to AS17, are connected together and connected to one end of the resistors R150 to R157, respectively, the other end of which is connected to each different junction between resistors R149 and R160 to R166, which are connected in a series string. Specifically, the other end of the resistor R150 is connected to the junction between resistors R149 and R160, the other end of the resistor R151 to the junction between resistors R160 and R161, the other end of the resistor R152 to the junction between resistors R161 and R162, the other end of the resistor R153 to the junction between resistors R162 and R163, the other end of the resistor R154 to the junction between resistors R163 and R164, the other end of the resistor R155 to the junction between resistors R164 and R165, the other end of the resistor R156 to the junction between resistors R165 and R166, and the other end of the resistor R157 to the junction between the resistor R166 and the noninverting input of the amplifier A21. The end of the resistor R149 which is remote from the series string is connected to receive the reference voltage Vr1. It should be noted that each of the resistors R149 to R157 has a resistance which is chosen to be twice the resistance of each of the resistors R160 to R166. The inverting input of the amplifier A21 is connected to the output thereof, thereby forming a voltage follower, with the output being connected to the inverting input of the comparator A12 (FIG. 7).

An output voltage $V_{DA}$ defined by the following equation:

$$V_{DA} = Vr1 + \frac{Vr2 - Vr1}{2}(b_7 2^0 + b_6 2^{-1} + b_5 2^{-2} + b_4 2^{-3} + b_3 2^{-4} + b_2 2^{-5} + b_1 2^{-6} + b_0 2^{-7})$$

is developed at the output of the amplifier A21, which constitutes the output of the D/A conversion circuit 58, depending on the values of the individual bit signals outputted by CPU50. It is to be noted that the arrangement of such D/A conversion circuit 58 is already known and forms no part of the present invention, and therefore a detailed description of its operation will not be given herein. The operation of the A/D conversion circuit of sequential comparison type which is formed by the combination of the D/A conversion circuit 58 and the comparator A12 will be described in detail in terms of flowcharts.

Figure 20:
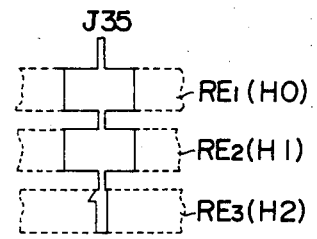
FIG. 20 is a fragmentary plan view illustrating the relative relationship between the display segment electrodes and the back electrodes shown in FIGS. 19A and B.

FIGS. 19A and B show the electrode structure of the liquid crystal display panel which forms the photographing information display 39. Specifically, FIG. 19A shows the pattern of segment electrodes while FIG. 19B shows the pattern of back electrodes which are disposed in opposing relationship with the segment electrodes with a layer of liquid crystal interposed therebetween. As mentioned previously and also described in detail later, the photographing information display 39 employs ⅓ duty- ⅓ bias drive technique. Accordingly, the back electrode is divided into a first to a third back electrode RE1 to RE3. Segment electrodes which correspond to the first to the third back electrodes RE1 to RE3 are connected to individual signal lines in a manner such that at most three segment electrodes define a set which is connected to a single signal line. As shown in FIG. 20, the segment electrodes connected to a single signal line are disposed to be located opposite to different back electrodes RE1 to RE3. Accordingly, the segment electrodes can be grouped into a first, a second and a third group of segment electrodes which are located opposite to the first, the second and the third back electrode RE1, RE2, and RE3, respectively. The first group includes a horizontal array of horizontally elongate, "point" displaying segment electrodes disposed in a linear succession and at the top most position (including those formed over "OVER" electrode and "LONG" electrode) as well as "±" electrode which is used to provide a display of correction. The second group includes a horizontal array of horizontally elongate, "bar" displaying segment electrodes disposed in a linear succession and below the horizontal array of the first group, as well as "OVER" electrode, "LONG" electrode, "MEMO" electrode and "SPOT" electrode. The third group includes a plurality of exposure period electrodes for exposure periods from "1" to "2000", fixed point index electrodes in the form of circles and a triangle located below the respective exposure period electrodes, as well as "−" and "+" electrodes for indicating an overexposure or underexposure, and mode indicating electrodes "MANU", "AUTO", "HIGH" and "SHDW", which are located outside either end of the array of exposure period electrodes. There are 39 signal lines in total which are connected to one to three segment electrodes. Each signal line is connected to the junction between MOS field effect transistors Q106 and Q107, which represents the output of a level conversion circuit (see FIG. 23), to be described later, so as to be fed with a segment drive signal J0 to J38, respectively. On the other hand, the first to the third back electrode RE1 to RE3 are connected to the junctions between pairs of MOS field effect transistors Q100 and Q101; A102 and Q103; and Q104 and Q105, respectively, which represent the output of a common signal output circuit (see FIG. 24), to be described later, so as to be fed with a common signal H0 to H2, respectively. The lightning symbol " ⚡ " is not connected to any signal line since it is not displayed by the liquid crystal, but is displayed by the light emitting diode D1 (see FIG. 14) which indicates the completion of the charging operation within the electronic flash. It is to be understood that all of the segment electrodes, signal lines and back electrodes RE1 to RE3 are formed by transparent electrodes, and thus the photographing information display 39 is constructed as a light transmission type. In the description to follow, each segment electrode or a display region of the liquid crystal panel which is illuminated in correspondence to the particular segment electrode will be simply referred to as a segment.

Figure 21:
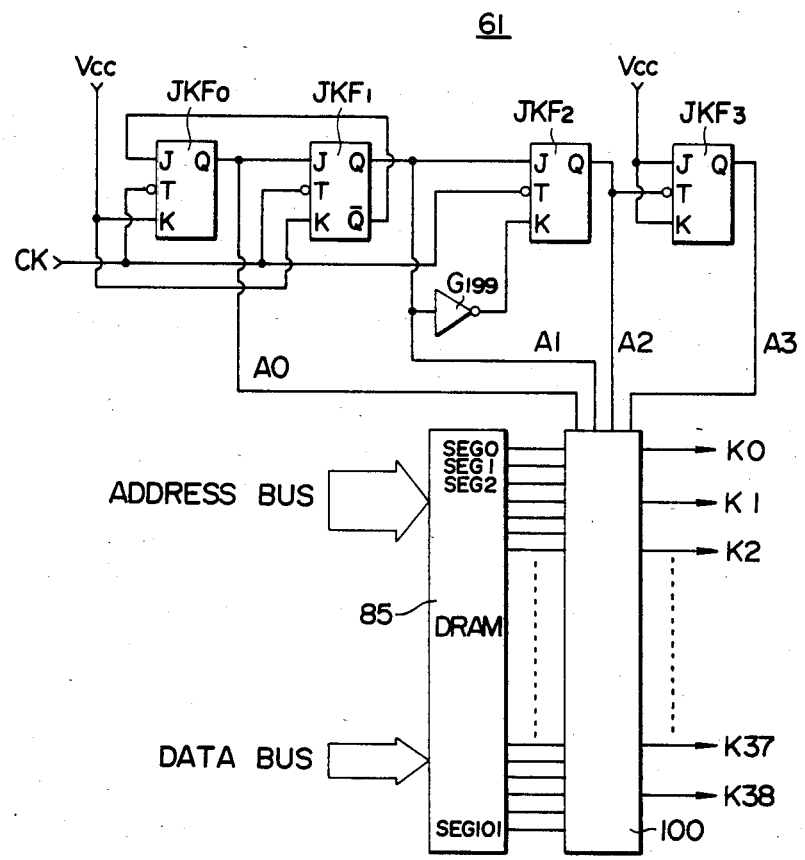
FIG. 21 is a circuit diagram of a liquid crystal driver circuit shown in FIG. 6.
Figure 25:
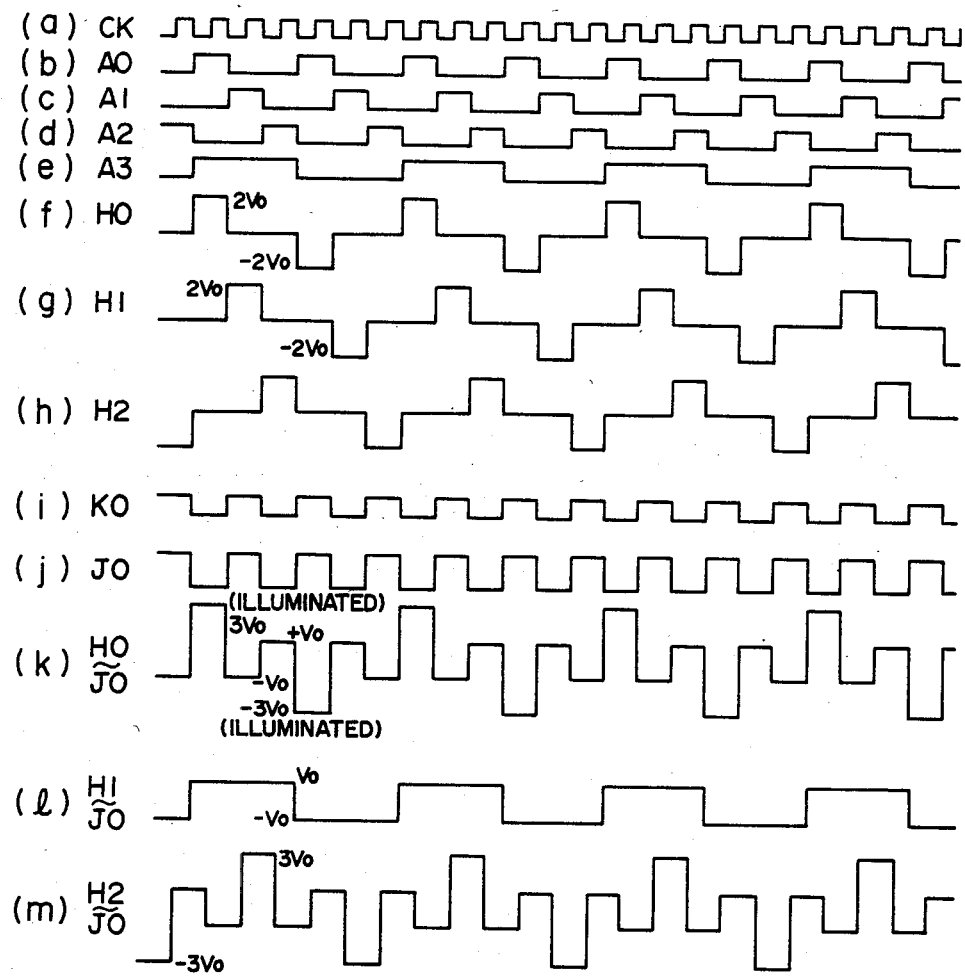
FIGS. 25a to m are a series of timing charts, illustrating the output waveform of various signals appearing in the liquid crystal driver circuit shown in FIGS. 21 to 24.

FIG. 21 is a circuit diagram showing the detail of the liquid crystal driver circuit 61, which activates the liquid crystal display panel which forms the photographing information display 39. Specifically, it includes a pair of JK-flipflops JKF0 and JKF1. The Q output of the flipflop JKF0 is connected to J input of the flipflop JKF1 while the $\overline{Q}$ output of the flipflop JKF1 is connected to J input of the flipflop JKF0. The supply voltage Vcc is applied to the K inputs of both flipflops while the clock pulse CK is applied to each clock input T of the flipflops. In this manner, a ternary counter of synchronized type is formed which is known in itself. Outputs A0 and A1 from the respective flipflops JKF0 and JKF1 will proceed in a manner illustrated in FIGS. 25b and c, respectively. Another JK-flipflop JKF2 has its J input connected to the Q output of the flipflop JKF1, its K input connected to Q output of the flipflop JKF1 through NOT circuit G199 and its clock input T connected to receive the clock pulse CK, thereby forming a D-type flipflop. The D-type flipflop functions to delay the output A1 from the flipflop JKF1 by one period of the clock pulse CK, and produces an output A2 which is shown in FIG. 25d. A further JK-flipflop JKF3 has its J and K inputs connected to receive the supply voltage Vcc while its clock input T is connected to the Q output of the flipflop JKF2, thereby forming a binary counter. The binary counter produces an output A3 which is shown in FIG. 25e and which as will be noted, represents a frequency division of the output A2 from the flipflop JKF2 by a factor of 2.

The display RAM (DRAM) 85 is directly accessed by CPU50 through address and data buses, and includes memory areas which are arranged in one-to-one correspondence to display segments of the photographing information display 39. The photographing information display 39 includes 102 display segments, and accordingly DRAM85 includes 102 memory areas SEG0 to SEG101, the content of which is outputted to a signal synthesizer circuit 100 through 102 output terminals.

Figure 22:
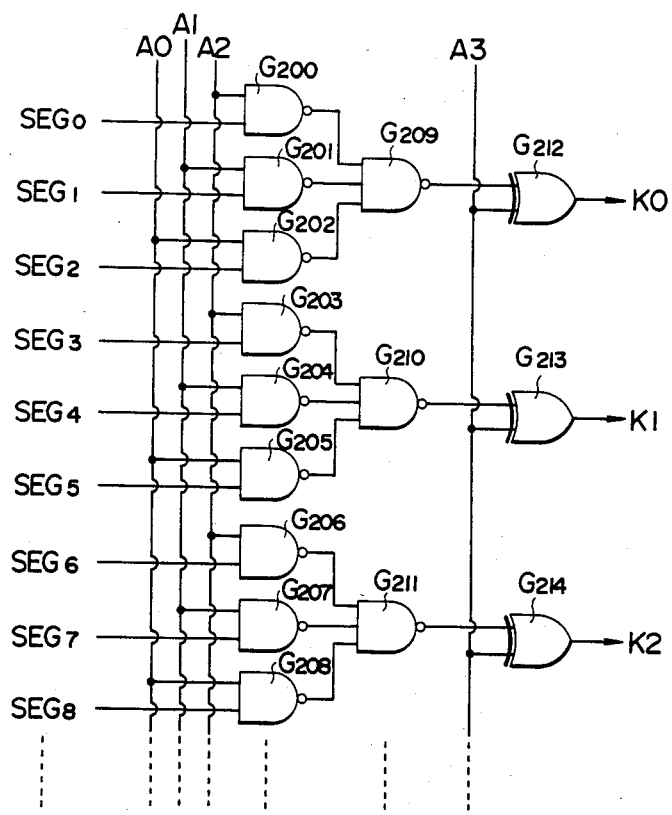
FIG. 22 is a circuit diagram of a signal synthesizer circuit shown in FIG. 21.
Figure 23:
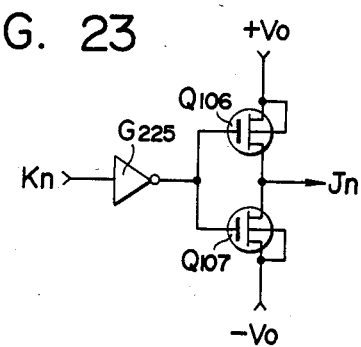
FIG. 23 is a circuit diagram of a level conversion circuit to which the electric circuit shown in FIG. 22 is connected.

The signal synthesizer circuit 100 operates to combine 102 signals produced on the outputs of DRAM85 on a time sharing basis to deliver output signals K0 to K38 on the 39 signal lines in order to drive the photographing information display 39 with a ⅓ duty and ⅓ bias technique. The use of ⅓ duty and ⅓ bias drive technique reduces the number of signal lines which are required between the photographing information display 39 and the liquid crystal driver circuit 61. Part of the signal synthesizer circuit 100 is shown in FIG. 22 where it will be noted that in principle, it comprises a plurality of units, each unit comprising four NAND circuits and a single Exclusive OR circuit. By way of example, NAND circuit G200 has one input connected to the output A2 of the flipflop JKF2 and its other input connected to receive a signal corresponding to the content of the memory area SEG0 from DRAM85. NAND circuit G201 has one input which is connected to the output A1 of the flipflop JKF1 and the other input which is connected to receive a signal corresponding to the content of the memory area SEG1 from DRAM85. NAND circuit G202 has one input which is connected to the output A0 of the flipflop JKF0 and the other input which is connected to receive a signal corresponding to the content of the memory area SEG2 from DRAM85. The outputs of NAND circuits G200, G201 and G202 are connected to the inputs of a three input NAND circuit G209, the output of which is in turn connected to one input of an Exclusive OR circuit G212, the other input of which is connected to the output A3 of the flipflop JKF3. The Exclusive OR circuit G212 produces a signal K0 as its output. As shown in FIG. 25a, the signal K0 represents the output signal from DRAM85 which is time divided by a factor of ⅓. Similarly, a combination of NAND circuits G203 to G205, a three input NAND circuit G210 and an Exclusive OR circuit G213 produces a signal K1 which is the signal corresponding to the content of the memory areas SEG3 to SEG5 of DRAM85 as time divided by a factor of ⅓. A combination of NAND circuits G206 to G208, a three input NAND circuit G211 and an Exclusive OR circuit G214 outputs a signal K2 which corresponds to the content of the memory areas SEG6 to SEG8 of DRAM85 as time divided by a factor of three. In this manner, signals corresponding to the content of 102 memory areas SEG0 to SEG101 of DRAM85 are outputted as signals K0 to K38, which are thirty-nine in total. The signals K0 to K38 are converted into segment drive signals J0 to J38 by respective level conversion circuits as indicated in FIG. 23, for application to individual segments of the photographing information display 39. As one example of such segment drive signal, FIG. 25j shows the waveform of the signal J0. The level conversion circuit (FIG. 23) comprises NOT circuit G225, P-channel MOS field effect transistor Q106 and N-channel MOS field effect transistor Q107. The signal Kn (n=0 to 38) is applied to the input of NOT circuit G225, the output of which is connected to the gate of each of the transistors Q106, Q107. The transistor Q106 has its source connected to receive a constant voltage $V_0$ and the transistor Q107 has its source connected to receive a constant voltage $-V_0$. The drains of the transistors Q106 and Q107 are connected together, and the junction delivers the segment drive signal Jn (n=0 to 38). It will be understood that there are as many level conversion circuits as the number of segment drive signals J0 to J38, or thirty-nine.

Figure 24:
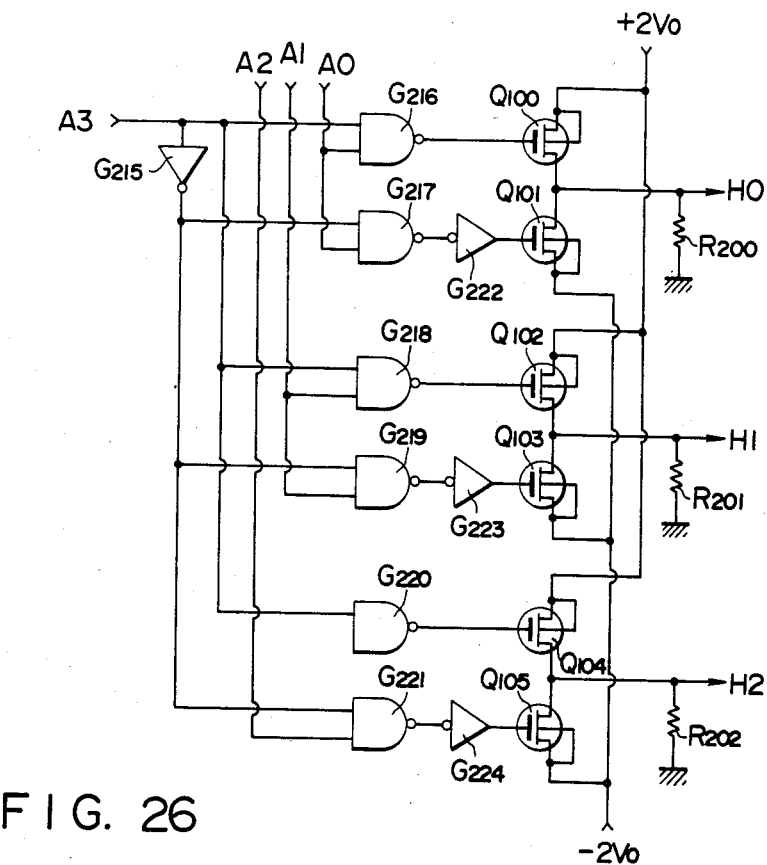
FIG. 24 is a circuit diagram of a common signal output circuit used in the liquid crystal driver circuit shown in FIG. 6.

FIG. 24 shows the common signal output circuit contained in the liquid crystal driver circuit 61. The common signal output circuit comprises NOT circuits G215, G222 to G224, NAND circuits G216 to G221, P-channel MOS field effect transistors Q100, Q102, Q104, N-channel MOS field effect transistors Q101, Q103, Q105 and resistors R200 to R202. NAND circuit G216 has its one input connected to receive the output A3 from JK-flipflop JKF3 while its other input is connected to receive the output A0 from the JK-flipflop JKF0. The output of NAND circuit G216 is connected to the gate of the transistor Q100. NAND circuit G217 has its one input connected through NOT circuit G215 to receive the inversion of the output A3 and its other input connected to receive the output A0. The output of NAND circuit G217 is connected through NOT circuit G222 to the gate of the transistor Q101. A constant voltage $+2V_0$ is applied to the source of the transistor Q100 while a constant voltage $-2V_0$ is applied to the source of the transistor Q101. The drains of the transistors Q100, Q101 are connected together, with the junction being connected to the ground through resistor R200. A first common signal H0 is developed at the junction between the transistors Q100, Q101. In a similar manner, a second common signal H1 is developed by a combination of NAND circuits G218, G219, NOT circuit G223, transistors Q102, Q103 and resistor R201, and a third common signal H2 is developed by a combination of NAND circuits G220, G221, NOT circuit G224, transistors Q104, Q105 and resistor R202. The wave-form of the first to the third common signal H0 to H2 are illustrated in FIGS. 25f to h.

The operation of the liquid crystal driver circuit 61 will be described with reference to the timing charts of FIGS. 25a to m. Considering the operation of the segments SEG0, SEG1 and SEG2 (it is to be noted that hereafter the display segments corresponding to the memory areas SEG0 to SEG101 of DRAM85 will be referred to by the same reference characters used to designate the corresponding memory areas), it is assumed that the segments SEG0 and SEG2 are to be illuminated while the segment SEG1 is not to be illuminated. Accordingly, the content of the memory areas in DRAM85 which correspond to the segments SEG0 and SEG2 is equal to "1" while the content of the memory area corresponding to the segment SEG1 is equal to "0". The outputs A2, A1 and A0 serve as gate signals for allowing the signals corresponding to the content of the memory areas SEG0, SEG1 and SEG2 to pass through NAND circuit G209, respectively (see FIGS. 25b, c, d). The output of NAND circuit G209 is exclusively ORed with the output A3 (FIG. 25e) to be outputted as the signal K0 from the circuit G212 (see FIG. 25i). During an interval when either one of the common signals H0 to H2 (FIGS. 25f, g and h) assumes its "H" level, the signal K0 assumes its "L" level if the output from NAND circuit G209 is at its "H" level, and assumes its "H" level if the output from NAND circuit G209 assumes its "L" level. During an interval when either one of the common signals H0 to H2 is at its "L" level, the signal K0 assumes its "H" level if the output from NAND circuit G209 is at its "H" level, and assumes its "L" level if the output from NAND circuit G209 is at its "L" level. Thus, if the output from NAND circuit G209 is at its "H" level, a potential difference between the segment drive signal J0, to be described later, and one of the common signals H0 to H2 will be equal to $3V_0$, which is sufficient for the liquid crystal to be illuminated in the corresponding segment. If the output from NAND circuit G209 is at its "L" level, a potential difference between the segment drive signal J0 and the common signals H0 to H2 will be equal to $V_0$, which is insufficient to cause an illumination of the liquid crystal in the region of that segment. The memory areas corresponding to segments SEG0 to SEG2 contain "1", "0" and "1", respectively, and hence the waveform of the signal K0 will be as shown in FIG. 25i. Consequently, the segment drive signal J0 which is obtained by the level conversion will be as shown in FIG. 25j. The potential difference H0 - J0 between the common signal H0 and the segment drive signal J0 will be formed as shown in FIG. 25k, allowing the segment SEG0 to be illuminated with a duty cycle of ⅓. The potential difference H1 - J0 between the common signal H1 and the segment drive signal J0 will be as shown in FIG. 25l, preventing an illumination of the segment SEG1. The potential difference H2 - J0 between the common signal H2 and the segment drive signal J0 will be as shown in FIG. 25m, allowing the segment SEG2 to be illuminated with a duty cycle of ⅓. The illumination of other segments SEG3 to SEG101 are controlled in a similar manner. It is to be understood that even though the segment is illuminated with a duty cycle of ⅓, the illumination appears to be continuous to the human eye. The number which follows "SEG" to designate each of the memory areas is used for convenience, and has no direct connection with the address of each of the memory areas SEG0 to SEG101.

The relationship between the display segments and the address of memory areas in DRAM85 will be briefly described here. In principle, point displaying data is directly used to specify the address of a memory area in DRAM85. For example, it may be assumed that a segment located on the leftmost end (high speed end) of a row of point displaying segments corresponds to address "0" memory area in DRAM85. The address of each memory area is incremented by one as the segment is displaced by one to the right. Assuming that point displaying data is equal to "4", "1" will be stored at a memory area in DRAM which has the address "4", whereby the particular segment which is the fifth, as counted from the left end of the row of point displaying segments, will be illuminated. The addresses can be specified in any arbitrary manner. In the camera 10 of the invention, the left-most segment in the row which is located above "OVER" segment will be allocated the address of C41 while the right-most segment which is located above "LONG" segment will be allocated the address C40 (=C41+35). In the programs to be described later, point displaying data and bar graph displaying data are derived by employing an identical formula, and accordingly they appear confusing if they are indicated in terms of their addresses. The problem is solved, however, by adding a given constant to the displaying data which is used to display a bar graph, thereby displacing the address of a memory area in DRAM85. However, the addition of such constant is not specifically indicated on the programs to be shown later.

Figure 26:
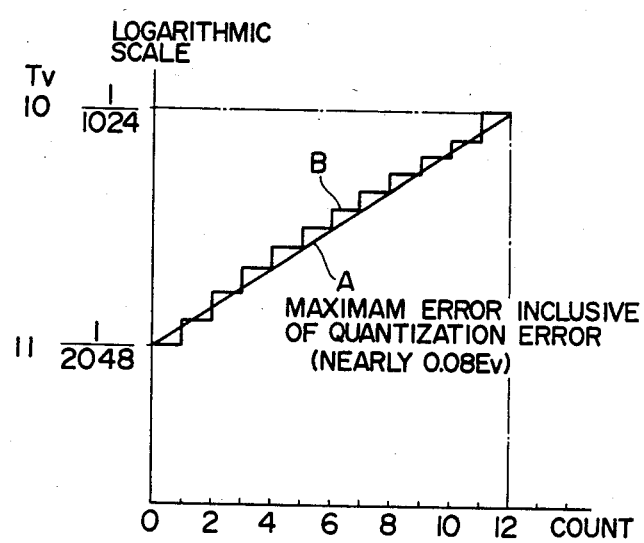
FIG. 26 graphically illustrates the technique employed to count an exposure period during a photographing operation in a memory mode.

FIG. 26 graphically illustrates the technique to count an exposure period when taking a picture in the memory mode. In actuality, the technique is implemented by a software routine within CPU50, which will be described in detail later, but is briefly summarized below. In the memory mode, an actual exposure period is calculated utilizing the result of the direct photometry for purpose of the exposure control. Since the amount of exposure is stored, the stored value must be modified to produce a constant exposure level if the diaphragm aperture or the film speed is changed in the course of taking pictures in the memory mode. In the camera of the invention, both a diaphragm aperture and film speed represent logarithmically compressed information having an accuracy of 1/12 Ev which corresponds to the least significant bit (LSB). Accordingly, it is necessary to convert the actual exposure period into a value which is represented in a similar manner. To this end, the actual exposure period may be counted in terms of pulses having the same period, and the resulting count may be converted by CPU50 into units of 1/12 Ev or LSB (hereafter referred to as Tv value). Alternatively, the period of the clock pulse which is used in the counting operation may be changed with time so that the count itself represents a value in units of 1/12 Ev or LSB. In the camera 10 of the invention, the latter technique is employed. To assure a close tolerance in converting the actual exposure period into the value Tv, the control of the clock frequency will become extremely complex. To avoid this difficulty, the clock period is doubled each time the exposure period increases by a factor of two, in the camera 10 of the invention. FIG. 26 graphically illustrates the relationship between a curve A which represents an ideal conversion of the actual exposure period into Tv value and a curve B which results from the conversion technique employed in the camera 10 of the invention. As will be noted, when the technique of the invention is employed, an error from the ideal curve A will be on the order of 0.08 Ev at maximum including a quantization error, which is sufficient to provide a practical accuracy for the camera.

Returning to FIG. 5, the digital exposure information introduction circuit 60 serves as the means for inputting a manual exposure period and a correction value CV in digital form into CPU50. However, it can be easily implemented with known circuit means, and therefore it will not be specifically shown or described in detail. A detailed description and a specific illustration of the reference voltage circuit 69 are also omitted.

Before proceeding to the description of the operation of the camera 10, the photographing modes used in the camera 10 will be briefly described. As mentioned previously, the photographing modes of the camera 10 can be categorized into three fundamental modes including an automatic mode, a manual mode and an off mode. The automatic mode determines an exposure period in accordance with the result of photometry of the brightness of an object being photographed, and can be selected by bringing the mode changing knob 21 into alignment with the index "AUTO". The automatic mode includes the average photometry, direct automatic mode, the spotwise photometry automatic mode and the flash automatic mode. In the average photometry, direct automatic mode, an average photometry is made of light from an object being photographed which is reflected by both the film surface and the blind surface during the exposure, and the shutter is automatically closed when a proper exposure is indicated. During the time this mode is selected, the memory command knob 13 may be turned to bring the pointer thereon into alignment with the index "MEMORY", thus establishing a memory mode. When the memory mode is selected, an exposure period which is used to photograph the first frame after the mode has been selected is stored within the camera 10, and the same exposure level is used during subsequent frames unless the memory mode is cleared by bringing the pointer of the memory command knob 13 into alignment with the index "CLEAR". In the spotwise photometry, automatic mode, a spotwise photometry of an object being photographed is made at a plurality of locations thereon before taking a picture, and an average of brightness values over these locations is produced to determine a proper exposure. The spotwise, automatic mode is selected by the depression of the spotwise entry button 14 when the automatic mode is established. This allows the spotwise photometric values to be entered and stored. The spotwise photometric values which are entered correspond to values which appear on the spotwise photometric indices (not shown) disposed within the finder in optical alignment with the photovoltaic element PD2 which is used to effect the spotwise photometry. During the spotwise, automatic mode, either the highlight command button 15 or the shadow command button 16 may be depressed to select the highlight mode or the shadow mode, respectively. When the highlight mode is selected, an exposure period is determined so as to establish an exposure level which is by 2⅓ Ev lower than the maximum value of spotwise photometric values determined. In the shadow mode, an exposure period is determined to establish an exposure level which is by 2⅔ Ev higher than the minimum value of the spotwise photometric values obtained. The offset values 2⅓ Ev and 2⅔ Ev are empirically determined, and are preset in the flowcharts to be described later. The flash automatic mode is selected during the automatic mode when an electronic flash is mounted on the flash mounting shoe 24 or is connected to the connector 25 and the power supply for the electronic flash is turned on. During this mode, the shutter is operated with an exposure period of 1/60 second which is synchronized with the operation of the electronic flash, and the emission of flashlight from the electronic flash is automatically controlled to provide a proper exposure.

In the manual mode, the shutter is operated to produce a shutter period which is preset on the manual exposure period presetting ring 7, and is selected by bringing the mode changing knob 21 into alignment with the index "MANUAL". The manual mode includes a normal manual mode, a spotwise manual mode and a flash manual mode. These three modes differ from each other in the manner of display provided by the photographing information display 39, and in all of these modes, the shutter is operated with a manually selected exposure period. The selection of the memory mode is inhibited in the manual mode. The selection of the highlight mode or shadow mode is possible in the spotwise manual mode.

The off mode is selected by bringing the mode changing knob 21 into alignment with the index "OFF". In the off mode, an average direct photometry is made of an object being photographed, and the shutter is closed with an exposure period less than 1/40 second which is determined by the photometry, and is forcibly closed with an exposure period of 1/40 second if the exposure period determined is greater than this value.

The operation of the camera 10 and the progress of programs within CPU50 will be described below with reference to the flowcharts shown in FIGS. 27A to C. Initially referring to the flowchart shown in FIG. 27A, when the power supply for the camera 10 is turned on, CPU50 and the interface are reset to their initial conditions, followed by a branching to a given program in accordance with a selected photographing mode of the camera 10. Initially, assuming that the direct automatic mode is to be established for the camera 10, the program makes its exit through YES (shown by Y on the drawings) from a decision block to see whether an automatic mode is used, through NO (shown by N on the drawings) from a decision block to determine whether the power supply of the electronic flash is turned on to enter the flowchart shown in FIG. 27B through Ⓐ - Ⓐ. In the flowchart of FIG. 27B, the operation makes its exit through NO from a decision which determines whether the average photometry, direct automatic mode is called for and memory mode hold is established and from a decision block which determines whether the spotwise mode is called for, thus entering a program for the direct automatic mode. It is assumed that the memory mode is not selected at this time. In this program, it is initially determined whether it is now immediately after changing the mode. If YES, the display within the finder, the interface and the internal registers of CPU50 are reset. An average brightness value (hereafter abbreviated by Bv) determined by the open photometry, a calculated value representing the difference between the film speed and the diaphragm aperture (hereafter abbreviated by Sv-Av) and any correction value (hereafter abbreviated by Cv) are sequentially entered, followed by a decision to determine if the memory hold is established. A memory hold refers to the condition in which an actual exposure period determined by the direct photometry is already stored, and is distinguished from a memory set which also represents the memory mode, but in which an actual exposure period is not yet stored. If the memory hold condition is established, an average Bv value which is used in the calculation of a Tv value and the like are replaced by those which are already held, followed by a calculation of the Tv value. Upon completion of the calculation of the Tv value, such value is displayed in the form of a bar (see FIG. 45). A decision is then made whether the shutter has been released. If the shutter has not been released, the operation makes its exit through Ⓑ - Ⓑ to enter the flowchart shown in FIG. 27A and returns to the beginning of the flowchart through ①-①, and such loop is repeated until the shutter is released. In this manner, the photographing information display 39 always displays a bar representation of a latest proper exposure period (Tv value). Upon shutter release, the operation loops around a decision whether or not the trigger is open in the flowchart of FIG. 27B, waiting for the exposure process to be initiated. When the trigger is open, the exposure process is terminated by the closure of the shutter at a time when an integrated output from the direct photometry reaches a given level if the memory mode is not called for. If the memory mode is established and the memory hold is not called for, the actual exposure period is concurrently counted. If the memory hold is called for during the memory mode, the exposure period is controlled in accordance with the Tv value which is already stored. After the termination of the exposure process, the operation makes its exit through Ⓑ - Ⓑ and ①-① to return to the beginning of the flowchart, repeating the display for a next photographing operation.

Figure 27A:
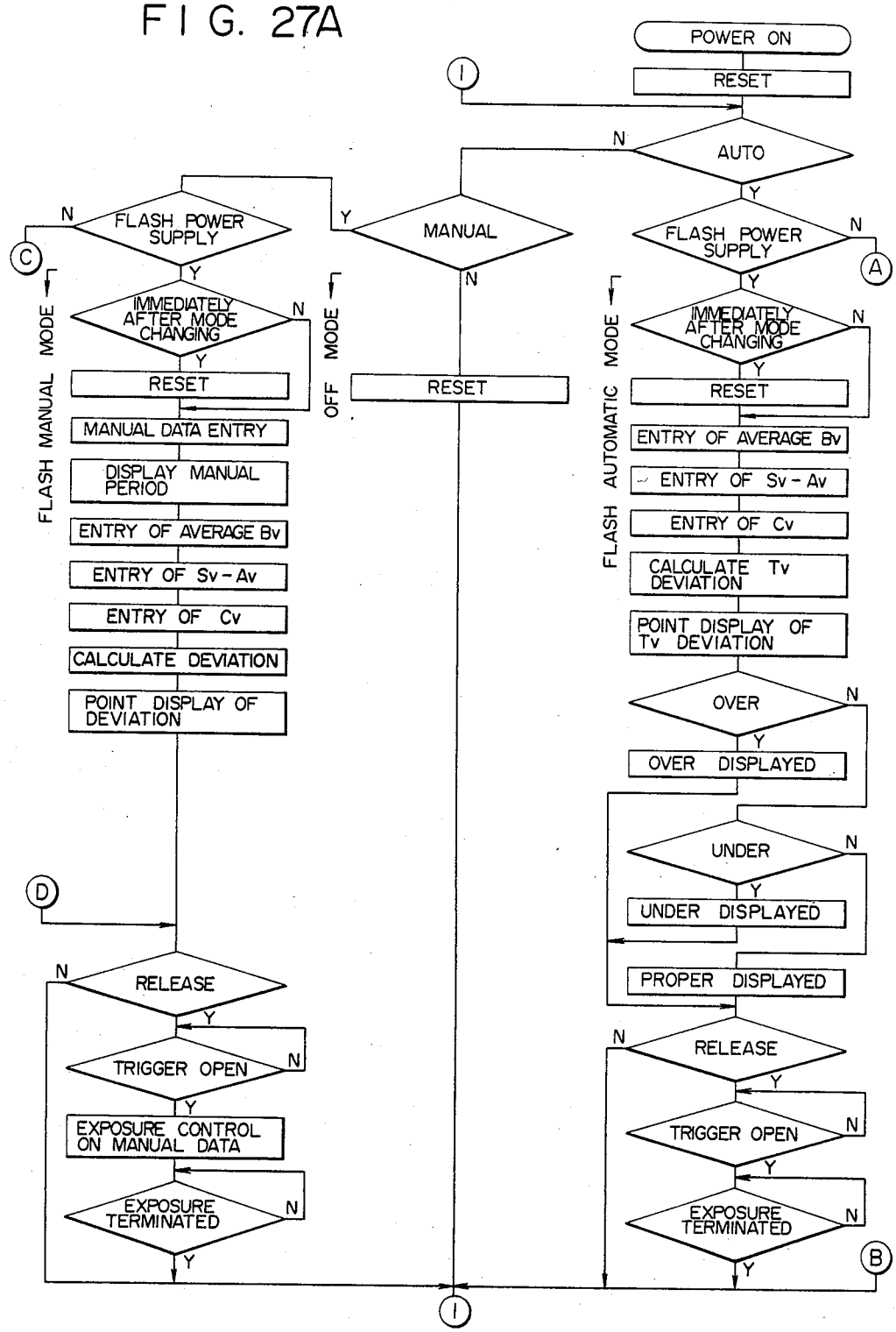
FIGS. 27A to C are flowcharts schematically illustrating programs used in the microcomputer shown in FIG. 6.
Figure 27B:
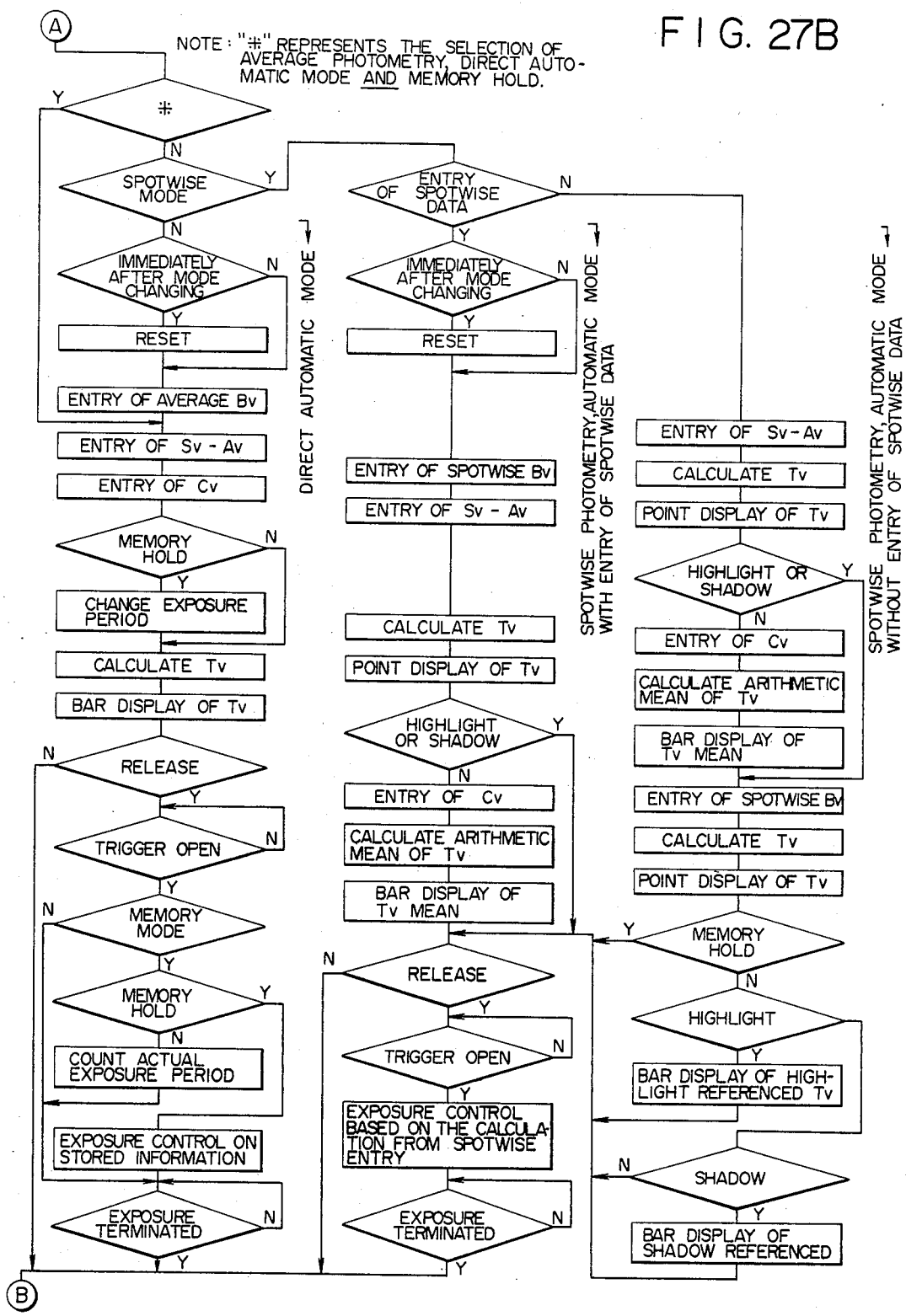
Figure 48:
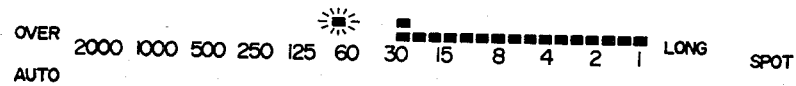
FIGS. 48 to 50 schematically show the manners of display by the photographing information display during the spotwise photometry, automatic photographing mode; specifically
Figure 50:

If the spotwise photometry, automatic mode is established for the camera 10, in the flowchart of FIG. 27A, the operation makes its exit through YES from the decision to determine whether the automatic mode is called for and through NO from the decision to determine whether the power supply of the electronic flash is turned on and enters the flowchart of FIG. 27B through Ⓐ-Ⓐ. The operation then makes its exit through NO from the decision whether the average photometry, direct automatic mode and the memory hold is called for and through YES from a decision block to determine whether the spotwise mode is called for, thus entering the program which is designed for the spotwise automatic mode. In this program, a decision is initially made whether there is or is not a spotwise photometric input. It will be understood that there is a spotwise photometric input whenever the spotwise mode is selected. Hence, it makes its exit from this block through YES, and a decision is then made whether it is now immediately after the mode changing. If it is immediately after the mode changing, the display within the finer, the interface and the internal registers of CPU50 are reset. Subsequently, a spotwise Bv value resulting from the open photometry and Sv−Av value are sequentially entered to calculate a Tv value, which is then stored and is also displayed in a point form (see FIG. 48). Then a decision is made to see whether the highlight mode or the shadow mode is called for. If neither of these modes is called for, Cv value is entered together with any correction to calculate the arithmetic means of the Tv values, which is displayed in a bar form (see FIG. 50). The Cv value is not considered in the point-form display of the Tv value, but is considered in the bar display since the purpose of the display in the point form is designed in principle to indicate the brightness of an object being photographed even though in practice, a proper level, as converted into the Tv value, on the basis of the brightness of an object being photographed introduced as a spotwise photometric input is displayed, while the representation should indicate the actual exposure period, which should be determined by taking the correction into consideration. The display of the average value in the bar form is followed by a decision which determines whether the release has taken place. If the release has not taken place, the operation makes its exit through Ⓑ-Ⓑ and ①-① to return to the mode determining program, determining whether or not there is a spotwise photometric input. During the second pass after the spotwise photometric input has been entered, a second loop which is employed when there is no spotwise photometric input is entered, since the spotwise data entry is reset during the first pass. In this loop, the value (Sv−AV) is initially entered, and Tv values are calculated based on a plurality of spotwise Bv values which are stored, thus varying the point display of the individudal Tv values. Specifically, the storage which takes place in response to the entry of spotwise data stores the amount of exposure, and hence the point inputs must be changed so as to achieve a constant value for the amount of exposure. Then a decision is made whether the highlight mode or the shadow mode is called for. If neither of these modes is called for, Cv value is entered to calculate the arithmetic mean of Tv values with any correction, which is displayed as in a bar form (FIG. 50). Subsequently, the spotwise Bv value which is currently being determined is entered, and is converted into a Tv value which assures a proper exposure, for display in the point form. The display in the point form takes place in a flashing form in order to distinguish it from the Tv value based on the Bv value which has previously been entered. Then a decision is made whether the memory hold is or is not established. If the memory hold is called for, the operation makes its exit through YES to determined whether the release has taken place. If the memory hold is not established, a decision is made whether the highlight mode or the shadow mode is called for. If none of these modes is called for, the operation makes its exit to a decision of whether the release has taken place.

Figure 51:
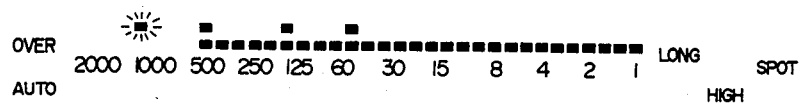
FIGS. 51 to 54 also show the manner of display by the photographing information display when the highlight referenced photographing mode is selected during the spotwise photometry, automatic photographing mode; specifically.
Figure 52:
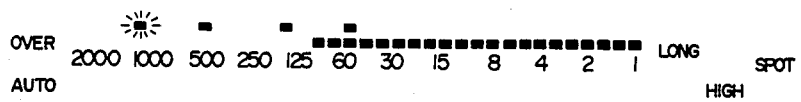
Figure 53:
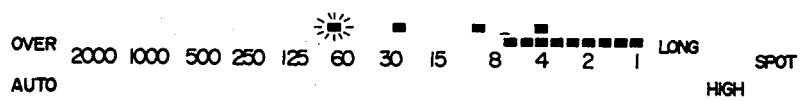
Figure 54:
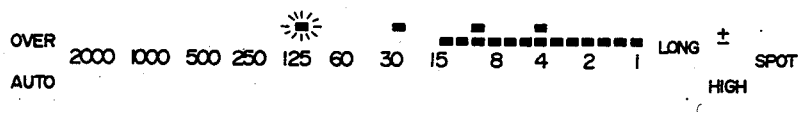
Figure 55:
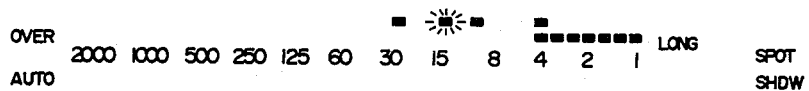
FIGS. 55 and 56 show the manner of display by the photographing information display when a shadow referenced photographing mode is selected during the spotwise photometry, automatic photographing mode; specifically.
Figure 56:
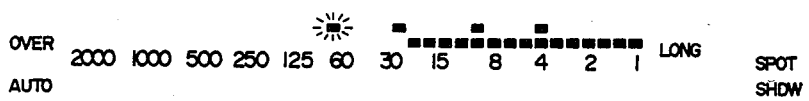

The selection of the highlight or the shadow mode during the spotwise photometry, automatic mode will now be considered. Assuming that the entry of spotwise data has been made and the display of the Tv value in the point form is completed, the selection of either the highlight or the shadow mode does not change the display in the bar form, and the operation branches to the mode determining program again, subsequent to the decision of shutter release. When the decision to determine the presence of spotwise photometric data is again encountered, a program without entry of the spotwise data is now chosen, and the display in the point form is shifted so as to produce a constant value for the amount of exposure, followed by a decision to determine if the highlight or the shadow mode is called for. Since either the highlight or the shadow mode is called for, there is no shift in the bar display, and after displaying the current photometric value in the point form, it is then determined whether the memory hold is called for, followed by a decision to determine whether the highlight mode is called for. If the highlight mode is called for, a Tv value is chosen for display in the bar form (see FIG. 2) which exceeds by $2\frac{1}{3}$ Ev the maximum value of a plurality of brightness values stored by the entry of the spotwise data. In order to enable a photographer to recognize clearly the reference point which the displayed Tv value exceeds by $3\frac{1}{3}$ Ev, the bar representation once extends to a Tv value which corresponds to the maximum brightness value (see FIG. 51) and then retracts to a point which exceeds the maximum value by $2\frac{1}{3}$ Ev (see FIG. 52). On the other hand, if the shadow mode is called for, a Tv value is chosen for display in bar form (see FIG. 56) which is by $2\frac{2}{3}$ Ev less than the minimum value of a plurality of brightness values stored by the entry of spotwise photometric data. Again, the bar representation extends once to a Tv value which corresponds to the minimum brightness value (see FIG. 55), and then moves to a point which is by $2\frac{2}{3}$ Ev less than the minimum brightnesss (FIG. 56) where it remains at rest.

Upon shutter release during the spotwise photometry, automatic mode, the operation loops around the decision to determine whether or not the trigger is open, thus waiting for the initiation of the exposure process. When the trigger is open, an exposure period is counted until an exposure period preset in a timer counter and which corresponds to the data displayed by the bar representation expires, whereupon the shutter is closed to terminate the exposure process. The operation makes its exit through Ⓑ-Ⓑ and Ⓑ-Ⓑ to return to the mode determining program again.

The operation which occurs during the direct, automatic mode and when the memory set is established will now be described. Initially, it is assumed that the memory hold is not established. The operation makes its exit through YES from the decision concerning the automatic mode and through NO from the decision which determines whether or not the power supply of the electronic flash is turned on, and passes through Ⓐ-Ⓐ to the decision which determines whether the average photometry, direct automatic mode and the memory hold are called for. The operation makes its exit through NO from this decision block and through NO from the decision relating to whether or not the spotwise mode is called for, thus entering the program for the direct, automatic mode. Before the shutter release takes place, the Tv value is displayed in the bar form (see FIG. 57) in quite the same manner as in the normal direct, automatic mode. Upon shutter release, the operation waits for the trigger to become open and then makes its exit through NO from the decision block concerning the memory hold, counting the actual exposure period in the direct automatic mode while simultaneously performing its conversion into Apex value. When the exposure process is terminated subsequently, the operation branches to the mode determining program again through ⓑ-ⓑ and ①-①. If the memory mode is not reset then, the memory mode is automatically established. When the memory hold is established, the bar representation and the segment "MEMO" are displayed in a form flashing at a low rate (see FIG. 58). This provides a positive indication to a photographer that the memory mode is established in order to take a picture, thus reducing the likelihood that a wrong mode be used to take a picture. In the next program step, after making an exit through YES from the decision block concerning the direct, automatic mode and the memory hold, Sv−Av value and Cv values are entered without entering a fresh average Bv value. This is because during the memory hold, the Bv value is already stored. When the entry of a Cv value is completed, a decision to see if the memory hold is established is made again. Since the memory hold is established, if the value (SV−Av) and Cv value have changed from their values when the memory hold was initially established as a result of the direct photometry, the display of the bar representation is changed in a corresponding manner. This is because the memory hold stores the amount of exposure rather than the exposure period. When the shutter release takes place then, an exposure control takes place in accordance with the timer counter in which a value corresponding to the data displayed by the bar representation is preset. In other words, a picture is taken at the same level as the amount of exposure used during a photographing operation with the direct photometry which took place before the memory hold was established. The display in the bar form shifts in accordance with the Cv value, and thus the amount of exposure can be corrected. It therefore follows that the memory mode does not store the amount of exposure in the strict sense of the word. However, such correction is allowed in the memory mode because if no change occurs in the display produced within the finder and the bar representation for the actual exposure period when a correction is applied, this may be mistaken for an operational failure of the camera 10.

The use of the memory mode during the spotwise photometry, automatic mode will now be described. In this instance, the entry of the spotwise photometric input is nullified, and the program directly branches to the flowcharge for the spotwise photometry, automatic mode without entry of spotwise photometric data. The display in the bar form of the Tv value as referenced to the highlight or the shadow mode does not take place. In other respects, the sequence of operation is substantially similar to that mentioned above in connection with the spotwise photometry, automatic mode. When the memory hold is established during the spotwise mode, the display of the segment "MEMO", input point and the bar representation flashes at a low rate while the point display of the current photometric value flashes at a more rapid, normal rate. It should be understood that the exposure control nevertheless is based on the data which is displayed in the bar form.

Figure 68:
FIGS. 68 to 72 show the manner of display by the photographing information display during the electronic flash activated, automatic photographing mode; specifically.
Figure 69:
Figure 70:
Figure 71:
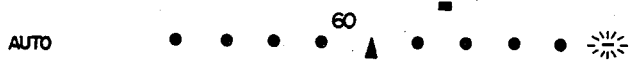
Figure 72:

A photographing operation with the aid of the electronic flash in the automatic mode will now be described. When the power supply of the electronic flash is turned on in the automatic mode, an exposure control is automatically based on the result of the direct photometry. The program makes its exit through YES from a decision block to see if the automatic mode is called for, and through YES from the query block if the power supply of the electronic flash is turned on, thus entering the operational sequence for the flash automatic mode. It is initially determined if it is now immediately after the mode changing. If it is, the display within the finder is initialized, folloed by the entry of the average Bv value, Sv−Av value and Cv value. Using these values entered, the Apex value Tv is calculated. It is to be understood that the display within the finder, when the electronic flash is used to take a picture, includes the display of "60" representing the timing synchronized with the operation of the electronic flash and the display of the fixed point index (see FIG. 68). Specifically, a deviation from the exposure level corresponding to the exposure period of 1/60 second is displayed in the point form. Then follows decisions if the photographing operation performed with the aid of the electronic flash resulted in an overexposure or an underexposure, accompanying a corresponding display of the overexposure, the underexposure or proper exposure. Such display takes place only during an interval of two seconds after the cessation of emission of flashlight from the electronic flash. Either the mark "+" or the "−" flashes to indicate the overexposure or the underexposure, respectively (see FIGS. 70 and 71). If the result is neither the overexposure nor the underexposure, it should be a proper exposure, which is indicated by a flashing of the fixed point index "▲" (see FIG. 72). It is to be noted that the fixed point index " " is continuously displayed at normal times other than the two second peirod which follows the cessation of the emission of flashlight from the electronic flash. A decision is then made to see if the release has taken place. If not, the operation returns to the mode determining program. On the contrary, if the release has taken place, the program makes its exit through YES from the decision block of the trigger open, thus waiting for the initiation of the exposure process. When the trigger is opened, an integrating operation on the basis of the direct photometry is initiated, and the electronic flash is activated to emit flashlight when the shutter is fully open. As mentioned previously, the exposure control in accordance with the result of the direct photometry as well as the control of the electronic flash take place by means of electronic hardware.

In the mode determining program, if the answer to the query block "automatic mode?" is in the negative, a decision is then made if the manual mode is called for. If the manual mode is not called for, it then follows that the off mode is called for, thus branching to the flowchart for the off mode (FIG. 27A). In the off mode, the display within the finder is entirely erased to avoid an unnecessary power dissipation, and the operation returns to the mode determining program through ①-①. When the shutter is subsequently released, the exposure control takes place in accordance with the result of the direct photometry within an extent, the maximum exposure period of which is limited as mentioned peviously. This exposure control is not performed by any program within CPU50, but is performed by means of electronic hardware.

If the manual mode is selected a decision is then made if the power supply for the electronic flash is turned on. If the power supply is not turned on, the operation makes its exit through ©-© to enter the flowchart shown in FIG. 27C where a decision is initially made if the spotwise mode is called for, and if not, the program branches to the flowchart for the normal manual mode. In this flowchart, a decision is initially made if it is now immediately after the mode changing. If it is, various variables and the display are initialized, followed by the entry of manual data and the display of a manual exposure period. FIG. 61 illusstrates that a shutter period of 1/60 is established. The average Bv value, Sv−Av value and Cv value are sequentially entered, and a deviation with respect to a standard exposure level is calculated on the basis of the manual data, average Bv value, Sv−Av value and Cv value so as to be displayed in the bar form (FIG. 61). The operation then makes its exit through Ⓓ - Ⓓ to enter the flowchart shown in FIG. 27A, determining if the release has take place. If not, the operation makes its exit through ①-① to return to the mode determining proram. However, if the release has taken place, the operation loops around the decision to determine the opening of the trigger, thus waiting for the initiation of the exposure process. When the trigger is open, an exposure period is counted on the basis of manual data which is preset in the timer counter. When the counter reaches a given value, the exposure process is terminated, returning to the mode determining program through ①-①.

Figure 27C:
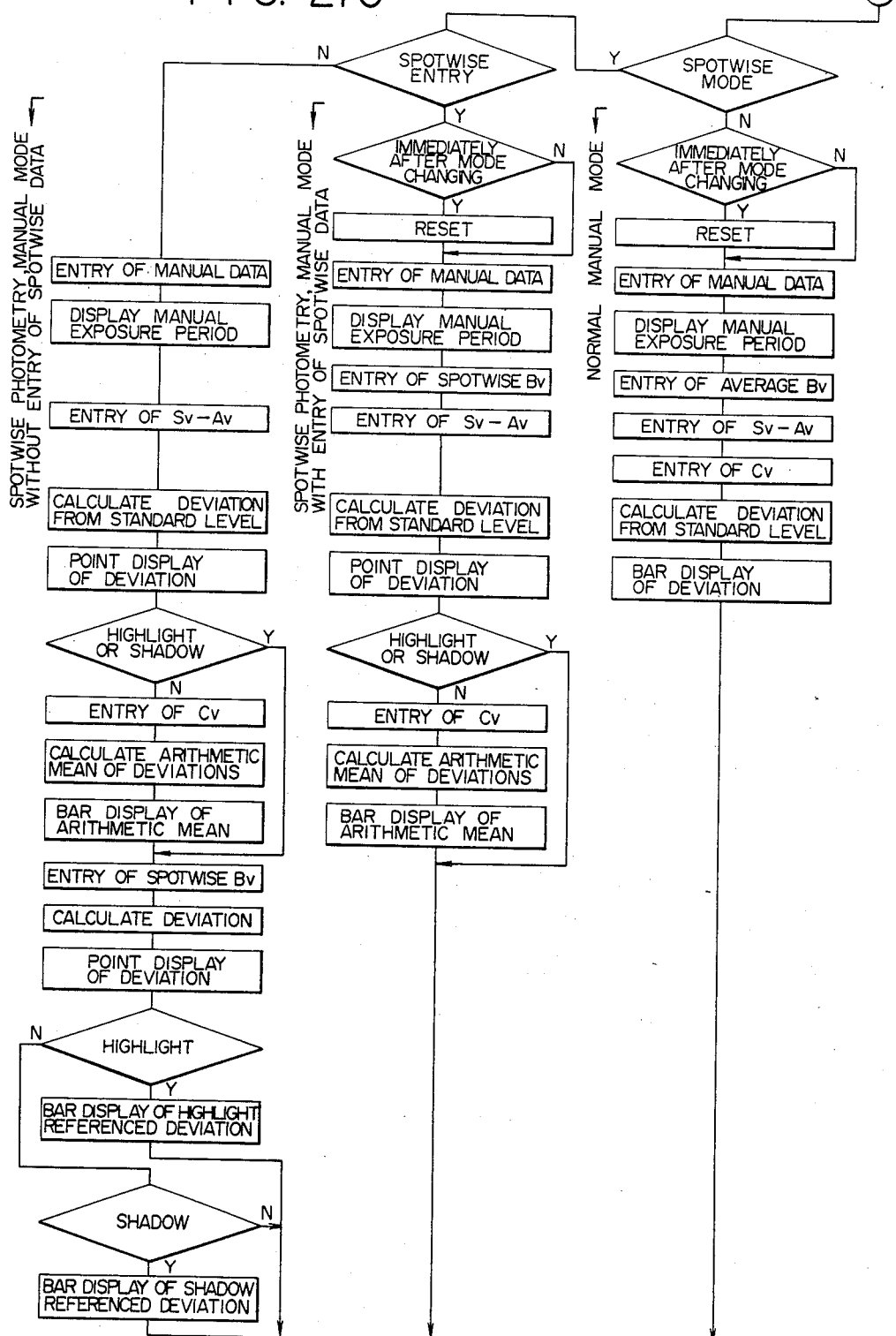
Figure 63:
FIGS. 63 to 65 also show the manner of display by the photographing information display during the spotwise photometry, manual photographing mode; specifically.
Figure 64:
Figure 65:

In the flowchart of FIG. 27C, if the topmost decision block determines that the spotwise mode is selected, the operation branches to a program for the manual spotwise mode. It is then initially determined if the entry of spotwise data is made. During the first pass through the program after the selection of the manual spotwise mode, there is an entry of spotwise data. Then a decision is made to see if it is now immediately after the mode changing. If it is, various variables, the display and the interface are reset. The entry of manual data than takes place and a manual exposure period is displayed (see the display of "125" in FIG. 63). The spotwise Bv value and SV−AV value are sequentially entered, and a deviation with respect to a standard exposure level is calculated on the basis of these values as well as manual data, and is then stored, while simultaneously displaying it in the form of a point (see FIG. 63). A decision is then made to see if the highlight or the shadow mode is called for. If either mode is called for, the operation makes its exit through Ⓓ - Ⓓ to skip over to the decision block which determines if the release has taken place. If neither mode is called for, the Cv value is entered, and a deviation with respect to a standard exposure level of the arithmetic mean of spotwise data which are stored is calculated, and is displayed in the bar form (see FIG. 63). The operation then makes its exit through Ⓓ -Ⓓ to skip over to the decision block to determine if the release has taken place. If not, the operation makes its exit through ① - ① to return to the mode determining program. Then the operation proceeds through Ⓒ - Ⓒ to a point where the entry of spotwise data is determined, the operation branches to a program for the manual spotwise mode without entry of spotwise data unless the spotwise mode has been reset by that time. Now, manual data is initially entered, and a manual exposure period is displayed. Sv−Av value is then entered, and the point display is changed to provide a constant value for the amount of exposure as the Sv−Av value varies. A decision is then made to see if the highlight or the shadow mode is called for. If neither mode is called for, Cv value is entered, and the display in the bar form is changed to provide a constant value for the amount of exposure as the Sv−Av value and the Cv value vary. Thus, the point display does not take the Cv value into consideration while the Cv value is considered in providing the display in the bar form. This is because the point display, in principle, indicates the brightness of an object being photographed even though in practice, a deviation from the standard exposure level is indicated on the basis of the brightness of an object being photographed at the time of entering the spotwise data, while the bar representation provides an indication of an actual exposure level, as mentioned previously. Subsequently, the spotwise Bv value is entered, and a deviation with respect to the standard exposure level is calculated on the basis of the Bv value and Sv−Av value, and is displayed in the point form. This display which is a point display representing the current photometric value is provided in a flashing manner in order to distinguish it from the previously entered point (see FIG. 63). If it is assumed that neither the highlight nor the shadow mode is called for, the operation makes its exit through Ⓓ - Ⓓ to skip over to the decision block which determines if the release has taken place. If not, the operation makes its exit through ① - ① to return to the mode determining program. FIG. 64 shows a bar representation indicative of a deviation of the arithmetic mean of entered points while FIG. 65 shows the entry of a correction value.

Figure 66:
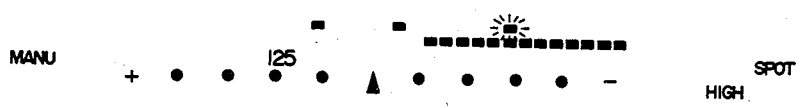
FIG. 66 shows the manner of display by the photographing information display when a highlight referenced photographing mode is selected during the spotwise photometry, manual photographing mode.

The selection of either the highlight or the shadow mode in the manual, spotwise mode will be described. If the spotwise mode is selected, but no entry of spotwise photometric data is made, the point display of spotwise data is changed, and a decision is made to see if the highlight or the shadow mode is called for, as mentioned previously. Assuming that the highlight mode is called for, the display in the bar form of the arithmetic mean of spotwise photometric values is not changed, and the current photometric point is displayed in a flashing form, followed by a decision to determine if the highlight mode is called for. Since the highlight mode is called for, a bar representation is displayed (see FIG. 66) which extends to a point that is by 2⅓ Ev less than the maximum value of multiple brightness input values. At this time, the bar representation once extends to the maximum brightness value and then moves to a point which is by 2⅓ Ev less than the maximum value, in ordeer to enable a photographer to recognize what spotwise photometric input is referenced, from which the bar representation is less by an amount corresponding to 2⅓ Ev. The operation then makes its exit through Ⓓ - Ⓓ and skips over to the decision to determine if the release has taken place. If not, the operation makes its exit through ①-① to return to the mode determining program.

Figure 67:
FIG. 67 shows the manner of display by the photographing information display when a shadow referenced photographing mode is selected during the spotwise photometry, manual photographing mode.

The selection of the shadow mode will now be considered. The opration is similar to that when the highlight mode is selected up to a point where the current photometric value is displayed in a flashing form. In the subsequent portion of the program, since the shadow mode is selected, a bar representation is displayed which extends to 2⅜ Ev greater than the minimum value of multiple photometric inputs (see FIG. 67). However, it is to be noted that the bar representation once extends to a point corresponding to the minimum brightness value and then moves to a point which is by 2⅜ Ev greater than the minimum value. The operation then makes its exit through Ⓓ - Ⓓ and skips over to the decision block determining if the release has taken place. If not, the operation makes its exit through Ⓘ-Ⓘ to return to the mode determining program.

In the spotwise mode, if the release has taken place, it is then determined if the trigger is open. If it is open, an exposure period is counted on the basis of manual data preset in the timer counter, and the exposure process is terminated when the counter reaches a given value. After the termination of the exposure process, the operation makes its exit through Ⓘ-Ⓘ to return to the mode determining program.

Figure 73:
FIG. 73 shows the manner of display by the photographing information display during the electronic flash activated, manual photographing mode.

If the power supply for the electronic flash is turned on in the manual mode, it is initially determined if it is now immediately after the mode changing. If it is, the display is reset. This corresponds to the display of "MANU" and the fixed point index shown in FIG. 73. The entry of manual data then follows, and an exposure period is displayed. FIG. 73 illustrates that a manual shutter period of 1/30 is chosen. subsequently, average Bv value, Sv−Av value and Cv value are sequentially entered, and a deviation from a standard exposure level is calculated on the basis of these values, and is displayed in the point form (see FIG. 73). A decision is then made to see if the release has taken place, and if not, the operation makes its exit through Ⓘ-Ⓘ to return to the mode determining program. When the electronic flash is used to take a picture in the automatic mode or the off mode, the exposure period will be that which is synchronized with the operation of the electronic flash. However, during the manual mode, a manual exposure period is used to control the shutter operation.

Figure 28:
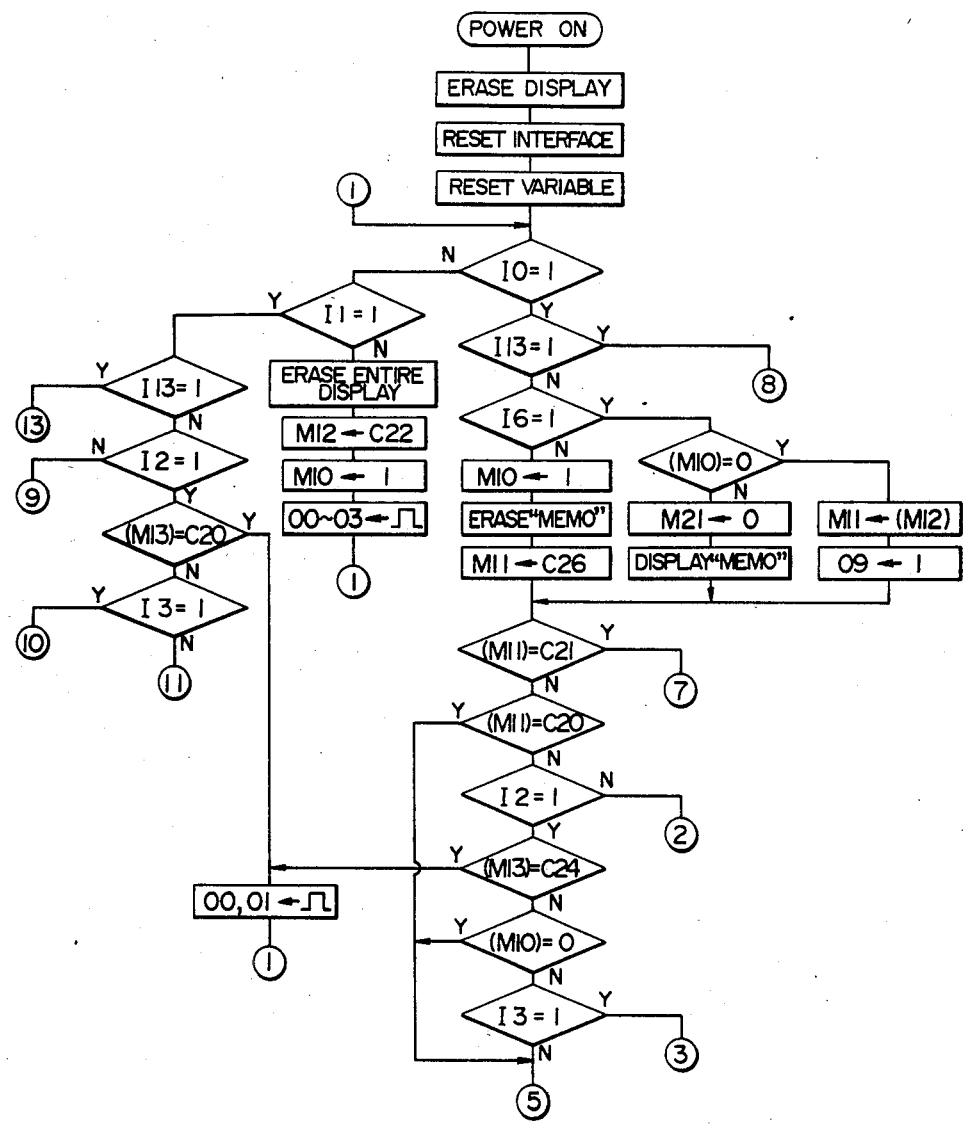
FIG. 28 is a flowchart illustrating the detail of a mode determining program which is included in the flowcharts shown in FIGS. 27A to C.

The operation of the camera 10 according to the invention will be described below in detail with reference to flowcharts shown in FIG. 28 to FIG. 44 which indicate the flow of programs within CPU50. Initially, the power supply is turned, as indicated in FIG. 28. The indication "power on" corresponds to the containment of a battery having an electromotive force exceeding a given value and a given capacity within a battery chamber of the camera 10. The display is then cleared or erased. This corresponds to resetting the content of DRAM85 entirely to "0". The interface is reset, whereupon positive pulses are delivered to the output ports 00 to 03 to reset the flipflop (G7, G9) which detects the spotwise mode, the flipflop (G11, G12) which detects the entry of spotwise photometric data, the flipflop (G15, G16) which detects the selection of the highlight mode and the flipflop (G12, G21) which detects the selection of the shadow mode. In response thereto, "0" is fed to each of the input ports I2 to I5. Then, the variables are reset. Initially, the content (M10) of the flag M10 whcih detects the selection of the memory hold is set to "1". It is to be understood that (M10)=0 represents the establishment of the memory hold. An off mode constant C22 is stored in a photographing mode detecting flag M13. It is to be understood that the flag M13 may contain various constants depending on the respective photographing modes, and is used in combination with another photographing mode detecting flag M12 to determine whether it is now immediately after the mode changing. Subsequently, "0" is stored in a flag M17 which detects whether it is immediately after the selection of the highlight. Then, "0" is stored in a flag M18 which detects whether it is now immediately after the selection of the shadow. As mentioned previously, during a highlight- or shadow-referenced photographing operation, the bar representation once extends to a point corresponding to the maximum or the minimum value of photometric inputs, immediately after the mode has been selected, and then returns to a given exposure level. Accordingly, once the highlight or the shadow mode is selected, any spotwise photometric data which is subsequently inputted causes the bar representation to shift wihout causing it to move once to a point corresponding to the maximum or the minimum value. This explains why it is necessary to determine whether it is now immediately after the selection of the highlight or the shadow mode, by means of the flags M17 and M18. "1" is then stored in a flashing display flag M22. A flashing display is produced by inverting the sign of the flag M12 to allow it to be displayed or to be erased.

Figure 29:
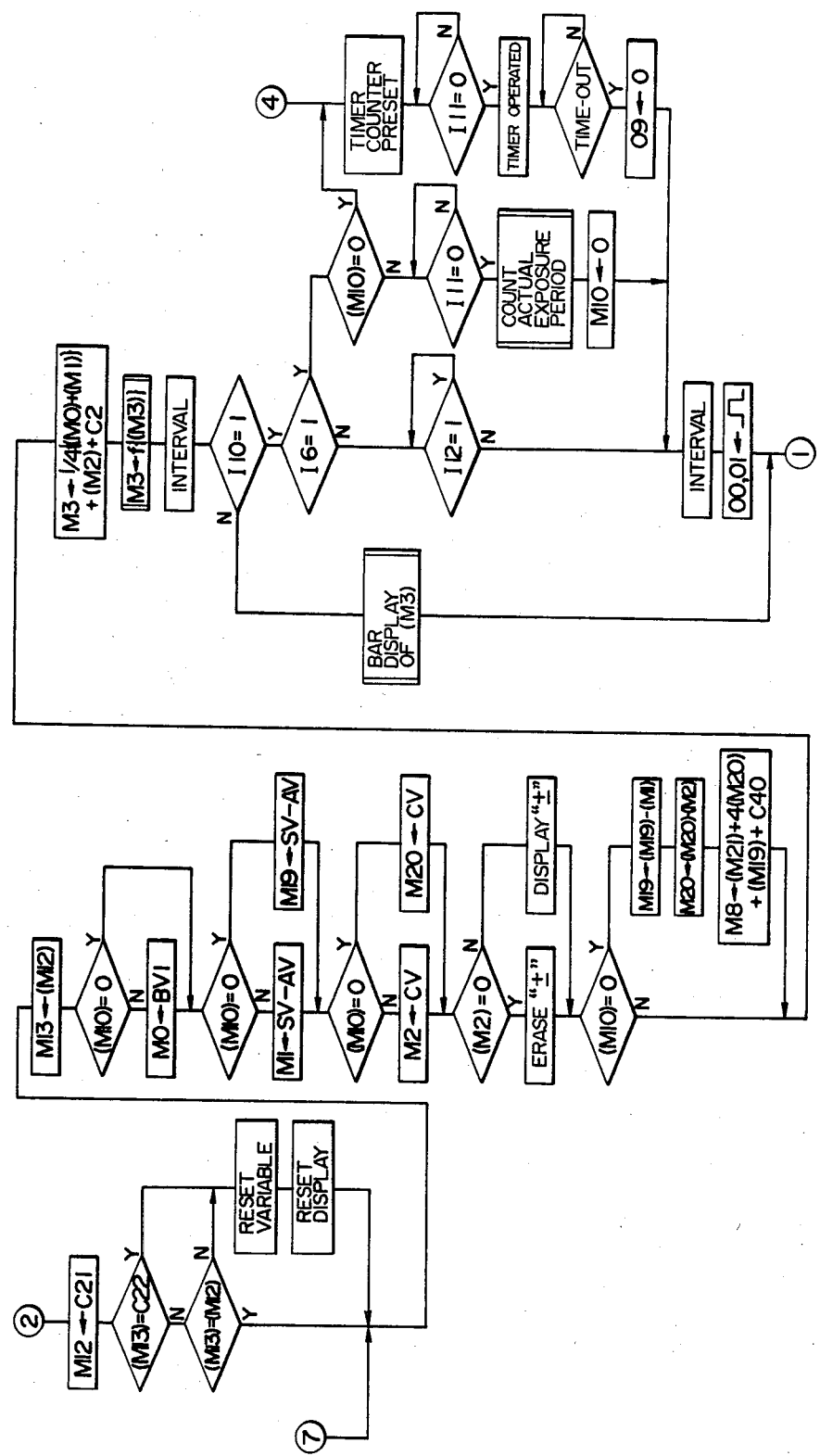
FIG. 29 is a flowchart showing the detail of a program used in the flowchart of FIG. 27B and which is used during an average photometry, direct automatic photographing mode.

When the initialization subsequent to the power on is performed, a decision is then made to see if the input port IO is equal to "1". If IO=1, namely, if the automatic mode is selected, a next decision is made to see if the input port I13 is equal to "1". The input port I13 is equal to 1 whenever the power supply for the electronic flash is turned on. It is assumed that the power supply is not turned on, and hence I13=0. A detection is then made to see if the input port I6 which is used to detect the memory mode is equal to "1". I6=1 when the memory mode is established. It is assumed that the memory mode is not selected now, and hence I6=0. Then "1" is preset into a flag M10 which is used to detect the memory hold, since this flag must be reset because the memory hold is now not established. Subsequently, the display of the segment "MEMO" is cleared, by resetting the content of a memory area in DRAM85 which corresponds to the segment "MEMO" to "0". A non-memory constant C26 is stored in a memory mode detecting flag M11. It is to be noted that the non-memory constant C26 has a different value from constants C20 to C24, C30 AND C31, which will be described later. A decision then follows to determine if the content (M11) of the flag M11 is equal to an average photometry, direct automatic mode constant C21. As mentioned previously, the memory mode may be selected during the average photometry, direct automatic memory in which the exposure control is performed in accordance with the result of the direct photometry in the automatic mode, and also during the spotwise photometry, automatic mode when the exposure control is performed in accordance with the result of the spotwise photometry in the automatic mode. An average photometry, direct automatic mode constant C21 is stored in the flag M11 to use the memory mode in the average photometry, direct automatic mode while a spotwise photometry, automatic mode constant C20 is stored therein when the memory mode is used during the spotwise photometry, automatic mode. Since the memory mode is not selected by assumption, neither is true. Accordingly, the operation makes its exit through NO from the decision block to determine if (M11)=C20, and a decision is now made if the input port I2 which is used to detect the spotwise mode is equal to "1". In the spotwise mode, I2=1. It is assumed that the spotwise mode is not selected, and hence it follows that the photographing mode which remains is the average photometry, diect automatic mode. The program then makes its exit through ②-② to branch to the flowchart for the average photometry, direct automatic mode which is shown in FIG. 29. Here, an average photometry, direct automatic mode constant C21 is stored in the mode detecting flag M12. A decision is then made to see if the content (M13) of a photographing mode detecting flag M13 is equal to an off mode constant C22. The constant C22 is preset in the flag M13 when the variables are reset immediately after the power on. If this is the first pass through the program immediately following the power on, the variables are reset. Unless (M13)=C22, a decision is then made whether the content of the mode detecting flags M12 and M13 are equal to each other. Unless (M13)=(M13), it follows that it is now immediately after the occurrence of a change from another mode into the average photometry, circuit automatic mode, and hence the variables are reset. If (M13)=(M12), this means that this is a second or subsequent pass through the program after the mode has been changed to the average photometry, direct automatic mode, and hence it is unnecessary to reset the variables and the display. It is assumed that this is the first pass through the program after the mode has been changed to the average photometry, direct automatic mode. Then, the variables are reset initially, and a start point for the bar display is initialized. This is accomplished by storing the address of a memory area in DRAM85 which corresponds to the right-most segment shown in FIG. 19, in an rea M14 which stores the start address for the bar representation. This is because it is necessary to indicate the start point in order to provide a positive indication to a photographer that a photographing operation in a new mode has been initiated, inasmuch as the segments are displayed beginning from the right-most segment during the display of a bar representation immediately after the mode changing. The display is then reset. This means that "1" is stored in memory areas in DRAM85 which correspond to segments "AUTO", "LONG", "1" to "2000" and "OVER" shown in FIG. 45, and "0" is stored in all other memory areas in DRAM85.

The content (M12) of the mode detecting flag M12 is then transferred to the mode detecting flag M13 for storage of the photographing mode. Consequently, during a second and a subsequent pass through the program, it is assured that M13)=(M12), inhibiting a resetting of the variables and the display. A decision is then made to see if the content (M10) of the memory hold detecting flag M10 is or is not equal to "0". Since the memory hold is not established, the content (M10) is equal to "1", hence the program makes its exit through NO from the decision block of (M10)="0", followed by the storage of an average Bv value Bv1, as supplied from the input port I7, into a storage area MO therefor.

The manner in which an average Bv value as outputted from the head amplifier 51 in the form of an analog signal is converted into a corresponding digital value will now be described. CPU50 specifies the entry of the average Bv value by establishing "1" at the output port 04 and specifies the entry of Bv value by establishing "1" at the output port 05. The analog signal S8 which is subject to A/D conversion is related to the signals S3 and S7 outputted from the port 04 and 05 such that when the signals S3 and S7 are "1" and "1", respectively, the signal S8 represents the average Bv value while when the signals S3 and S7 are "1" and "0", respectively, the signal S8 represents a spotwise Bv value, and when the signals S3 and S7 are equal to "0" and "1", respectively, the signal S8 represents Sv−Av value. Finally, when the signals S3 and S7 are equal to "0" and "0", respectively, the entry of a signal is inhibited. Since the signals S3 and S7 are equal to "1" and "1", respectively, in the present instance, the analog signal S8 which is subject to A/D conversion represents the average Bv value. Before the A/D conversion starts, the individual inputs to D/A conversion circuit 58 shown in FIG. 17 are all equal to "0". At the initiation of the A/D conversion, only the most significant bit $b_7$ is changed to "1", and an output voltage $V_{DA}$ from the D/A conversion circuit 58 is compared against a voltage $V_{AG}$ representing the analog signal S8 which is subject to A/D conversion. If $V_{AG} \geq V_{DA}$, the comparator A12 produces an output of "1". If the input port I7 is equal to "1", CPU50 then maintains the most significant bit $b_7$ at "1" while setting the most significant bit of a register which stores the result of A//D conversion to "1". If $V_{AG} < V_{DA}$, the most significant bit $b_7$ is reset to "0" while the most significant bit of the register is reset to "0". The described operation is repeated for each of bits $b_7$ to $b_0$, whereby the register which stores the result of the A/D conversion eventually stores a digital value which corresponds to the average Bv value. This digital value is once fed to the accumulator (ACC) 79 and then stored at an address MO. The A/C conversion of the spotwise Bv value and Sv−Av value, which will be described later, takes place in quite the same manner.

Returning to FIG. 29, when the average Bv value is stored in the storage area MO therefor, a decision is then made again to see if (M10)="0". Since the memory hold is not established, Sv−Av value Sv−Av is stored in a storage area M1. A decision to determine if (M10)="0" is made again, and since the memory hold is not established, the Cv value CV supplied from the input port I9 is stored in a storage area M2. A decision then follows to see if (M2)=0. (M2) is equal to 0 in the absence of a correction input, and accordingly, the display of "±" segment is erased, while thedisplay of "±" segment is allowed in the presence of a correction input since then (M2) is no equal to "0". A decision to see if (M10)=0 then follows again to determine whether or not the memory hold is established. The operation enters the calculation of a Tv value. Initially, the average Bv value (MO) and Sv−Av value (M1) are added together, and the sum divided by four. This is because both the Bv value and Sv−Av value are stored with a resolution represented by LSB which corresponds to 1/12 Ev while the display takes place in units of ⅓ Ev. The Cv value (M2) is then added to the result. Since the Cv value is entered with a resolution of LSB which corresponds to ⅓ Ev, there is no need to provide a scaling factor. The constant C2 is then added to the sum to provide a level correction, and the final result is stored in a storage area M3 which is assigned to store a bar display data. A combination of thirty-four bar displaying segments is capable of displaying a brightness in a range having a breadth of 11⅓ Ev. By contrast, the storage capacity of the area M3 ranges from about 0 to 20 Ev. Hence, it is necessary to determine if particular data is located within a range which can be displayed. To this end, the result of calculation (M3) is converted into data which is suitable for display. This is accomplished by executing a data converting subroutine $f\{(M3)\}$.

Figure 43:
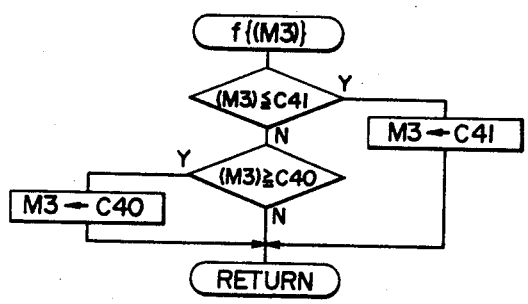
FIG. 43 is a flowchart showing the detail of a program subroutine f{(M3)} which is executed in the course of the flowcharts shown in FIGS. 28 to 38.

The subroutine f{(M3)} is specifically shown by a flowchart of FIG. 43. In this Figure, a constant C41 represents the address of a memory area in DRAM85 which corresponds to the segment "OVER". If (M3)≦C41, any Tv value stored in the storage area M3 is located in the OVER region, and hence the content of the area M3 is treated as C41. If (M3)>C41, the content (M3) of the area M3 is compaed against a constant C40, which represents the address of a memory area in DRAM85 which corresponds to the segment "LONG". If (M3)≧C40, any Tv value stored in M3 is located in the UNDER region, and hence the content (M3) of the area M3 is treated as C40. For C41<(M3)<C40, a Tv value is located within a range which can be displayed in the bar form, and hence this allows the subroutine f{(M3)} to be completed. The operation then returns to the original program.

Figure 45:
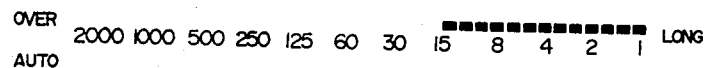
FIGS. 45 to 47 schematically show the manners of display produced by a photographing information display during an average photometry, direct automatic photographing mode; specifically
Figure 46:
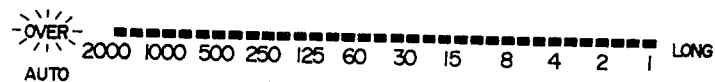
Figure 47:
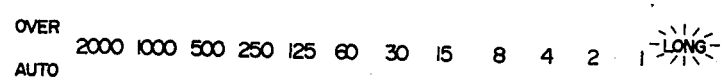

Returning to the program for the average photometry, direct autoumtic mode which is shown in FIG. 29, upon completion of the subroutine f{(M3)}, a delay instruction (nterval instruction) of a given time length is executed, followed by a decision to determine if the release signal input port I10 is equal to "1". The function of the interval instruction will be described later since it is of significance in a photographing operation in the memory mode. The presence of "1" at the input port I10 indicates that the release has taken place. However, it is assumed that the release has not taken place. A bar representation is then displayed in accordance with the bar displaying data (M3). The display of the bar representation is performed by a bar displaying subroutine shown in FIG. 44. Since a variety of manners of displaying bar representations are used in various photographing modes, only the display of bar representation will be described, and the bar displaying subroutine will be described after the description of the entire program has been completed. For C41<(M3)<C40, a display is given as shown in FIG. 45. In this instance, during the first pass through the program immediately after the mode changing, the bar representation begins to be illuminated starting from the rightmost segment, and in the example shown in FIG. 45, it extends to a point which corresponds to the segment "15", indicating an exposure period of 1/15 second. During a second and a subsequent pass through the program after the mode changing, the bar representation begins to be illuminated from the point which corresponds to the extremity of the previous bar representation and extends to a new position. If (M3)=C41, the bar representation extends to the lefthand end, and causes the segment "OVER" to be flashed as indicated in FIG. 46. If (M3)=C40, there is no display of the bar representation, but only the segment "LONG" is flashed.

If a shutter release takes place during the program for the average photometry, direct automatic mode, the operation makes its exit through YES from the decision block of I10=1 (FIG. 29), followed by a decision to see if the memory mode detecting input port I6 is equal to "1". If the input port I6 exhibits "1", it indicates the selection of the memory mode. However, since the memory mode is not selected now, the operation makes its exit through NO from this decision block, followed by a decision to determine the presence of the exposure terminate signal S13 at the input port I12. The signal remains at its "1" level until the electromagnet MG1 which constrains the second blind of the shutter from running is deenergized. Accordingly, the operation loops around the decision block of I12=1 until the termination of the exposure process. When the input port I12 changes to "0" and the exposure process is terminated, it makes its exit through NO from the decision block of I12=1. An interval instruction to provide a delay is then executed. Such an interval instruction is executed by initially loading a given numeral into a register, and then decrementing the content thereof by one until the count therein reaches another given value. It is necessary that the photometry be performed after the downward movement of the movable reflecting mirror 31 is completed and the photometric optics has been stabilized. It requires several tens of milliseconds since the exposure terminate signal S13, a signal which deenergizes the electromagnet MG1, has changed to its "L" level, for the mirror 31 to complete its downward stroke and the photometric optics to be stabilized. The interval instruction is required for this reason. When the execution of the interval instruction is completed, a positive pulse is output to each of the output ports 00 and 01. This is for the purpose of automatically re-establishing the average photometry photographing mode whenever a photographing operation in the spotwise photometry, automatic mode or in the spotwise manual mode is terminated. The operation then makes its exit through ①-① to return to the mode determining program shown in FIG. 28.

Figure 30:
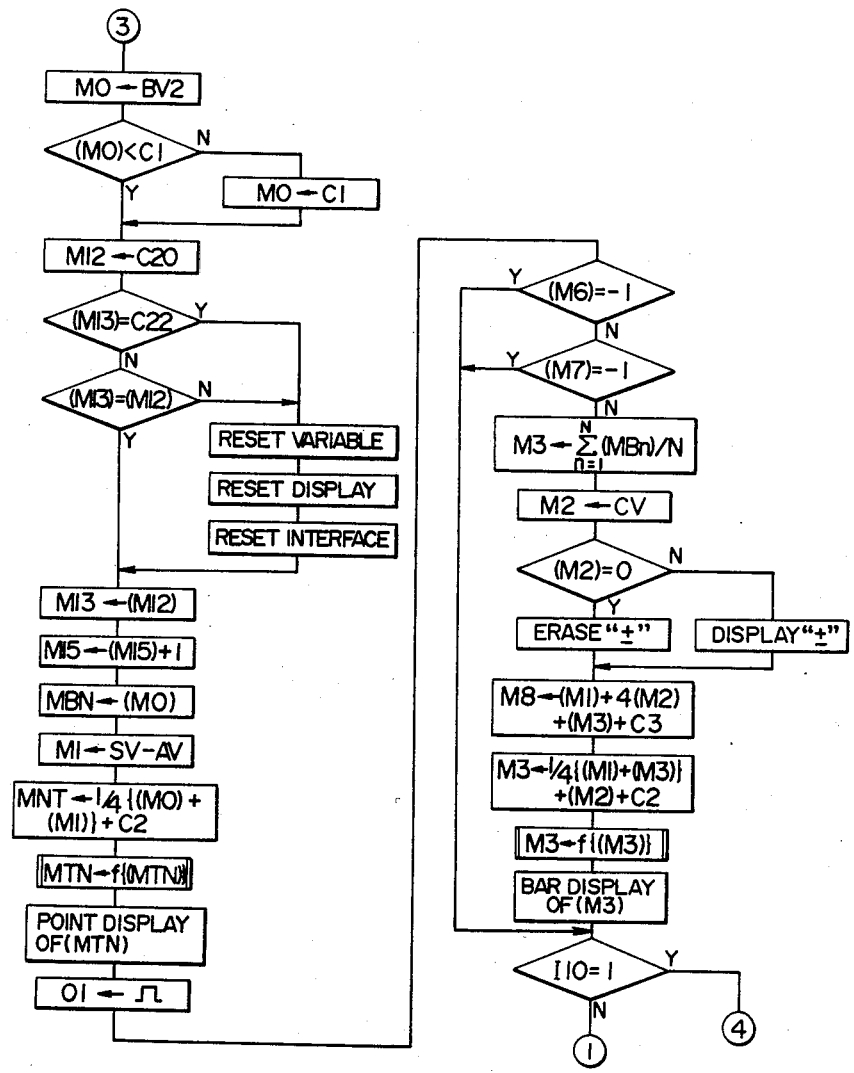
FIG. 30 is a flowchart which represents the detail of the flowchart shown in FIG. 27B and which is used when there is a spotwise photometric input during a spotwise photometry, automatic photographing mode.
Figure 49:

A program for the spotwise photometry, automatic mode will now be described. Assuming that the spotwise entry button 14 (see FIG. 2) is depressed when the automatic mode is established for the camera 10, the spotwise data entry switch SW8 (FIG. 7) is closed, whereby the spotwise mode detecting input port I2 and the spotwise entry detecting input port I3 of CPU50 are preset to "1". In this manner, the spotwise automatic mode is selected during the automatic mode, and there has been the entry of spotwise data. The spotwise photometry, automatic mode represents the automatic mode as does the average photometry, direct automatic mode, and hence it progresses through the same path to the decision block of I2=1 (FIG. 28), from which the average photometry, direct automatic mode has made its exit through ②. However, in the present instance, the program makes its exit through YES from this decision block, followed by a decision to see if the content (M13) of the mode detecting flag M13 is or is not equal to a constant C24 representing the spotwise photometry, manual mode. The arrangement of the electrical circuit used in the camera 10 requires such decision in the following instances: As mentioned previously, the manual mode includes the normal manual mode and the spotwise manual mode. In the spotwise manual mode, the spotwise mode detecting input port I2 is preset to "1", and if the auto switch SW4 is closed under this condition to change the photographing mode into the automatic mode, it follows that there occurs a direct change from the spotwise manual mode to the spotwise automatic mode. Generally, taking a picture in the spotwise mode is a relatively rare occurrence as compared with the frequency of the general photographing operation. And hence it is an appropriate choice to establish the average photometry, direct automatic mode or the normal manual mode unless an operation to establish a spotwise mode is made. Accordingly, in the camera 10 of the invention, an arrangement is made to establish the average photometry, direct automatic mode when changing from the manual to the automatic mode, and to establish the normal manual mode when changing from the automatic to the manual mode. Immediately after changing from the spotwise manual mode to the automatic mode, during an early stage of the program for the spotwise automatic mode to be described later (see FIG. 35), the mode detecting flag M13 is preset to a constant C24 representing the spotwise manual mode. Hence, "1" pulses are fed to the output ports 00, 01, thus resetting the flipflop (G7, G9) which detects the spotwise mode and the flipflop (G11, G12) which detects the spotwise data entry, while resetting the input ports I2, I3 to "0". If it is not immediately after changing from the spotwise manual mode to the automatic mode, a decision to see if (M19)=0 follows (FIG. 28). Since the memory hold is not established, the content (M10) of the memory hold detecting flag M10 is equal to "1", thus making its exit through NO from this decision block. Then follows a decision to see if I3=1. Since it is assumed that the spotwise entry detecting input port I3 is equal to "1", indicating that there has been the entry of spotwise data, the program makes its exit through 3 - 3 , branching to the flowchart shown in FIG. 30 which is used for the spotwise automatic mode with entry of spotwise data. In this Figure, spotwise Bv value BV2 is stored in a storage area MO therefor. A technique for storing spotwise Bv value BV2 in digital form, obtained after A/D conversion, has been described previously in connection with a storage of the average Bv value BV1. A decision is then made to see if the spotwise Bv value (MO) is less than a preset value C1. If (MO)≧C1, the constant C1 is transferred to the area MO. In general, there is a limit on the brightness of an object being photographed which can be determined by a photometric circuit. In particular, light of a very low intensity presents a problem. This is because as the brightness of the object diminishes, the resulting photocurrent also reduces, increasing the magnitude of an error which results from leakage current, noise, and the loss of linearity of a logarithmic compression diode. As a result, even though the spotwise Bv value (MO) should originally be of a higher magnitude which represents a lower brightness, it may exhibit a reduced value, causing a greater error to be produced if the exposure control is based on such reduced value. For this reason, if the spotwise Bv value (MO) is equal to or exceeds a photometric limit corresponding to the value C1, the spotwise Bv value (MO) is fixed to the limit value. A constant C20 representing the spotwise photometry, automatic mode is then stored in the flag M12, thus storing the photographing mode. Then follow decisions to determine if it is immediately after the power on and if it is now immediately after the mode changing, by seeing if (M13)=C22 and if (M13)=(M12) (FIG. 30). If the answer is in the affirmative, a resetting of the variables, the display and the interface occurs. It is to be understood that the decision to see if the content (M13) of the mode detecting flag is equal to the constant C24 which represents the spotwise manual mode may be performed at this point in the program. Considering a resetting of the variables or internal registers, the content of an overlap detecting flag M5 is initially preset to "1". In the spotwise mode, a result of the calculation of current photometric value is displayed in a high rate flashing form. In the event the display of current photometric value overlaps with the display of spotwise data entered, a flashing display of the current photometric value predominates. The overlap detecting flag M5 is provided for this purpose, and will be further described later. The content of a highlight selection detecting flag M6 is then preset to "1", followed by presetting the content of a shadow selection detecting flag M7 to "1". When these flags M6, M7 are equal to "1", it indicates that neither the highlight nor the shadow mode is selected. Then the address of a start segment for the bar representation is stored in an associated storage area M14. As mentioned previously, the start segment for the bar representation which is to be displayed immediately after the mode changing corresponds to the rightmost segment. The content of a storage area M15 which stores the number of spotwise data entered is reset to "0". The area M15 functions to count and store the number of spotwise data entered. The display is then initialized. Referring to FIG. 49, the segments "SPOT", "LONG", "OVER", "AUTO" and "1" to "2000" are displayed. These segments must be displayed in the spotwise photometry, automatic mode, and hence are displayed immediately after the mode changing. The interface is then initialized. This is accomplished by outputting "1" pulses to the output ports 02, 03, thus resetting the flipflop (G15, G16) which detects the highlight mode and the flipflop (G19, G21) which detects the shadow mode. "1" is outputted to the output port 09 establishing a standby condition for the shutter control signal S16 which is to be applied to the electromagnet MG1 which operates to constrain the second blind of the shutter from running.

Then the constant C20 which represents the spotwise photometry, automatic mode and which is stored in the flag M12 is transferred to the mode detecting flag M13 (FIG. 30). This prevents the initialization from being performed during a subsequent pass through the program. The content of the area M15 which stores the number of spotwise data entered is incremented by 1. The spotwise Bv value BV2 stored in the area MO is transferred to a register at an address MBN. The character "N" in the designation of the address "MBN" implies an address corresponding to the content of the area M15. The Sv−Av value (SV−AV) is stored in the storage area M1, followed by the addition of the spotwise Bv value (MO) and the Sv−Av value (M1), with the sum divided by four and added with a constant C2, with a final result stored in a register at an address MTN. The character "N" in the designation of the address "MTN" implies an address corresponding to the content of the area M15. The connotation of this calculation formula has been described previously in connection with the average photometry, direct automatic mode. Using the content stored at the address MTN as a variable, the subroutine f{(MTN)} (see FIG. 43) is executed, and the result of the arithmetic operation is converted into data for display which is then again stored at the address MTN. The Tv value (MTN) of the spotwise value is then displayed in the point form (see FIG. 48). At this stage, there is no flashing of the display in the bar representation and the point which represents the current photometric value. Then follows a positive pulse output at the output port 01. In the spotwise mode, both the flipflop (G7, G9) which detects the spotwise mode and the flipflop (G11, G12) which detects the entry of spotwise data are operative. However, when the sequence for the entry of spotwise data is terminated, it is necessary that the flipflop (G11, G12) which detects the entry of spotwise data be reset to allow it to be ready to receive another entry of spotwise data. The positive pulse output is delivered to the output port 01 at this end. Then follow decisions to see if the content (M6) of the highlight selection detecting flag M6 is or is not equal to "−1" and to see if the content (M7) of the shadow selection detecting flag M7 is or is not equal to "−1" FIG. 30. If (M6)=−1 or if (M7)=−1, either the highlight or the shadow mode is selected, and hence a bar representation corresponding to the arithmetic means of spotwise data is not displayed. If neither the highlight mode nor the shadow mode is selected, and thus (M6)≠−1 and (M7)≠−1, the operation then enters a program to display a bar representation corresponding to the arithmetic mean of spotwise data entered. In this program, a mean value $$\sum_{n=1}^{N} (MBn)/N$$

of spotwise Bv values (MBn) (for n=1 to N) which are produced by the entry of spotwise data is initially obtained, and is stored in a storage area M3 which is assigned to store bar displaying data. A Cv correction value CV is then stored in the storage area M2. Whether or not a correction is made is determined by seeing if the correction value (M2) is equal to "0". If there is a correction, the segment "±" is displayed (see FIG. 50) while if there is no correction, the display of the segment "±" is erased (see FIG. 48). Then, a total of the arithmetic mean (M3) of spotwise Bv values, Sv−Av value (M1), four times the Cv value, namely, 4(M2), and a constant C3 is stored in a storage M8 which is assigned for storage of an exposure period. The Cv value (M2) is multiplied by a factor of four before it is added in order to produce an equal weight of LSB. Specifically, the Bv value (M3) and Sv−Av value (M1) have LSB which is equal to 1/12 Ev while Cv value (M2) has LSB which is equal to ⅓ Ev. Hence, by multiplying the Cv value (M2) by a factor four, the weight of the least significant bit is made equal to that of Bv value and Sv−Av value. In this manner, the content (M8) of the area M8 represents an exposure period or a shutter speed information which is used to effect an exposure control. Upon shutter release, a value corresponding to the content (M8) is preset in a timer counter for purpose of exposure control, as will be further described later. The Sv−Av value (M1) and the arithmetic mean (M3) of spotwise Bv values are then added together and then the sum divided by four before the total is added with the Cv value (M2) and the constant C2 to be stored in the storage area M3 which is assigned for storage of bar displaying data. Subsequently, using the content (M3) of the area M3 as a variable, the subroutine f{(M3)} is executed to convert the content (M3) into a corresponding Tv value in order to enable a display in the bar form. A subroutine to display a bar representation is then executed, thus displaying the Tv value (M3) in the bar form (see FIG. 48). If the entry of spotwise data represents the first entry, the display starts from the right-most segment when it is displayed. On the other hand, if it represents a second and a subsequent entry, the bar representation starts from the end of the previous bar representation and moves to the segment located at a desired position. If the Tv value (M3) after its conversion into bar displaying data is equal to a constant C41, the bar representation extends to the left-most segment while simultaneously causing a flashing of the segment "OVER", as indicated in FIG. 49. If the Tv value (M3) after its conversion into bar displaying data is equal to a constant C40, the bar representation disappears while the segment "LONG" flashes. The display in the bar form will be described in further detail later.

In the event the display of a bar representation is terminated or the program makes its exit through YES from the decision block of (M6)=−1 or (M7)=−1, a decision is then made to see if I10=1, determining if a shutter release has taken place. If no shutter release has taken place, the input port I10 has a value of "0", and hence the program makes its exit through NO from the decision block of I10=1, and returns to the mode determining program of FIG. 28 again through ①-①. If the shutter release has taken place, the program makes its exit through ④ ④ to enter a program for the exposure control shown in FIG. 29. This program will be described later.

The program for the spotwise, automatic mode, but in which there is no entry of spotwise data, or when I2=1 and I3=0, will now be described. In this instance, in the mode determining program of FIG. 28, an exit is made through YES from the decision block of I2=1 and through NO from the decision block of I3=1, thus branching to a program shown in FIG. 31 through ⑤ -⑤. In this program, the Sv−Av value (SV−AV) is initially stored in the storage area M1 therefor. The Cv value CV is stored in the storage area M2. Since there is no entry of spotwise data, it should be obvious that there is no input of spotwise Bv value. Then follows a decision to see if (M2)=0. If there is a correction, the segment "±" is displayed (see FIG. 50), and if there is no correction, the segment "±" is erased (see FIG. 48). The display of spotwise entry data (MTn) (for n=1 to N) is entirely erased. This is because it is necessary to modify the point display in accordance with a change in the Sv−Av value since the point display of spotwise entry data is given to display the Tv value in the point form which is determined on the basis of the brightness of an object being photographed (spotwise Bv value) immediately after the spotwise data entry and the Sv−Av values which are obtained at various points in time. As mentioned previously, the spotwise Bv value for each spotwise data entry is store in an individual register MBn (for n=1 to N). The Tv value corresponding to the spotwise Bv value stored in each of the register MBn is calculated in accordance with the following formula:

¼{(M1)+(MBn)}+C2 (for n=1 to N).

The Tv value corresponding to the spotwise Bv value which is stored at the address MBn is stored in an individual register Mtn. The subroutine f{(MTn)} is executed for the content (MTn) of each register MTn, and the Tv value (MTn) (for n=1 to N) is converted into a corresponding display data. The Tv value (MTn) (for n=1 to N) as converted into display data is displayed in the point form. Then follows a decision to see if the content (M6) of the highlight selection detecting flag M6 is equal to "−1", and a decision to see if the content (M7) of the shadow selection detecting flag M7 is equal to "−1". If (M6)=−1 or (M7)=−1, either the highlight or the shadow mode is selected, and hence no display of the arithmetic mean of spotwise entry data in the bar form is made, jumping to the step of entering the spotwise Bv value (M0←BV2), as will be described later. Assuming that neither the highlight nor the shadow mode is selected, the operation then enters a program to display the arithmetic means of spotwise entry data in the bar form. Initially, the arithmetic mean $$\sum_{n=1}^{N} (MBn)/N$$

of the spotwise Bv values (MBn) (for n=1 to N) entered is calculated, and is stored in the storage area M3 which is assigned to store the bar displaying data. Then the arithmetic mean (M3), the Sv−Av value (M1), four times the Cv value 4(M2) and the constant C3 are added together, with the sum stored in the storage area M8 which is assigned to store an exposure period. The content (M8) of the area M8 represents an exposure controlling data, as mentioned previously. To simplify the description, the significance of the arithmetic formulae which have previously been described will not be repeatedly described in the description to follow. The Tv value is then determined by the formula ½{(M1)+(M3)}+(M2)+C2, and is stored in the storage area M3. The subroutine f{(M3)} is then executed to convert the content (M3) into corresponding display data, and the subroutine which is used to display a bar representation is executed to display such content in the bar form.

Then a program to display the current photometric value in a flashing form is entered. This program includes a calculation of display data for the current photometric value, a processing which allows a flashing display of the current photometric value to predominate over the display of spotwise entry data in the event a coincidence occurs therebetween, and a processing to control the period of the flashing display of the current photometric value. The calculation of display data for the current photometric value will be described first. The spotwise Bv value BV2 is initially stored in the storage area MO. Then the Tv value is calculated by the formula ½{(MO)+(M1)}+C2, and is stored in a storage area M4 which is assigned to store point display data. A subroutine f{(M4)} is then executed to convert the content (M4) into corresponding display data, which is again stored in the area M4. Whenever the current photometric value which is displayed in the point form is to be updated, an old point display must be erased. Specifically, the content of a memory area at an address within DRAM85 which corresponds to the point display must be reset to "0". However, in the event the current photometric value, which has been in overlapping relationship with the display of the spotwise entry data, is updated to change its position, the old value which the photometric data had before it is updated must be left in display as spotwise entry data. A program to perform such processing then follows. To this end, initially, a decision is made to see if the content (M5) of an overlap detecting flag M5 is equal to "1". If the content (M5) is not equal to "1", indicating the presence of an overlap, a decision then follows to see whether the display data (ZM4) for the current photometric value which is now to be displayed is equal to the display data (M5) for the photometric value which is currently displayed. If data (M4) and (M5) are unequal to each other, a decision is then made to see if the display data (M5) which is currently displayed is unequal to any one of a plurality of spotwise entry data (MTn) (for n=1 to N). If any one of these data is equal, the data (M5) is displayed in the point form, and if there is no data which is equal to the display data (M5), the display of the data (M5) is cleared to update the display.

If the program makes its exit through YES from the decision block of (M5)=1, this implies that this is the display of the initial current photometric value, and hence there is no need to update. Then display data (M4) for the fresh current photometric value is transferred to the address M5. In response to a decision that I10=1, it is determined whether or not the release has taken place. If I10=1, an exit is made through ④ - ④ to branch to the exposure control program shown in FIG. 29. If I10 is unequal to 1, no shutter release has taken place, and hence a program is entered which causes a flashing display of the current photometric value. Initially, a constant C50 which represents the period of the flashing display is stored in a storage area M23, and then the operation enters a subroutine WAIT3 shown in FIG. 41 which is used to produce a flashing display. In the subroutine WAIT3, a flag M22 which is used to produce a flashing display is inverted initially and then the operation jumps to a subroutine WAIT2 shown in FIG. 40 which counts the flashing period, thus executing a delay program. The flashing period of the display is determined by the subroutine WAIT2 in combination with a program execution time during the spotwise photometry, automatic mode. In the subroutine WAIT2, the content of the storage area M23 is sequentially decremented by one while re-storing the result in the area M23 until the content (M23) is equal to "0". The decrementing operation continues unless (M23) is equal to 0. When (M23)=0, the program makes its exit through YES and inverts the sign of the flashing display flag M22, followed by RETURN. The execution of the subroutine WAIT2 produces a desired time delay. Subsequently, in the subroutine WAIT3, a decision is made to see if the flag M22 is equal to "1". If the answer is YES, the diaplay data (M5) for the current photometric value is displayed in the point form while if the answer is NO, the display of data (M5) is cleared. During a next pass through the program, the flag M22 is inverted during the subroutine WAIT2, and accordingly the point displayed is erased or the point which has previously been erased is displayed. In this manner, an inversion of the display condition during alternate pass through the program is achieved, thus producing a flashing display of the current photometric value. After the data (M5) is either displayed or cleared, the processing in the subroutine WAIT3 is terminated, and the program makes its exit through RETURN. It is to be understood that the display of data (M5) means the storage of "1" in a memory area having the address (M5) in DRAM85 while the clearing of data (M5) represents the storage of "0" in a memory area having the address (M5) in DRAM85.

Figure 31:
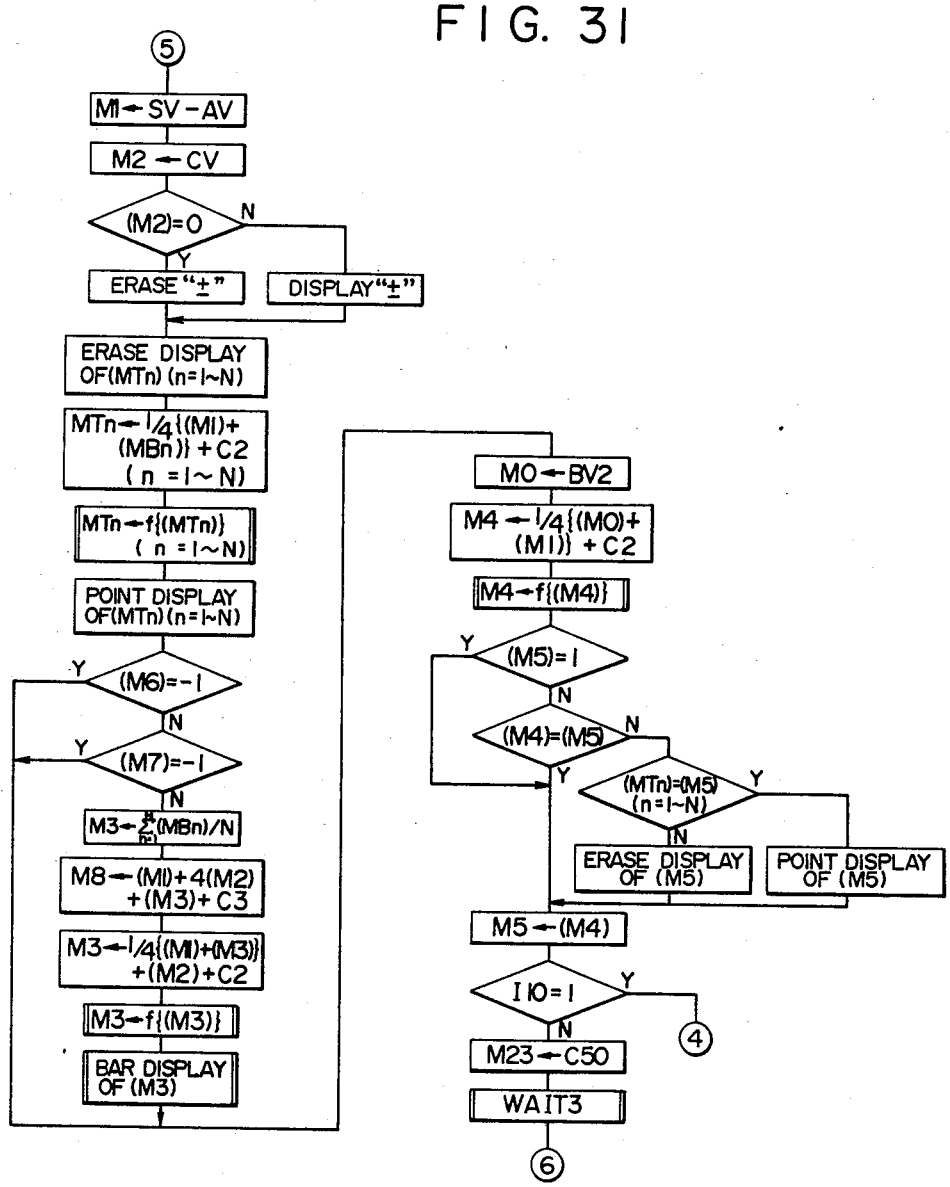
FIG. 31 is a flowchart which represents the detail of the flowchart shown in FIG. 27B and which is used when there is no spotwise photometric input during the spotwise photometry, automatic photographing mode.
Figure 32:
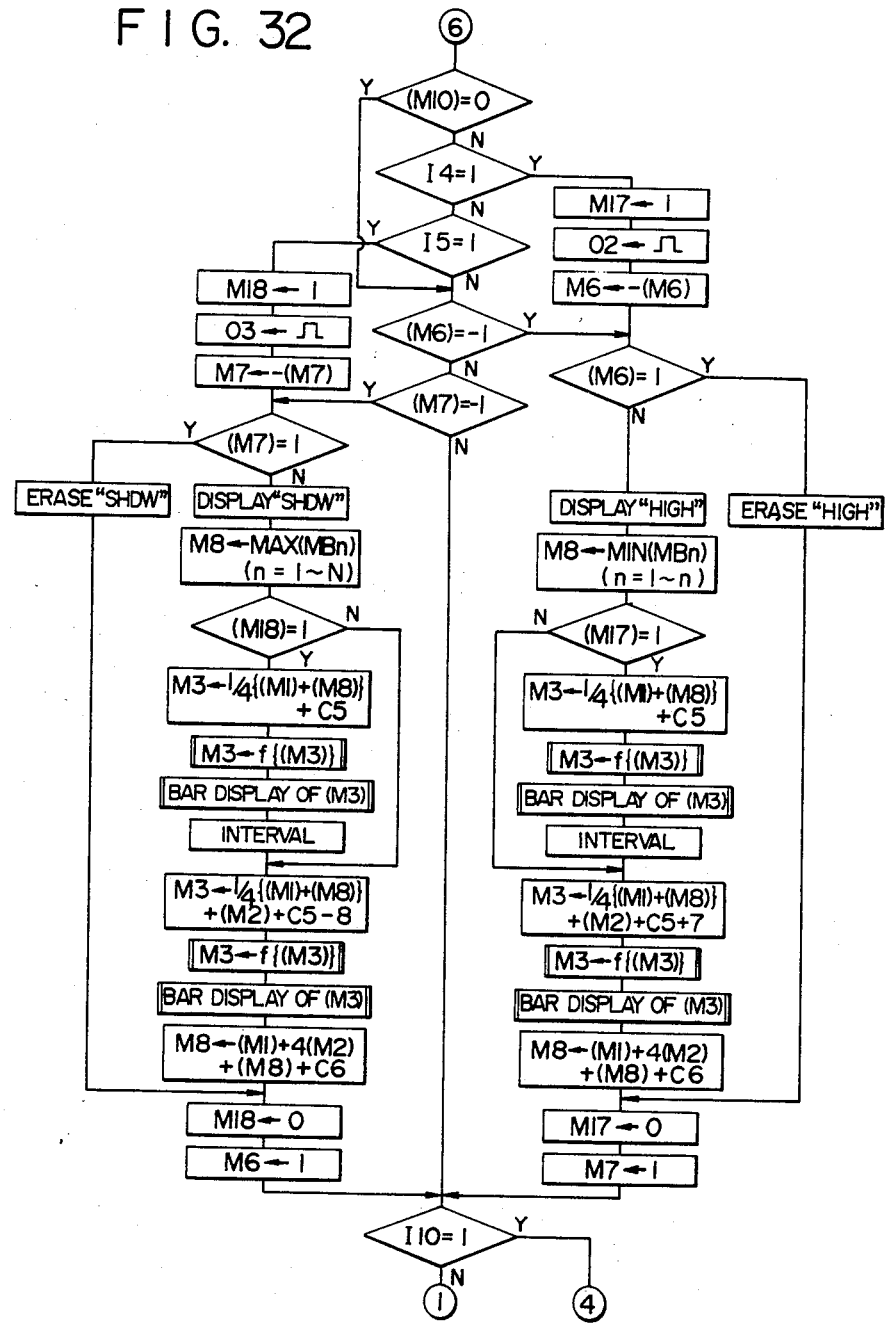
FIG. 32 is a flowchart, illustrating the detail of a program used during a highlight referenced photographing mode and a shadow referenced photographing mode, which is executed in succession to the flowchart shown in FIG. 31 which is used when there is no spotwise photometric input during the spotwise photometry, automatic photographing mode.
Figure 33:
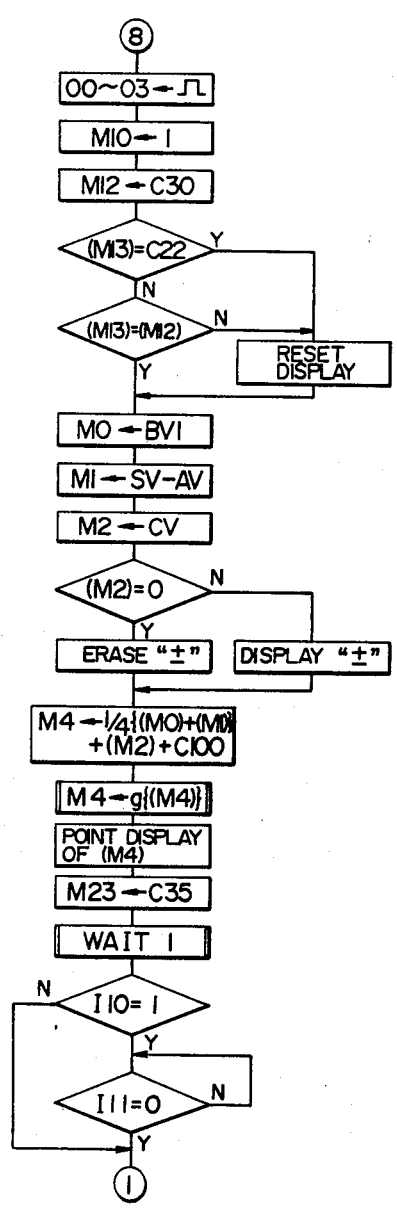
FIG. 33 is a flowchart which represents the detail of a program used during an electronic flash activated, automatic photographing mode and which forms part of the flowchart shown in FIG. 27A.

The program shown in FIG. 31 then makes its exit through ⑥ - ⑥, which continues to a program shown in FIG. 32 which indicates a processing for the highlight and the shadow mode. Initially, a decision is made to see if (M10)=0 or whether the memory hold is or is not established. Since it is assumed that the memory hold is not established or (M10)=1, the program makes its exit through NO from this decision block and then determines whether there is a highlight selection, by seeing if I4=1. Since there is no highlight selection and I4=0, the program then proceeds to determine if there is shadow selection by seeing if I5=1. There is no shadow selection and I5=0, and the program then proceeds to the detection of the highlight selection detecting flag M6 and the shadow selection detecting flag M7.

In the highlight or the shadow mode, the selection of either mode an even number of times resets the mode. Also, a mode changing from the highlight to the shadow mode or vice versa, causes the mode which is eventually selected to be effective. Both flags M6 and M7 are required at this end. Since neither the highlight nor the shadow mode is selected or (M6)=1 and (M7)=1, a decision is then made to see if I10=1, thus determining if the release has taken place. If no release has taken place, an exit is made through ①-① to the mode determining program shown in FIG. 28. If the release has taken place, an exit is made through ①-① to branch to the exposure control program shown in FIG. 29.

Returning to FIG. 29 which shows the exposure control program, the content (M8) of the storage area M8 which is assigned to store an exposure period is preset in the timer counter. Since the Tv value (M8) has an accuracy of LSB or 1/12 Ev, an approximation of the Tv value (M8) is made in the following manner before it is preset in the timer counter. Representing the Tv value which represents the content of the area M8 in duodecimal notation, $$Tv = 12(12X + Y + 1/12Z) \quad (1)$$

where X, Y and Z are integers. Accordingly, an exposure period T can be expressed as follows:

$$T = (1/f)2^{(Tv/12)} = (1/f)2^{12X+Y+1/12Z} \quad (2)$$

where f represents the frequency of the clock pulse CK. This can be approximated by the following equation:

$$T = (1/f)(1 + Z/12)1] 2^{12X+Y} \quad (3)$$

Accordingly, when presetting the Tv value (M8) in the timer counter, the Tv value (M8) is initially divided by 12, and then a duodecimal fraction (which is assumed to comprise four bits) is determined. The least significant bit of the timer counter is then set to "1", followed by loading the four bits representing the fraction into the counter beginning from the least significant digit thereof while sequentially shifting by one bit. Thus it is assured that the fifth bit from the least significant bit is equal to "1" and the four least significant bits represent the fraction. These five bits are then shifted by (12X+Y−4) bit positions toward the most significant bit position. This permits the Tv value (M8) to be loaded into the counter in a manner to satisfy the equation (3). Then the program loops around a decision block of I11=0, thus waiting for the trigger to be opened, whereupon the input port I11 becomes equal to "1". The timer counter is then decremented with a period of 1/f, thus counting the exposure period. When the content of the timer counter becomes equal to "0", the exposure process must be terminated. Accordingly, "0" is outputted to the output port 09, thus terminating the exposure process. An interval instruction is then executed, and the operation makes its exit through ①-① to return to the mode determining program shown in FIG. 28. The execution of this interval instruction is necessary to allow a time interval of about several tens of milliseconds since the shutter control signal S16 is outputted to deenergize the electromagnet MG1, which constrains the second blind of the shutter, until the movable reflecting mirror 31 completes its downward movement to enable the photometry again.

A program when the highlight mode is selected during the spotwise photometry, automatic mode will now be described. In the spotwise photometry, automatic mode, assuming that there is no entry of spotwise data and I3=0, an exit is made through NO from the decision block of I3=1 in the mode determining program of FIG. 28, and through ⑤-⑤ to branch to the program for the spotwise photometry, automatic mode without entry of spotwise data. A subsequent flow through the program is similar to that in the normal spotwise photometry, automatic mode, and hence will not be described. It is assumed that the program has proceeded to a point where a modification of the display of spotwise entry data is completed. This means that in the program of FIG. 31, the step of displaying in the point form data (MTn) (for n=1 to N) has been completed. Then decisions are made to see if (M6)=−1 and (M7)=−1, determining if there is the selection of the highlight or the shadow mode. At this point, (M6)=1 and (M7)=1. Accordingly, the program for the normal spotwise photometry, automatic mode is executed, and data (M3) is displayed in the bar form. When the program further proceeds, it makes its exit through ⑥-⑥ to enter a program shown in FIG. 32. Here, a decision is made initially to see if (M10)=0, but since the memory hold is not established, it makes its exit through NO from this decision block, followed by the level detection of the input port I4 which is used to detect the highlight mode. Since the highlight mode is selected or I4=1, an exit is made through YES from the decision block of I4=1, followed by the storage of "1" in the flag M17 which indicates that this is a first pass through the program after the selection of the highlight mode. A positive pulse is delivered to the output port 02 in order to reset the flipflop (G15, G16) which detects the selection of the highlight mode. The content of the flag M6 which is used to detect the selection of the highlight mode is then inverted. The highlight mode is established when (M6)=−1, and is reset when (M6)=1. Thus, when the flipflop (G15, G16) is set an even number of times, it follows that (M6)=1, thus resetting the highlight mode. When the flipflop is set an odd number of times, it follows that (M6)=−1, thus selecting the highlight mode. It is assumed that the highlight mode is selected and (M6)=<1. The segment "HIGH" is then displayed (see FIG. 51). Then the minimum value MIN (MBn) (for n=1 to N) of spotwise Bv values MBn is determined, and is stored in a storage area M8. A decision is then made to see if the content (M17) of the flag M17 is equal to "1". If (M17)=1, or if this is the first pass through the program after the selection of the highlight mode, it is necessary to allow the bar representation to extend to a point which corresponds to the minimum value MIN (MBn) (see FIG. 51). A program for this processing will now be described. Initially, the Tv value is calculated according to the formula ½{(M1)+(M8)}+C5, and is stored in the storage area M3 which is assigned to store the bar displaying data. It is to be understood that (M1) represents the SV−Av value, (M8) the minimum value of spotwise Bv values which have been entered and C5 a constant. The Tv value (M3) is then converted into corresponding display data by executing the subroutine f{(M3)}, and is displayed in the bar form. The execution of an interval instruction then follows. This interval instruction serves to produce a time to execute the display in the bar form of an exposure period which exceeds the value (M3) by 2⅜ Ev, since otherwise the recognition of the display may be rendered difficult because the bar representation extends to a point corresponding to the maximum brightness and then immediately moves to a point which exceeds such value by 2⅜ Ev. In the event (M17)=−1, the maximum brightness value is not displayed in the bar form, but instead a bar representation which exceeds by 2⅜ Ev the point display of spotwise entry data corresponding to the maximum brightness value is displayed. To this end, the Tv value is initially calculated according to the formula ½{(M1)+(M8)}+(M2)+C5+7, and is stored in the area M3. The number "7" corresponds to 2⅜ Ev. A correction value (M2) is included in this calculation. By executing the subroutine f{(M3)}, the data (M3) is converted into corresponding display data and is then stored in the area M3 again. The data (M3) is displayed in the bar form (see FIG. 52). An exposure period during the highlight mode is calculated according to the formula (M1)+4(M2)+(M8)+C6, and is stored in the storage area M8. In this formula, (M1) represents the Sv−Av value, (M2) the Cv value, (M8) the Bv value for the maximum brightness and C6 a constant. What has been described above is the operation when (M6)=−1 in the decision block of flag M6. However, when (M6)=1, the display of the segment "HIGH" is erased, followed by resetting the flag M17 to "0", thus indicating that the first pass through the program after the selection of the highlight mode has been terminated. The flag M7 which detects the selection of the shadow mode is set to "1", thus resetting it. Subsequently, the decision block of I10=1 determines whether the shutter release has taken place, and the program then makes its exit through ①-① or ④-④ to branch into given corresponding flowcharts in the same manner as during the normal spotwise photometry, automatic mode.

The selection of the shadow mode during the spotwise photometry, automatic mode will now be described. A portion of the program which is similar to that used during the normal spotwise photometry, automatic mode and the highlight mode will not be described in detail. In the flowchart of FIG. 32, the program makes its exit through NO from the decision blocks of (M10)=0 and I4=1 when the shadow mode is selected, following a decision block to see if I5=1. If the shadow mode is selected, I5=1, and hence "1" is stored in the flag M18 which detects that it is now immediately after the selection of the shadow mode, "1" indicating that this is the first pass through the program after changing to the shadow mode. A positive pulse is delivered to the output port 03 to reset the shadow mode detecting flipflop (G19, G21), thus resulting in I5=0. Then the sign of the shadow mode detecting flag M7 is inverted in order to clear the shadow mode whenever the selection of the shadow mode occurs an even number of times in succession, just in the same manner as in the highlight mode. During the resetting of variables shown in FIG. 30, it is established that (M7)=1. Accordingly, during the first pass through the program, (M7)=−1. Hence, an exit is made through NO from the decision block of (M7)=1, thus effecting the display of the segment "SHDW" (see FIG. 55). Then follows the determination of the minimum value, MAX (MBn) (for n=1 to N), of brightness which are supplied as spotwise inputs. It is to be noted that the greater the magnitude of data (MBn), the lower the level of the brightness, and thus the maximum value of data (MBn) corresponds to the minimum brightness level. The minimum brightness level MAX (MBn) is then stored in the storage area M8 which is assigned to store an exposure period. A decision is then made to see if (M18)=1 in order to determine whether this is the first pass through the program after changing to the shadow mode, and an exit is made through YES from this decision block. Then a bar displaying data which corresponds to the minimum brightness level MAX (MBn) is calculated according to the formula ½{(M1)+(M8)}+C5, and the result is stored in the storage area M3. It is to be noted that (M1) represents Sv−Av value, (M8) the minimum brightness level MAX (MBn), (M2) the Cv value and C5 the constant. The subroutine f{(M3)} is then executed to convert data (M3) into bar displaying data. A bar representation corresponding to the minimum brightness level MAX (MBn) is then displayed (see FIG. 55). An interval instruction is then executed for the purpose which is similar to the execution of an interval instruction during the highlight mode. In this manner, during the first pass through the program after changing to the shadow mode, the bar representation is displayed so as to extend to a point which corresponds to the point display of the minimum brightness level. During a second and a subsequent pass through the program, such display is unnecessary, and hence an exit is made through NO from the decision block of (M18), immediately transferring to the subsequent program portion which will be described below. Thus, a program is executed which displays a bar representation extending to a point which is 2⅝ Ev less than the minimum brightness level. To this end, a Tv value corresponding to such point is calculated according to the formula ½{(M1)+(M8)}+(M2)+C5−8, and the result is stored in the storage area M3 which is assigned to store bar displaying data. It will be understood that (M1) represents Sv−Av value, (M8) the minimum brightness level MAX (MBn), (M2) the Cv value and C5 the constant. The number "8" which appears in the formula as a subtrahend represents 2⅝ Ev. The subroutine f{(M3)} is then executed to convert data (M3) into corresponding bar displaying data, which is then displayed (see FIG. 56). An exposure period to be used during the shadow mode is determined according to the formula (M1)+(M8)+4(M2)+C6, and is stored in the storage area M8 which is assigned to store an exposure period. On the other hand, if the decision block of (M7)=1 resulted in making an exit through YES, this means that the shadow mode is reset, and hence the display of the segment "SHDW" is erased, thus avoiding the display of a bar representation corresponding to the minimum brightness level and a bar representation which is by 2⅝ Ev less than the minimum level. Subsequently, "0" is stored in the flag M18 which is used to detect whether it is now immediately after the selection of the shadow mode. Accordingly, during a second and a subsequent pass through the program for the shadow mode, the display of a bar representation representing the minimum brightness level is avoided as a result of the determination of the content (M18) of the flag M18. Also the highlight mode detecting flag M6 is reset to "1". A decision block to see if I10=1 determines whether the shutter release has taken place, then making an exit through ①-① or ④-④ to branch into respective programs.

In the highlight and the shadow mode, during a second and a subsequent pass through the program, it will be seen that I4=0 and I5=0. Hence an exit is made through NO from the decision blocks of I4=1 and I5=1, followed by the decision to see if (M6)=−1 and (M7)=−1. If (M6)=−1, the highlight mode is selected, and hence the program for the highlight mode which has been mentioned above is executed. If on the contrary (M7)=−1, the shadow mode is selected, and hence the program for the shadow mode which has been mentioned above is executed. If neither is true, the program then directly proceeds to a decision block to see if I10=1 which determines whether or not the shutter release has taken place, then branching to respective programs through ①-① or ④-④.

Figure 42:
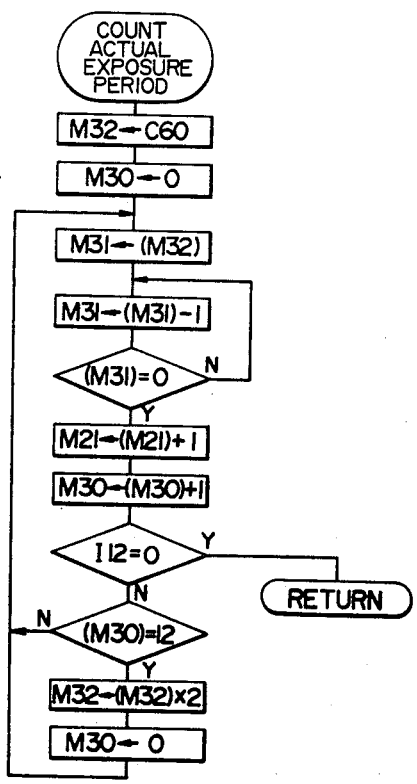
FIG. 42 is a flowchart showing the detail of a program subroutine to count an actual exposure time which is executed in the course of the flowchart shown in FIG. 29.

The memory mode will now be considered. As mentioned previously, the memory mode may be used during the direct, automatic mode and the spotwise photometry, automatic mode. Initially considering the direct, automatic, memory mode, in the mode determining program of FIG. 28, after making an exit from the decision block of I13=1 to see if the power supply of the electronic flash is turned on, a decision is made to determine the level at the input port I6 which is used to detect the memory mode. When the memory switch SW6 is closed to select the memory mode, input port I6 is set equal to "1". Hence an exit is made through YES from this decision block, followed by a decision block to see if (M10)=1. The memory hold detecting flag M10 is set equal to "1" in the memory set condition while it is equal to "0" if the memory hold is established. Assuming that the memory set condition prevails, (M10)=1. Hence, an area M21 which stores the Apex value of an actual exposure period is initialized to "0", followed by the display of the segment "MEMO" (see FIG. 57). Then follows a determination of the memory mode detecting flag M11. The flag M11 represents an area which stores a mode constant representing the photographing mode during the memory mode, namely, the direct, automatic mode or the spotwise, automatic memory mode. Since the constant C26 is stored in the flag M11 during the program for the normal automatic mode, (M11)≠C21 and (M11)≠C20. C21 represents a constant representing the average photometry, direct automatic mode and C20 a constant representing the spotwise photometry, automatic mode. Accordingly, the program proceeds to a level decision of the input port I2. Since I2=0 during the average photometry, direct automatic memory mode, an exit is made through ②-② to branch to a program for the average photometry, direct automatic mode shown in FIG. 29. In this program, the constant C21 representing the average photometry, direct automatic mode is stored in the mode detecting flag M12. A program portion which is common to the description of the average photometry, direct automatic mode will not be described, limiting the description to an operation which is inherent to the memory mode. In the memory set condition, there is no difference from the operation of the average photometry, direct automatic mode until the shutter release, except that the segment "MEMO" is displayed. Assuming that the shutter release has taken place, an exit is made through YES from the decision block of I10=1, and through YES from the decision block of I6=1, followed by a decision to see if (M10)=0. Since the memory set condition is assumed, an exit is made through NO from the decision block of (M10)=0, followed by a decision to see if I11=0 to determine whether the trigger is open. If the trigger is open, an exit is made through YES from the decision block of I11=0, proceeding to a counting of an actual exposure period. In this instance, the exposure control is based on the average direct photometry. The counting of the actual exposure period is performed by executing a subroutine to count the actual exposure period which is shown in FIG. 42. This subroutine will now be described. The technique to count the actual exposure period has previously been described in connection with FIG. 26, but to reiterate, the actual exposure period is counted by doubling the pulse period every time twelve count pulses have been counted. This leads to the consequence that the final count itself represents an equivalent Apex value having the significance of 1/12 Ev for LSB. In this subroutine, a constant C60 is initially stored in a storage area M32 which is assigned to store the period of a reference pulse, and a storage area M30 which is assigned to store the count of reference pulses is initialized to "0". The period of reference pulses (M32) is then stored in an area M31. The content (M31) of the area M31 is then sequentially decremented by one while returning it to the area M31 until (M31)=0 is reached. When the content of the area M31 becomes equal to "0", an exit is made through YES from the decision block of (M31)=0, followed by incrementing by one the Apex value stored in the area M21 and the count of reference pulses stored in the area M30. The level detection of the input port I12 to which the exposure terminate signal is supplied is then made. I12=1, if the exposure process has not been terminated, and then an exit is made through NO from a decision block of I12=0, followed by a decision to see if (M30)=12. This decision block determines if twelve pulses have been counted. If the count is less than twelve, the operation returns to storing the period of reference pulses (M32) in the area M31 again. This looping operation is repeated twelve times until (M30)=12, whereupon the period of reference pulses (M32) is changed to twice its previous value, followed by resetting the count storage area M30 to "0". The program then returns to storing the period of reference pulses (M32) in the area M31 again. The described program is repeated until the exposure process based on the direct photometry is terminated. Upon termination of the exposure process, an exit is made through YES from the decision block of I12=0, going to RETURN which then returns to the program shown in FIG. 29. In this manner, the equivalent Apex value of the exposure period is stored in the area M21. In order to indicate that memory hold of the actual exposure period which is to be used during a photographing operation in the average photometry, direct automatic mode is established, "0" is stored in the memory hold detecting flag M10, followed by the execution of the interval instruction, then making an exit through ①-① to return to the mode determining program shown in FIG. 28.

During the subsequent first pass through the program which occurs in the memory hold condition, an exit is made through YES from the decision block of I6=1 in FIG. 28, followed by the decision block of (M10)=0, in the same manner as in the memory set condition. Since (M10)=0 in the memory hold condition, an exit is made through YES from this decision block, storing the content (M12) of the mode detecting flag M12 in the memory hold detecting flag M11. Because the flag M12 now stores the constant C21 representing the average photometry, direct automatic mode, the constant C21 is preset into the flag M11. Then "1" is delivered to the output port 09, thus turning the shutter control signal S16 to its "H" level. Then follows a decision block to determine if (M11)=C21. Since the flag M11 stores the constant C21 as mentioned previously, an exit is made through YES, branching to the program for the average photometry, direct automatic mode shown in FIG. 29, through ⑦-⑦, where the initial step is to transfer the content of the mode detecting flag M12 to the mode detecting flag M13. Since (M10)=0 in the memory hold condition, an exit is made through YES from the decision block of (M10)=0, followed by storing Sv−Av value (SV−AV) in the area M19 and storing Cv value CV in the area M20. Then a decision is made to see if (M2)=0. If Cv value is entered and (M2)≠0, the segment "±" is displayed while the display of the segment "±" is erased otherwise. Then an exit is made through YES from the decision block of (M10)=0, and a difference between the Sv−Av value (M1) which is entered at the time the memory set is established and the Sv−Av value (M19) which is entered at the time the memory hold is established is determined, and is stored in the area M19. A difference between the Cv value (M2) which is entered at the time the memory is established and the Cv value (M20) entered at the time the memory hold is established is then determined, and is stored in the area M20. An exposure period to be used in the direct photometry, automatic memory mode is then calculated according to the formula (M21)+(M19)+4(M20)+C40, and is stored in the storage area M8. As mentioned previously, (M21) represents the Apex value corresponding to the actual exposure period based on the direct photometry. As will be seen, this includes Bv value, Sv−Av value and Cv value, and hence the formula (M21)+(M19)+4(M20)+C40 produces the same exposure level as when taking a picture in the direct photometry mode during the memory set condition if a diaphragm aperture or film speed is varied. The addition of the term 4(M20) allows a correction to be applied during the memory hold for the reason mentioned previously. A Tv value to enable the display of a bar representation is calculated according to the formula ½{(M0)+(M1)}+(M2)+C2 where the term (M0) represents the average Bv value immediately before the shutter release during the memory set condition. It remains unchanged so long as the memory hold is established. The subroutine f{(M3)} is then executed to convert the value (M3) into corresponding bar displaying data, which is then displayed. In this instance, the entire bar representation flashes (see FIG. 58). An interval instruction is then executed. This interval instruction is required specially for the memory set condition. Specifically, the level at the input port I10 the "1" level in response to the release signal SO applied in synchronism with the shutter release. But in actuality, an arrangement is made so that I10=1 during the transient time when the movable reflecting mirror 31 is moving upward. Inasmuch as the photometry for the purpose of display is based on light reflected from the mirror, if the average Bv value (MO) obtained is for such transient time, it follows that display data during the memory hold disagrees with the actual exposure period which is to be used during the memory hold. Consequently, it must be assured that the Bv value which is retained immediately before the shutter release be that value which is obtained immediately before the upward movement of the mirror. The program used may be summarized as a repetition of the entry of the average Bv value, the decision to see if the release has taken place, and the storage of average Bv value data. The above problem can be solved by increasing the time interval required from the entry of the average Bv value to the decision of the shutter release beyond the time required for the level at the input port I10 to assume its "1" level since the initiation of the upward movement of the mirror 31. The interval instruction is executed to this end. If the release has not taken place in the average photometry, direct automatic memory mode, an exit is made through YES from the decision block of I10=1, followed by the level determination of the input port I6. Since I6=1 in the memory mode, an exit is made therefrom through YES to enter the decision to see if (M10)=0. Since the memory hold is established, an exit is made through YES from this decision block, followed by presetting the content (M8) of the area M8, which is assigned to store an exposure period, into the timer counter. The manner of presetting the timer counter has been mentioned previously. The subsequent program portion has been described previously, and therefore will not be repeated herein.

The spotwise, automatic memory mode will now be considered. The spotwise photometry, automatic mode inherently utilizes the storage of result of the photometry, and the exposure control is based on a photometric value which is entered by a manual operation. Hence, in principle, it is all that is required during the spotwise photometry, automatic memory mode that the entry of any new or fresh photometric value be inhibited. Initially, considering the memory set condition, there is no difference over the spotwise photometry, automatic mode except that the segment "MEMO" is displayed. The display of the segment "MEMO" takes place in a manner similar to the direct automatic memory mode, and hence will not be described. The memory mode detecting flag M11 stores the constant C20 representing the spotwise, automatic mode, and hence, in the mode determining program shown in FIG. 28, an exit is made through YES from the decision block of (M11)=C20, thus branching through ⑤-⑤ to the program for the spotwise, automatic mode without entry of spotwise data which is shown in FIG. 31. Thus, the entry of spotwise data is ignored in the spotwise, automatic memory mode. No detection is made for the selection of the highlight or the shadow mode. Specifically, in the program of FIG. 32, an exit is made through YES from the decision block of (M10)=0, thus bypassing the decisions of I4=1 and I5=1. In addition, the bar representation is displayed in flashing form. In all other respects, the operation is similar to that occurring during the spotwise photometry, automatic mode. The display of bar representations will be inclusively described in detail later.

Figure 39:
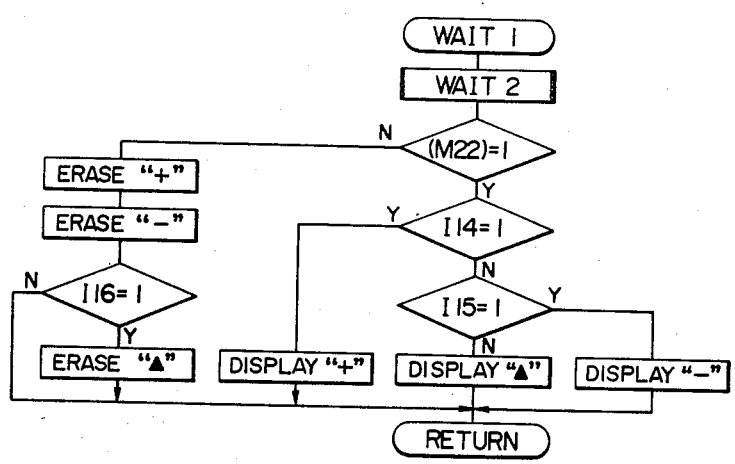
FIG. 39 is a flowchart showing the detail of a program subroutine WAIT1 which is executed in the course of the flowchart shown in FIG. 33.

The operation which occurs when the power supply of the electronic flash is turned on when the camera is in its automatic mode will now be considered. As the power supply is turned on, the flash power on signal S14 assumes its "H" level, whereby the input port I13 changes to "1". Accordingly, in the mode determining program of FIG. 28, an exit is made through YES from the decision block of I13=1, thus branching through ⑧-⑧ to the program for the flash automatic mode shown in FIG. 33. In this program, positive pulses are initially delivered to the output ports 00 to 03, thus resetting corresponding flipflops in the interface. "1" is then transferred to the memory hold detecting flag M10, thus resetting it, followed by storing a constant C30 representing the flash automatic mode in the mode detecting flag M12. Then follow decisions to see if (M13)=C22 and if (M13)=(M12), thus determining whether it is now immediately after the power on and whether it is now immediately after the mode changing. If it is determined that it is now immediately after the power on or the mode changing, the display is reset (see FIG. 68). When resetting the display, the segment "AUTO", the fixed point index and the segment "60" representing a synchronized timing are displayed. The purpose is to display a deviation of the photometric value from the synchronized timing of 1/60 second, in the point form on the row of segments which are used to display a bar representation. Subsequently, the average Bv value BV1 is stored in the storage area M0, the Sv−Av value (SV−AV) is stored in the storage area M1, and the Cv value CV is stored in the storage area M2, respectively. Then follows the decision of (M2)=0. If there is a correction, the segment "±" is displayed while the display of the segment "±" is erased if there is no correction. A deviation of photometric value with respect to the synchronized timing of 1/60 second is determined according to the formula $\frac{1}{4}\{(M0)+(M1)\}+(M2)+C100$, and is stored in a storage area M4 which is assigned to store a point displaying data. A subroutine g{(M4)} is executed to convert data (M4) into display data, which is then displayed in the point form on the row of segments which are used to display a bar representation (see FIG. 68). It is to be noted that the subroutine g{(M4)} acts to restrict data which is located outside the range of data which can be displayed to limit values, and may be considered as equivalent to the subroutine f{(M3)}, in which the limit values C40 and C41 are different. Accordingly, a detailed flowchart for the subroutine g{(M4)} will not be shown and described. A constant C35 representing the period of flashing the display is stored in an associated storage area M23. The constant C35 determines the period of flashing the display of an underexposure, an overexposure or a proper exposure, which occurs subsequent to a photographing operation in the flash automatic mode. The operation transfers to a program for a subroutine WAIT1 (see FIG. 39), the execution of which is initiated. Referring to FIG. 39, the operation begins with a subroutine WAIT2 in which an interval corresponding to the constant C35 is created. The flashing display flag M22 is then inverted, then returning to the subroutine WAIT1. Then follows a decision to see if the flag M22 is equal to "1". If (M22)=1, the level determination for displaying an overexposure, an underexposure or a proper exposure as well as a display program are executed. Initially, a decision is made to see if the input port I14 is equal to "1". If it is, it means the occurrence of an overexposure, so that the segment "+" is displayed (see FIG. 70), thereafter going to RETURN. If I14≠1, a decision follows to see if the input port I15 is equal to "1". If I15=1, this means an underexposure, so that the segment "−" is displayed (see FIG. 71), thereafter going to RETURN. If I15≠1, this means a proper exposure, and hence the segment "▲" is displayed, thereafter going to RETURN. During the next pass through the program, the sign of the flag M22 is inverted in the subroutine WAIT2, or (M22)=−1, thus erasing the display of the segments "−" and "+". If I16=1, the display of the segment "▲" is erased, thereafter going to RETURN. Since the input ports I14, I15 and I16 assume "1" level for a time interval of about two seconds after the emission of flashlight from the electronic flash, the segment "−", "+" or "▲" is displayed in flashing form, respectively, to indicate an underexposure, an overexposure or a proper exposure. At the other times, the segment "▲" is continuously displayed. Subsequent to the execution of the subroutine WAIT1, the operation returns to the program shown in FIG. 33 where a decision is initially made to see if I10=1, determining whether the shutter release has taken place. If the release has not taken place, an exit is made through ①-① to return directly to the mode determining program shown in FIG. 28. If the release has taken place, the program returns to the mode determining program shown in FIG. 28 through ①-①, in response to a decision I11=0, since the shutter and the electronic flash are controlled by means of hardware.

Figure 34:
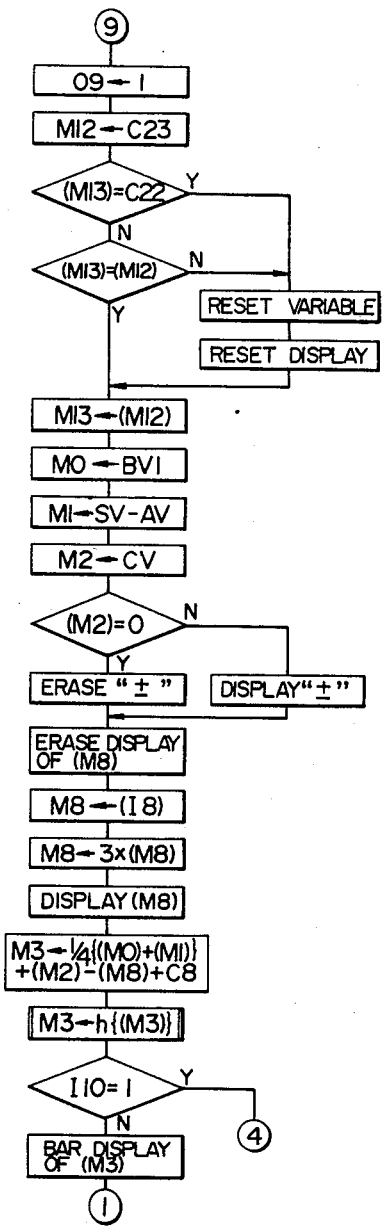
FIG. 34 is a flowchart showing the detail of a program used during a normal manual photographing mode, which forms part of the flowchart shown in FIG. 27C.

The manual mode will now be considered. When the mode changing knob 21 is turned into alignment with the index "MANUAL" to select the manual mode, the manual switch SW3 is closed, turning the input port I1 to "1". Hence, in the mode determining program of FIG. 28, an exit is made through NO from the decision block of I0=1, and through YES from the decision block of I1=1, followed by a decision to see if I13=1. Assuming that the power supply of the electronic flash is not turned on, I13=0, thus making an exit through NO from the decision block of I13=1, and entering the level decision of the input port I2 which is used to detect the spotwise mode. Assuming that the spotwise mode is not selected, but that the normal manual mode is selected, it follows that I2=0. Accordingly, the program makes its exit through ⑨-⑨ and branches to a flowchart for the normal manual mode which is shown in FIG. 34. Here, "1" is delivered initially to the output port 09. This energizes the electromagnet MG1 which constrains the second blind of the shutter from running, thus constraining the second blind. A constant C23 representing the normal manual mode is then stored in the mode detecting flag M12. Decisions of (M13)=C22 and (M13)=(M12) then follow, thus determining if it is now immediately after the power on or the mode changing. If it is immediately after the power on or the mode changing, a resetting of variables and the display is performed. In the resetting of variable, the address of a start point for a bar display is preset in an associated storage area M14. In the resetting of the display, the segment "MANU" and the fixed point index (including the segments "+" and "−") are displayed (see FIG. 61). Then follows a transfer of the content (M12) of the flag M12 to the mode detecting flag M13. Average Bv value BV1, Sv−Av value (SV−AV) and Cv value CV are then stored in the areas M0, M1 and M2, respectively. A decision to see if (M2)=0 then follows. If there is a correction, the segment "±" is displayed (see FIG. 62) while the display of the segment "±" is erased if there is no correction. The display of the manual exposure period (M8) is then cleared. It should be understood that this clearing may take place immediately before updating the display of the manual exposure period (M8), as will be described later. A manual exposure period which is entered into the area M8 in binary code is then inputted. Since the manual exposure period has its LSB which has the significance of 1 Ev, the content (M8) is tripled or multiplied by a factor of three and then stored in the area M8 again so that LSB has the significance of ⅓ Ev for purpose of display which is to follow. The manual exposure period (M8) is then displayed. FIG. 61 shows a manual exposure period which is chosen to be equal to 1/60 second. In this manner, there is a one-to-one correspondence between the address of memory areas in DRAM85 corresponding to the segments "1" to "2000", which are used to display exposure periods, and the manual exposure period. Then a calculation is made according to the formula $\frac{1}{4}\{(M0)+(M1)\}+(M2)-(M8)+C8$ in order to obtain a bar displaying data for a deviation with respect to a standard exposure level (which is shown as an exposure period of 1/60 second in FIG. 61), and the result is stored in the area M3. In this formula, (M0) represents the average Bv value, (M1) Sv−Av value, (M2) Cv value, (M8) the manual exposure period and C8 a constant. A subroutine $h\{(M3)\}$ is then executed to convert the value (M3) into corresponding display data. The subroutine $h\{(M3)\}$ acts to limit a deviation with respect to the standard exposure level within the range of data which can be displayed, whenever such deviation goes beyond such range. This subroutine may be considered as equivalent to the subroutine $f\{(M3)\}$ in which the limit values C40 and C41 are changed. Accordingly, a detailed flowchart for the subroutine $h\{(M3)\}$ is not shown and described herein. The subroutine $h\{(M3)\}$ operates to fix the data (M3) to an upper limit value if the deviation (M3) with respect to the standard exposure level exceeds such upper limit, and fixes the data (M3) to a lower limit value if the deviation is less than such lower limit. In this manner, it is assured that a bar representation is displayed in a range which is located between the segments "+" and "−" shown in FIG. 61. Then follows a decision to see if I10=1, thus determining whether the shutter release has taken place. If the release has not taken place, the deviation (M3) is displayed in the bar form, followed by making an exit through ①-① to return to the mode determining program shown in FIG. 28. On the contrary, if the shutter release has taken place, an exit is made through ④-④ to enter the exposure control program shown in FIG. 29. In this program, the timer counter is initially preset with a value which is the manual exposure period stored in the area M8. In this instance, the variable Z appearing in the equation (3) is equal to "0", and the timer counter is preset by a calculation which is similar to that used in the exposure control in the spotwise photometry, automatic mode. The subsequent program portion remains the same as in the spotwise photometry, automatic mode, and hence will not be described.

Figure 35:
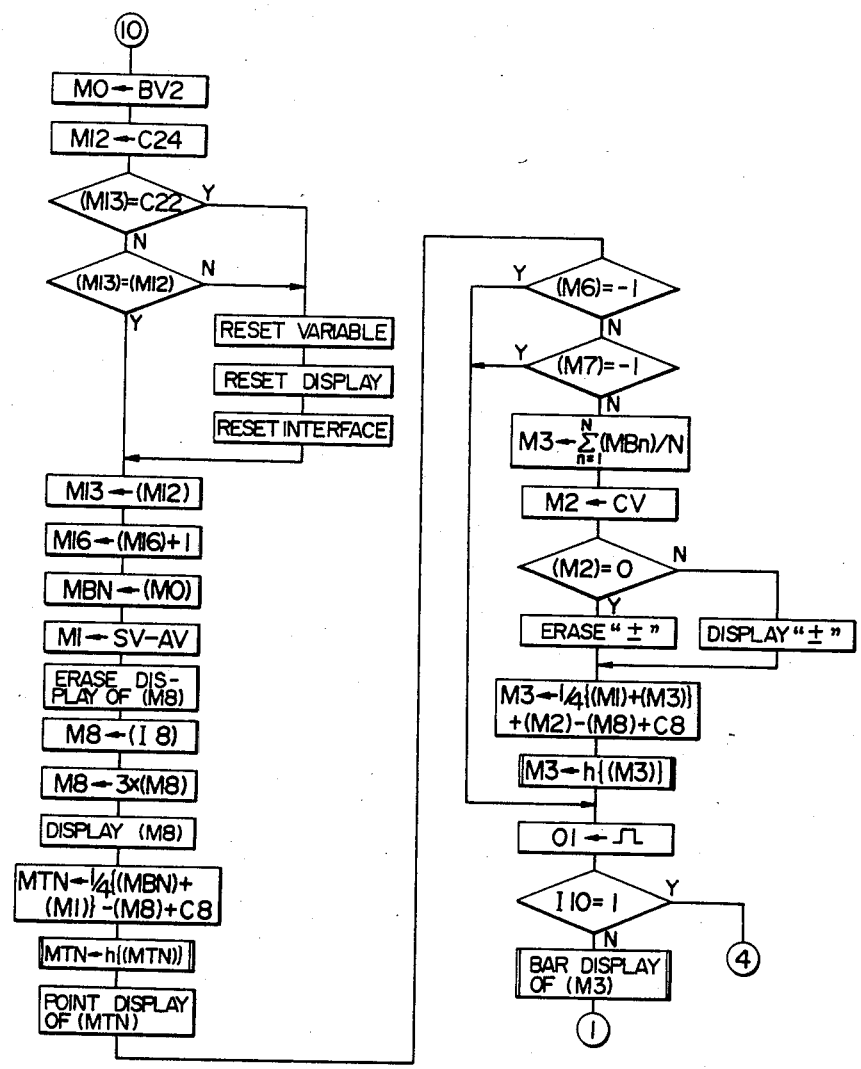
FIG. 35 is a flowchart, contained as part of the flowchart shown in FIG. 27C and used when there is a spotwise photometric input during the spotwise photometry, manual photographing mode.

The entry of spotwise data in the manual mode will now be described. When the spotwise entry switch SW8 is turned on during the manual mode, the spotwise mode detecting input port I2 assumes its "1" level. Consequently, in the mode determining program of FIG. 28, an exit is made through YES from the decision block of I2=1, from which a branch through ⑨ has taken place during the normal manual mode, and then follows a decision to see if (M13)=C20. If (M13)=C20, this means that the immediately preceding photographing mode was the spotwise photometry, automatic mode. In this instance, positive pulses are delivered to the output ports 00, 01, thus resetting the flipflop (G7, G9) which is used to detect the spotwise mode and the flipflop (G11, G12) which is used to detect the entry of the spotwise data. The purpose of this is, as mentioned in connection with the spotwise, automatic mode, to prevent the spotwise, manual mode from being established in the event of selecting the manual mode directly from the spotwise, automatic mode. Thus, during a change in the basic photographing mode between the automatic and the manual mode, an arrangement is made to assure that the simple automatic mode or the manual mode is selected, thus preventing the spotwise mode from being established after the change. After applying the positive pulses to the output ports 00, 01, an exit is made through ①-① to return to the initial portion of the mode determining program. In this manner, the determination of the photographing mode is again tried. On the other hand, if the immediately preceding photographing mode was not the spotwise, manual mode, an exit is made through NO from the decision block of (M13)=C20, followed by a level decision of the input port I3. When the spotwise entry switch SW8 is closed, the spotwise, manual mode is selected while simultaneously setting the flipflop (G11, G12) which detects such entry. Accordingly, I3=1, making an exit through ⑩-⑩ to branch to a program for the spotwise, manual mode with spotwise entry which is shown in FIG. 35. In this program, the spotwise Bv value BV2 is initially stored in the storage area M0, followed by the storage of the constant C24 representing the spotwise, manual mode in the mode detecting flag M12. Then follow decisions to see if (M13)=C22 and (M13)=(M12), determining if it is now immediately after the power on or the mode changing. If the answer is in the affirmative, there occurs a resetting of variables, the display and the interface. Initially, when resetting the display, "1" is stored in the overlap detecting flag M5, the highlight entry detecting flag M6 and the shadow entry detecting flag M7, respectively. The address of a starting segment for the bar representation to be displayed is then stored in the storage area M14. The storage area M16 which is assigned to store the number of spotwise entry data is reset by storing "0" therein. Subsequently, indices "MANU" and "SPOT" and the fixed point index, inclusive of the indices "+" and "−", are displayed (see FIG. 63). When resetting the interface, positive pulses are delivered to the output ports 02 and 03, thus resetting the flipflops (G15, G16) and (G19, G21) which are assigned to detect the selection of the highlight and the shadow mode, respectively.

The content (M12) of the mode detecting flag M12 is then transferred into the mode detecting flag M13. This establishes (M13)=(M12) during a subsequent pass through the same program, thus omitting the resetting of the variables, the display and the interface. The content of the storage area M16 which stores the number of spotwise entry data is incremented by one, followed by storing the spotwise Bv value (M0) and the Sv−Av value (SV−AV) in the register MBN and the area M1, respectively. It is to be noted that the character "N" in the designation MBN of the register represents the number of times that the spotwise mode is selected or the content of the area M16, and is equal to "1" for the first selection of the spotwise mode. Accordingly, spotwise Bv values from a plurality of spotwise entries are stored in different registers, respectively. The display of the manually established period (M8) is then cleared, and exposure period data which is manually established at the input port I8 is then stored in the area M8. This manual exposure period (M8) is then multiplied by a factor of three to convert its weight, whereupon it is stored in the area M8 again. The content of the area M8 is then displayed. In FIG. 63, the manual exposure period is shown as chosen to be equal to 1/125. A deviation with respect to the standard exposure period (which is equal to an exposure period of 1/125 second in FIG. 63) is calculated according to the formula $\frac{1}{4}\{(MBN)+(M1)\}-(M8)+C8$, and is stored in the register MTN. The character "N" in the designation MTN of the register again represents the number of times the spotwise mode is selected, in the similar manner as "N" in the register designation MBN. A subroutine h{(MTN)} is then executed to convert the deviation (MTN) into display data, which is then displayed in the point form (FIG. 63).

Then follows a display of an arithmetic mean of spotwise entry data in the form of a bar representation. If either the highlight or the shadow mode is selected or (M6)=−1 or (M7)=−1, the arithmetic mean is not calculated, but instead the program jumps directly to the resetting of the spotwise entry (01←⎍). Since neither the highlight nor the shadow mode is selected or (M6)=1 and (M7)=1, the arithmetic mean $$\sum_{n=1}^{N} (MBn)/N$$

of spotwise Bv value (MBn) (for n=1 to N) that had been entered is calculated, and is stored in the area M3. The Cv value CV is then stored in the area M2, and the segment "±" is displayed if (M2)≠0 (see FIG. 65), or the display of the segment "±" is erased if (M2)=0. A deviation of an exposure level, which is determined according to the arithmetic mean (M3), with respect to the standard exposure level is calculated according to the formula ½{(M1)+(M3)}+(M2)−(M8)+C8, and is stored in the area M3. The subroutine h{(M3)} is then executed to convert the calculated value (M3) into bar displaying data. A positive pulse is then delivered to the output port 01 to reset the flipflop (G11, G12) which detects the spotwise entry, thus resetting the spotwise mode. Then follows a decision block of I10=1 to determine if the shutter release has taken place. If the release has not taken place, the deviation (M3) is displayed in the bar form (see FIG. 64), and then an exit is made through ①-① to return to the mode determining program shown in FIG. 28. If the release has taken place, an exit is made through ④-④ to branch to the exposure control program shown in FIG. 29. In this program, the manual exposure period (M8) is preset in the timer counter, and the exposure control takes place on the basis of this value. Subsequently, the program which has been mentioned previously is executed, and an exit is made through ①-① to return to the mode determining program shown in FIG. 28.

Figure 36:
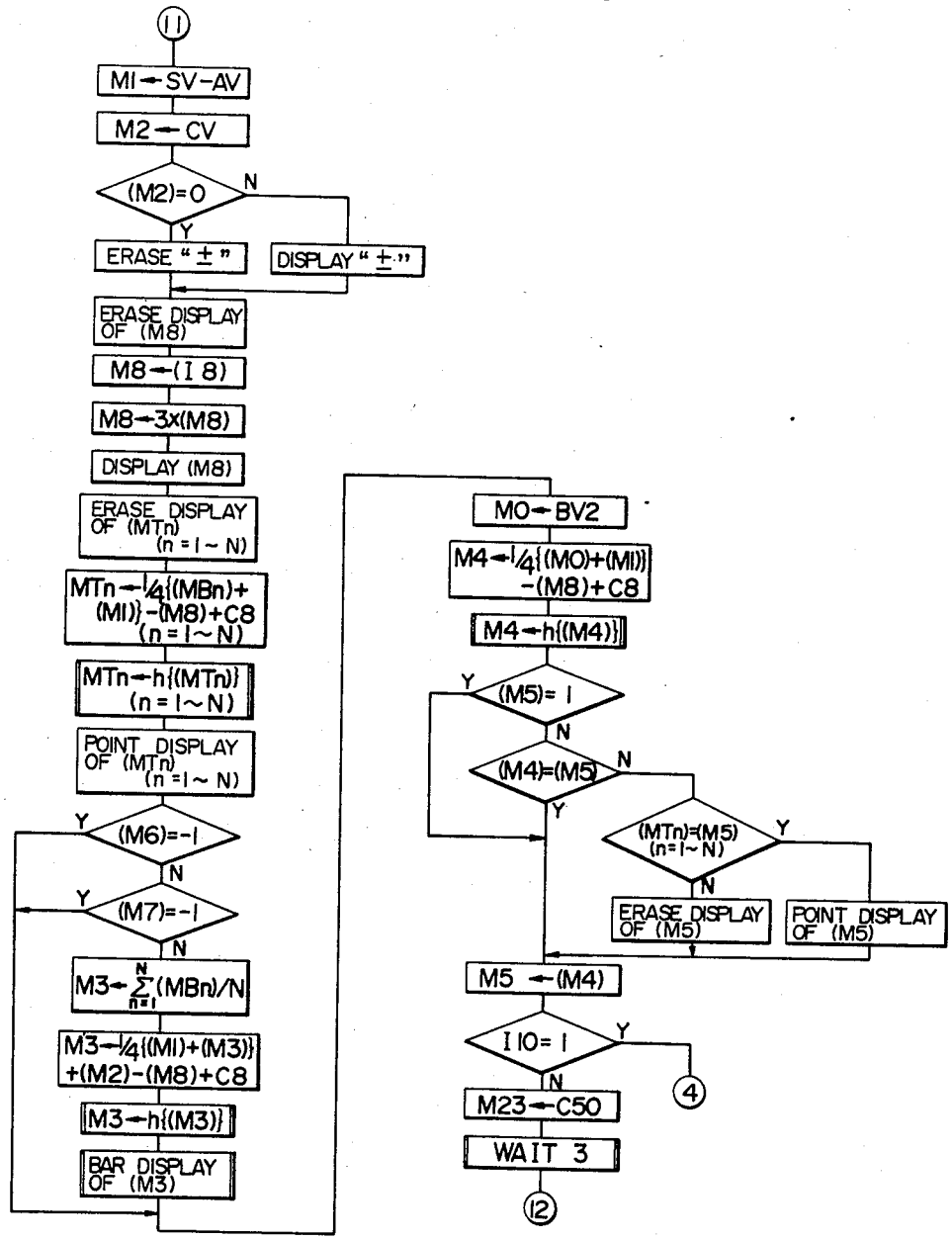
FIG. 36 is a flowchart, contained as part of the flowchart shown in FIG. 27C and used when there is no spotwise photometric input during the spotwise photometry, manual photographing mode.

During a second and subsequent pass through the program after the spotwise mode has been selected, assuming that the spotwise mode has not been reset and there is no entry of spotwise data, it follows that I2=1 and I3=0. Therefore, in the mode determining program of FIG. 28, an exit is made through YES from the decision block of I2=1 and through NO from the decision block of I3=1, and an exit is made through ⑪-⑪ to branch to the program for the spotwise, manual mode without entry of spotwise data which is shown in FIG. 36. In this program, the Sv−Av value (SV−AV) and the Cv value (CV) are stored in the areas M1 and M2, respectively, followed by a decision to see if (M2)=0. If there is a correction, the segment "±" is displayed while the display of the segment "±" is erased if there is no correction. The display of the manual exposure period (M8) is then erased. Subsequently, a manual exposure period data (I8) is stored in the area M8, the content of which is multiplied by a factor of three for storage in the area M8 again. The manual exposure period (M8) is then displayed (see FIG. 63). To change the display of spotwise entry points which are associated with a change in the Sv−Av values, the display of spotwise entry points (MTn) (for n=1 to N) are once entirely erased. A deviation of respective spotwise Bv values (MBn) (for n=1 to N) with respect to the standard exposure level is then calculated according to the formula ½{(MBn)+(M1)}−(M8)+C8 (for n=1 to N), and is stored in a register MTn (for n=1 to N), respectively. The subroutine h{(MTn)} is then executed for each deviation (MTn) (for n=1 to N) to convert it into display data, which is then again stored in the registers MTn (for n=1 to N). Subsequently, each deviation is displayed in the point form in accordance with the individual display data (MTn). Thus, the point display is modified so that a constant exposure level is maintained. Then follows decision blocks to see if (M6)=−1 and (M7)=−1, determining if the highlight or the shadow mode is selected. If neither of these modes is selected, the program jumps to a later point in the program where spotwise Bv values are entered (M0←BV2). If neither the highlight nor the shadow mode is selected, then a program portion is entered in which a deviation of an arithmetic mean of spotwise Bv values with respect to the standard exposure level including the Cv value is displayed in the bar form. First, an arithmetic mean $$\sum_{n=1}^{N} (MBn)/N$$

of spotwise Bv values (MBn) (for n=1 to N) is calculated and stored in the area M3. A deviation of the arithmetic mean with respect to the standard exposure level is then calculated according to the formula ½{(M1)+(M3)}+(M2)−(M8)+C8, and is stored in the area M3. The subroutine h{(M3)} is then executed to convert the deviation (M3) into display data, which is then displayed in the bar form.

The spotwise Bv value BV2 is then stored in the area M0. This takes place automatically without any operation for the spotwise entry. This represents the Bv value which is used to display a deviation of the current photometric point in the point form. Subsequently, the Sv−Av value (M1) which is previously entered, the manual exposure period data (M8) and the constant C8 are used to effect a calculation according to the formula ½{(M0)+(M1)}−(M8)+C8, the result of which is stored in the area M4. The subroutine h{(M4)} is then executed to convert the deviation (M4) into display data. A program portion is then executed which detects an overlap between the point display of the deviation of the current photometric point and the point display of the deviation for the spotwise entry. This is necessary since a common row of segments are used for the two point display, and if the deviation of the current photometric point is being changed and overlaps with the deviation for the spotwise entry, it must be left, and if no overlap occurs, it must be erased. Initially, a decision is made to see if (M5)=1. If the overlap detecting flag M5 is equal to "1", this means that this is the first pass through the program after changing the photographing mode to the spotwise mode, so that there is no display of the deviation for the current photometric point and hence there can be no overlap. Therefore, the program directly jumps to the step of transferring the point displaying data (M4) to the flag M5, thus storing data (M4) therein. Thus, during a second and subsequent pass through the program, the flag M5 stores display data for a deviation of the current photometric point which has been determined during the previous pass. Accordingly, during a second and subsequent pass through the program, an exit is made through NO from the decision block of (M5)=1, followed by the decision to see if (M4)=(M5). If the answer is in the affirmative, there is no change in the deviation of the current photometric point, and hence the program directly proceeds to the step of transferring data (M4) to the flag M5. However, if (M4)≠(M5), there is a change in the deviation of the current photometric point, and hence a decision is sequentially made to see if display data (M5) which is being currently displayed is equal to one of point displaying data (MTn) (for n=1 to N) for deviations corresponding spotwise entry. If there is any one such that (MTn)=(M5), data (M5) is displayed in the point form while if there is none, the display of data (M5) in the point form is cleared. Subsequently, a deviation (M4) for a fresh current photometric point is transferred to the flag M5. A decision to see if I10=1 then follows, determining whether or not the shutter release has taken place. If the shutter has not been released, the deviation (M5) for the current photometric point is displayed in a flashing point form. To this end, a constant C50 representing the period of display flashing is transferred to an associated storage area M23, followed by the execution of a subroutine WAIT3 shown in FIG. 41. The program of the subroutine WAIT3 and the purpose of the flashing operation have been previously described in detail in connection with the spotwise, automatic mode, and therefore will not be repeated here. On the other hand, if the shutter release has not taken place, an exit is made through ④-④, jumping to the exposure control program shown in FIG. 29. After the execution of this program, an exit is made through ①-① to return to the mode determining program shown in FIG. 28.

Figure 37:
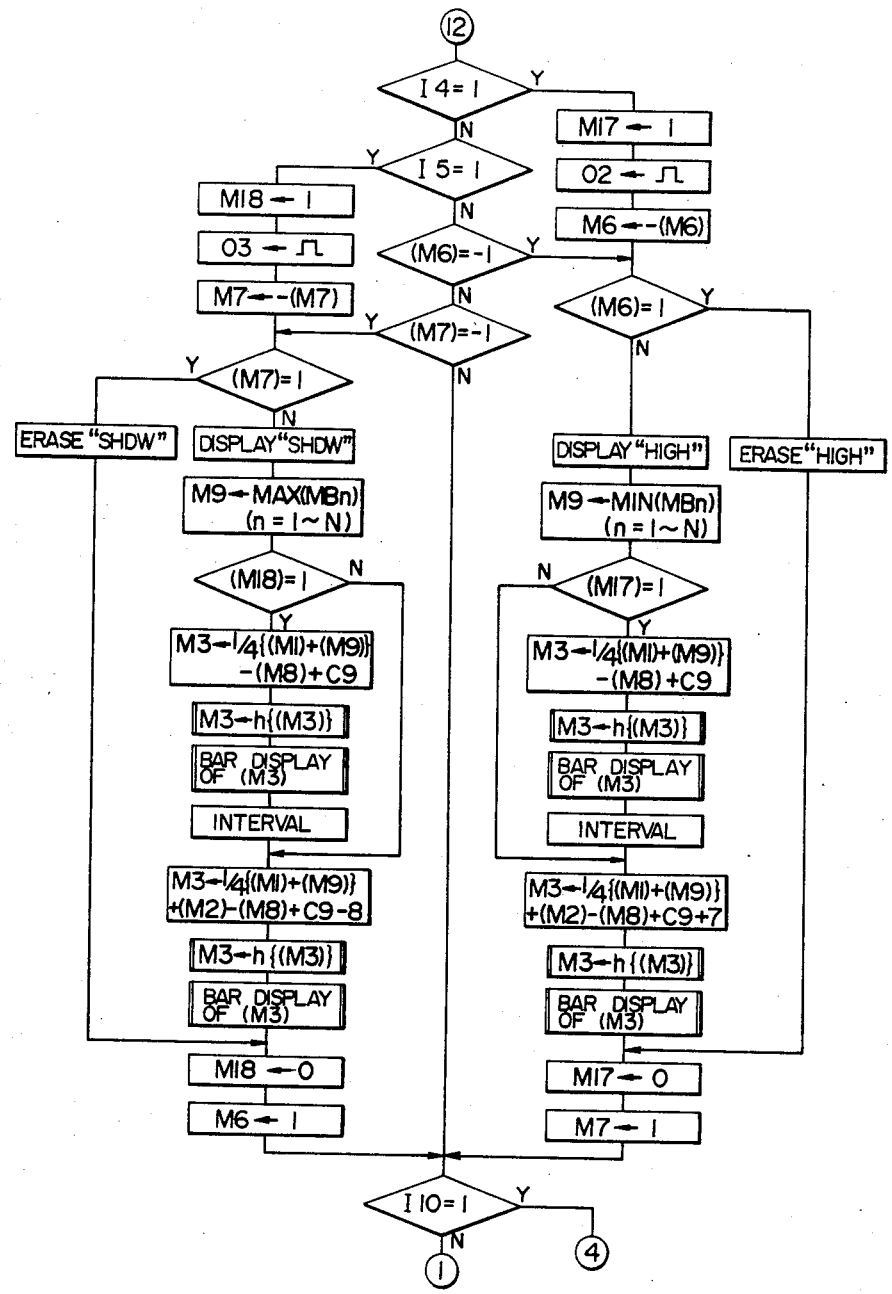
FIG. 37 is a flowchart showing the detail of a program for a highlight referenced photographing mode and a shadow referenced photographing mode, which is executed in succession to the flowchart shown in FIG. 36 which is used when there is no spotwise photometric input during the spotwise photometry, manual photographing mode.

When the execution of the subroutine WAIT3 is completed, the program makes an exit through ⑫-⑫, thus moving to the flowchart for the highlight or the shadow mode shown in FIG. 37. In this flowchart, a decision is initially made to see if I4=1, thus determining whether or not the highlight mode is selected. Assuming that the highlight mode is not selected, it follows that I4=0, and hence an exit is made through NO from this decision block. A decision to see if I5=1 then follows, determining whether or not the selection of the shadow mode has been made. Assuming that the shadow mode is not selected, it follows that I5=0, and thus an exit is made through NO from this decision block, proceeding to a succeeding decision to see if the highlight selection detecting flag M6 is equal to "−1". If (M6)≠−1, a decision then follows which determines whether the shadow selection detecting flag M7 is equal to "−1". If the highlight of the shadow mode is selected, either the input port I4 or I5 is set to "1", but is reset to "0" during the first pass through the program for the highlight or the shadow mode. Accordingly, the selection of the highlight or the shadow mode is stored and saved in an internal flag which is the highlight selection detecting flag M6 and the shadow selection detecting flag M7. Accordingly, a decision of the flags M6 and M7 is then made. If neither the highlight nor the shadow mode is selected, it follows that (M6)=1 and (M7)=1, bypassing program portions for the highlight and the shadow mode, and directly jump to a decision to see if I10=1, thus determining whether or not the shutter release has taken place. If the release has not taken place, I10=0, and accordingly an exit is made through ①-① to return to the mode determining program shown in FIG. 28. If the release has taken place, I10=1, and hence an exit is made through ④-④ to branch to the exposure control program shown in FIG. 29. Then, the manual exposure period data (M8) is preset in the timer counter, the content of which exercises the exposure control. Upon termination of the exposure process, an exit is made through ①-① to return to the mode determining program shown in FIG. 28.

When the highlight mode is selected during the spotwise, manual mode, it may be assumed that the program has proceeded to a point which is shown at ⑫ in FIG. 37 after the point display of the deviation for the current photometric point is completed. A decision to see if I4=1 determines the level at the input port I4. Assuming that this is the first pass through the program after the selection of the highlight mode, it follows that I4=1. Accordingly, an exit is made through YES from this decision block, storing "1" in the flag M17 which is used to detect that it is now immediately after the selection of the highlight mode and which is thus set to "1". A positive pulse is then delivered to the output port O2, resetting the highlight mode detecting flipflop (G15, G16). Then follows an inversion of the sign of the detecting flag M6. After closing the shadow switch SW10 or after closing the highlight switch SW9 an odd number of times, the flag M6 becomes equal to "−1", and hence an exit is made through NO from the decision block of (M6)=1, followed by displaying the segment "HIGH". If the highlight switch SW9 is closed an even number of times, the flag M6 becomes equal to "1", and an exit is made through YES from the decision block of (M6)=1, followed by erasing the display of the segment "HIGH". After such erasure, the program jumps to a resetting of the flag M7 (M17←0), which will be described later. It is assumed that the highlight switch SW9 has been closed an odd number of times, and the segment "HIGH" is displayed. Then follows the determination of a maximum brightness MIN (MBn) of spotwise values (MBn) (for n=1 to N), and such value is stored in the storage area M9. A decision to see if (M17)=1 then follows, determining whether or not this is the first pass through the program after the selection of the highlight mode. If (M17)=1, this indicates the first pass through the program, so that a deviation with respect to the standard exposure level corresponding to the maximum brightness MIN (MBn) is displayed in the bar form, in a manner similar to that mentioned above in connection with the spotwise, automatic mode. Specifically, a deviation with respect to the standard exposure level corresponding to MIN (MBn) is calculated according to the formula ½{(M1)+(M9)}−(M8)+C9, and the result of calculation is stored in the area M3. The subroutine h{(M3)} is executed to convert the deviation (M3) into bar displaying data, which is then displayed. An interval instruction is then executed, and thereafter a deviation with respect to a standard exposure level which is equivalent to the maximum brightness MIN (MBn) less 2⅓ Ev is calculated according to the formula ½{(M1)+(M9)}+(M2)−(M8)+C9+7, and the result of calculation is stored in the area M3. In this formula, the numeral "7" represents a figure corresponding to 2⅓ Ev. The subroutine h{(M3)} is then executed to convert the deviation (M3) into display data, which is then displayed in the bar form (see FIG.

66). Then follows a resetting of the flag M17, which detects that it is now immediately after the selection of the highlight mode, to "0". The flag M7, which detects the selection of the shadow mode, is then reset to "1". A decision to see if I10=1 then follows, thus determining whether or not the release has taken place. If the release has not taken place, an exit is made through ①-① to return to the mode determining program shown in FIG. 28. If the release has taken place, an exit is made through ④-④ to branch to the exposure control program shown in FIG. 29. After completion of the exposure control program, an exit is made through ①-① to return to the mode determining program shown in FIG. 28. During a second and subsequent pass through the program in the highlight mode, an exit is made through NO from the decision block of I4=1 since I4=1. After the decision of (M6)=−1, a program portion is entered in which the segment "HIGH" is displayed. In response to the decision of (M17)=1, the display in the bar form of a deviation with respect to the standard exposure level corresponding to the maximum brightness MIN (MBn) is not performed, while only the step of displaying a deviation with respect to the standard exposure level corresponding to the maximum brightness MIN (MBn) less 2⅜ Ev in the bar form is performed.

For describing the operation when the shadow mode is selected during the spotwise, manual mode, it may be assumed that the program has proceeded to a point as shown at 12 in FIG. 37 and an exit is made through NO from the decision block of I4=1, and a decision to see if I5=1 determines whether or not the shadow mode is selected. Assuming that this is the first pass through the program after the selection of the shadow mode, it follows that I5=1. Accordingly, an exit is made through YES, followed by storing "1" in the flag M18 which detects that it is now immediately after the selection of the shadow mode. A positive pulse is then delivered to the output port O3, resetting the flipflop (G19, G21) which detects the selection of the shadow mode, followed by inverting the sign of the flag M7. After closing the highlight switch SW9 or after closing the shadow switch SW10 an odd number of times without closing the highlight switch, the flag M7 becomes equal to "−1", and hence an exit is made through NO from the decision block of (M7)=1, followed by displaying the segment "SHDW" (see FIG. 67). If the shadow switch SW10 is closed an even number of times, the flag M7 becomes equal to "1", and an exit is made through YES from the decision block of (M7)=1, followed by the erasure of the segment "SHDW". After such erasure, the program jumps to the step of resetting the flag M18 (M18←0). It is assumed that the shadow switch SW10 has been closed an odd number of times, and the segment "SHDW" is displayed. Subsequently, the minimum brightness MAX (MBn) of spotwise values (MBn) (for n=1 to N) is then determined, and a deviation with respect to a standard exposure level corresponding to the minimum brightness MAX (MBn) is displayed in the bar form, in a manner similar to that used in the highlight mode. Also, a deviation with respect to a standard exposure level corresponding to the minimum brightness MAX (MBn) plus 2⅜ Ev is displayed in the bar form. During a second and subsequent pass through the program in the shadow mode, it is established that I5=0. Accordingly, a program portion is entered in which the segment "SHDW" is displayed in response to the decision of (M7)=−1. In response to the decision of (M18)=1, the step of displaying, in the bar form, of a deviation with respect to the standard exposure level corresponding to the minimum brightness MAX (MBn) is omitted, but only the step of displaying, in the bar form, of a deviation with respect to the standard exposure level corresponding to the minimum brightness MAX (MBn) plus 2⅜ Ev is performed.

Summarizing a flow of program for the highlight or the shadow mode during the spotwise, manual mode, it will be seen that in the initial selection of the mode, the highlight mode is selected if the highlight command button 15 is depressed an odd number of times in succession while the shadow mode is selected if the shadow mode command button 16 is depressed an odd number of times in succession. The depression of either button an even number of times resets such mode. During the first pass through the program after the selection of the highlight mode, a deviation with respect to a standard exposure level corresponding to the maximum brightness of spotwise values is once displayed in the bar form, followed by displaying, in the bar form, of a deviation with respect to a standard exposure level which corresponds to the maximum brightness minus 2⅜ Ev. During a second and subsequent pass through the program, a display is made in the bar form of only a deviation with respect to the standard exposure level which corresponds to the maximum brightness minus 2⅜ Ev. During the first pass through the program in the shadow mode, a deviation with respect to a standard exposure level corresponding to the minimum brightness of spotwise values is displayed in the bar form, followed by displaying in the bar form of a deviation with respect to a standard exposure level which corresponds to the minimum brightness plus 2⅜ Ev. During a second and subsequent pass through the program, a bar display is made of only a deviation with respect to the standard exposure level corresponding to the minimum brightness plus 2⅜ Ev. When the execution of the program for either the highlight or the shadow mode is completed, a decision is then made to see if the shutter release has taken place. If the release has not taken place, the operation returns to the mode determining program. If the release has taken place, the manual exposure period (M8) is preset in the timer counter, the content of which effects an exposure control, followed by returning to the mode determining program.

Figure 38:
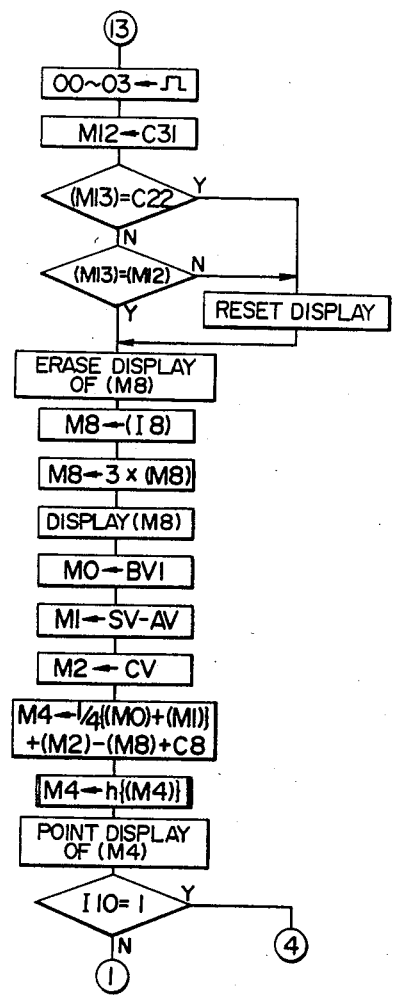
FIG. 38 is a flowchart, contained as part of the flowchart shown in FIG. 27A and showing the detail of a program for an electronic flash activated, manual photographing mode.

A program for a photographing operation with the aid of an electronic flash in the manual mode will now be described. When the electronic flash is mounted on the camera and the power supply of the flash is turned on in the manual mode, the input port I13 assumes its "1" level. In the mode determining program of FIG. 28, an exit is made through YES from the decision block of I13=1, and an exit is made through ⑬-⑬ to a program for the flash manual mode which is shown in FIG. 38. In this program, positive pulses are initially delivered to the output ports O0 to O3, thus resetting the flipflops (G7, G9; G11, G12; G15, G16; and G19, G21), which detect the spotwise mode, the entry of spotwise data, the selection of the highlight mode and the selection of the shadow mode, respectively. A constant C31 representing the flash manual mode is then stored in the mode detecting flag M12. Decisions to see if (M13)=C22 and (M13)=(M12) then follow, thus determining whether or not it is now immediately after the power on or the mode changing. If the answer is in the affirmative, the display is reset. During the resetting of the display, the segment "MANU" and the fixed point indices except the segment "+" and "−" are displayed, as shown in FIG. 73. The display of the lightning symbol " " takes place by the activation of light emitting diode D1 to indicate the completion of a charging operation within the electronic flash, as mentioned previously in connection with the electrical circuit. If it is not now immediately after the power on or the mode changing, the resetting of the display does not take place, but instead the display of the manual exposure period (M8) is erased. Then a manual exposure period data (I8) is inputted to the area M8. Data (M8) is then multiplied by a factor of three, and the result is again stored in the area M8. The manual exposure period data (M8) is then displayed. FIG. 73 shows that the manual exposure period is chosen to be 1/30 second. The average Bv value BV1, the Sv−Av value (SV−AV) and the Cv value CV are then inputted to the areas M0, M1 and M2, respectively. A deviation with respect to the standard exposure level is then calculated according to the formula $\frac{1}{2}\{(M0)+(M1)\}+(M2)-(M8)+C8$, and is stored in the area M4. The subroutine h{(M4)} is then executed to convert the deviation (M4) into bar displaying data, which is then displayed in the point form on the row of segments which are used to display a bar representation (see FIG. 73). A decision to see if I10=1 then follows, thus determining if the shutter release has taken place. If the release has not taken place, an exit is made through ①-① to return to the mode determining program shown in FIG. 28. If the release has taken place, an exit is made through ④-④, thus branching to the exposure control program shown in FIG. 28, in which the exposure control is performed in accordance with the manual exposure period (M8), followed by returning to the mode determining program.

A program for the off mode will now be described. Since neither the automatic mode nor the manual mode is selected during the off mode, it follows that I0≠1 and I1≠1. Accordingly, in the mode determining program of FIG. 28, an exit is made through NO from each of the decision blocks I0=1 and I1=1. Accordingly, the display is entirely erased, followed by storing the constant C22, representing the off mode, in the mode detecting flag M12. The memory hold detecting flag M10 is then reset to "1", and positive pulses are delivered to the output ports O0 to O3, thus resetting the flipflops (G7, G9; G11, G12; G15, G16; and G19, G21), which detects the spotwise mode, the entry of spotwise data, the selection of the highlight mode and the selection of the shadow mode, respectively. Subsequently, an exit is made through ①-① to return to the beginning of the mode determining program, thus repeating the loop. It is to be noted that a control over the shutter is entirely performed by an electrical circuit or by means of a hardware.

Figure 44:
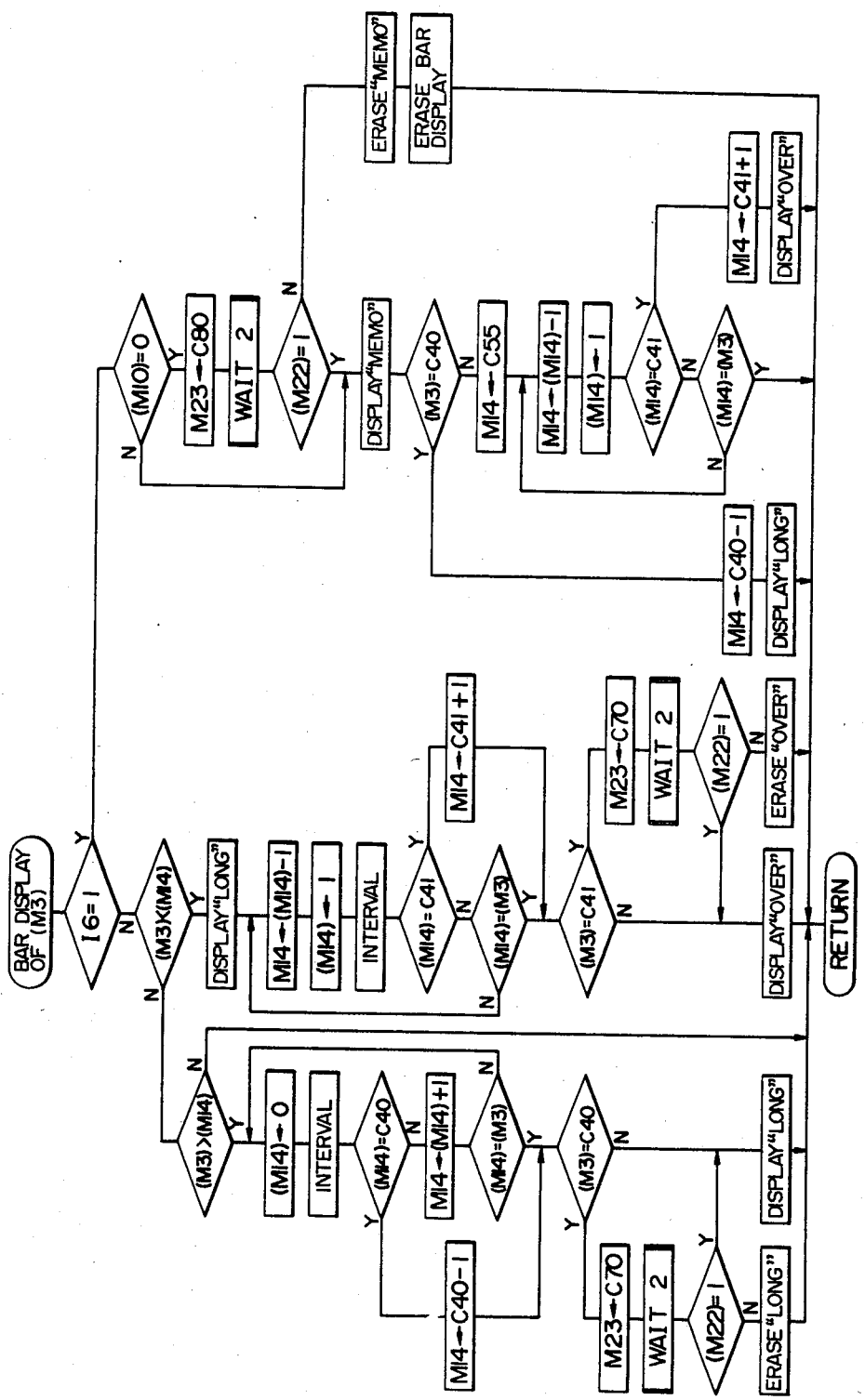
FIG. 44 is a flowchart showing the detail of a program subroutine to display a bar which is executed in the course of the flowcharts shown in FIGS. 28 to 38.

FIG. 44 shows a program for several subroutines which are used to display bar representations. In this program, a decision of the level at the input port I6 is initially made. I6=1 if the memory mode is selected. Then follows a decision to see if M10=0. In the memory mode, (M10)=1 represents the memory set while (M10)=0 represents the memory hold. Assuming that it is now in a memory set condition, the segment "MEMO" is then displayed. Then follows a decision to see if (M3)=C40, thus determining whether the display data (M3) represents an underexposure. If the answer is in the affirmative, a starting address (C40−1) is stored in the storage area M14 which is assigned to store the starting address to display a bar representation. After displaying the segment "LONG", the operation goes to RETURN. If (M3)≠C40, indicating that the data does not represent an underexposure, a constant C55 is stored in the storage area M14, the constant C55 being by one greater than the address of the starting point of the bar representation. Assuming that the segment "OVER" has an address X, the address of memory areas in DRAM85 which correspond to the row of segments used to display a bar representation and the segments "OVER" and "LONG" are arranged such that the left-most segment has an address (X+1), and the address is sequentially incremented by one as the area moves to the right. Consequently, the right-most segment has an address (X+34), and the segment "LONG" has an address (X+35). The address of memory areas in DRAM85 which correspond to the row of segments used to provide a point display is similarly arranged. Thus, representing the address of a segment which is aligned with the segment "OVER" by Y, the address of such area is sequentially incremented by one as the area moves to the right. Accordingly, the address of a memory area in DRAM85 for a segment which is aligned with the right-most segment "LONG" has an address (Y+35). After the storage of the constant C55 in the area M14, one is subtracted from the address (M14), and the result is again stored in the area M14. Then "1" is stored in a memory area located at the address (M14) in DRAM85. This enables a particular segment, forming a bar representation, which corresponds to the area located at the address (M14) in DRAM85 to be activated. A decision to see if (M14)=C41 then follows, determining whether or not the address (M14) represents the address of an area in DRAM85 which corresponds to the segment "OVER". If (M14)≠C41, a decision to see if (M14)=(M3) then follows, determining whether or not the display of the bar representation has been completed. If the display has been completed, the operation goes to RETURN. On the other hand, if the display has not been completed, the program returns to the loop of subtracting or decrementing the address [M14←(M14)−1], thus activating the next segment which corresponds to the address (M14). On the other hand, if (M14)=C41, this means that the bar representation has been displayed to the left-most segment. Accordingly, a number comprising the constant C41 added with 1 is stored in the area M14, followed by displaying the segment "OVER" and then going to RETURN. Summarizing the described flow of the program, it will be seen that the bar representation is displayed by sequentially activating selected segments up to a point which is represented by the segment corresponding to the bar displaying data (M3). Since this program is executed in a moment, it appears that the entire bar representation is displayed at once to the human eyes.

Figure 40:
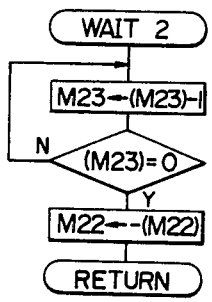
FIG. 40 is a flowchart showing the detail of a program subroutine WAIT2 which is executed in the course of the subroutine WAIT1 shown in FIG. 39, a subroutine WAIT3 shown in FIG. 41 and a bar display subroutine shown in FIG. 44 which will be described later.
Figure 41:
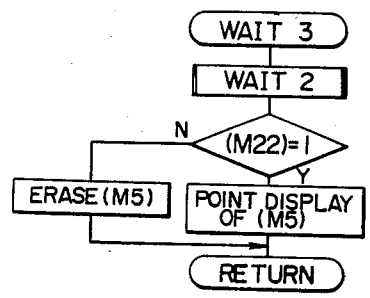
FIG. 41 is a flowchart showing the detail of the program subroutine WAIT3 which is executed in the course of the flowcharts shown in FIGS. 31 and 36.

In the event the memory hold is established, an exit is made through YES from the decision block of M10=0, followed by storing a constant C80 representing the period of flashing display in an associated storage area M23. The subroutine WAIT2 shown in FIG. 40 is then executed to produce a given delay time while inverting the flashing display flag M22 simultaneously. Subsequently, a decision to see if (M22)=1 determines whether it represents the period for activation or the period for deactivation. If it represents the period for activation, a program portion in which the segment "MEMO" is displayed is executed. If it represents the period for deactivation, the segment "MEMO" and the entire bar representation are erased instantaneously, thereafter going to RETURN. During a next pass through the program for the bar displaying subroutine, the inversion of the sign of the flag M22 causes the segment "MEMO" and the bar representation to be activated or to be erased if they are previously erased or activated, respectively. By repeating this loop, the segment "MEMO" and the entire bar representation are displayed in a flashing manner with a period which is determined by the constant C80 during the memory hold.

On the other hand, during a mode other than the memory mode, it follows that I6=0. Accordingly, an exit is made through NO from the decision block of I6=1, followed by a decision to see if (M3)<(M14), thus determining if the data (M3) which is to be displayed is or is not less than the data (M14) which has previously been displayed. Assuming that this is the first pass through the program after the mode changing, the address of a memory area in DRAM85 corresponding to the starting segment of the bar representation to be displayed is stored in the area M14 during the initialization. It therefore normally follows that (M3)<(M14), and thus the segment "LONG" is then displayed. "1" is then subtracted from the address (M14), and the result of subtraction is again stored in the area M14. Subsequently, "1" is stored in a memory area in DRAM85 having the address (M14), whereby the right-most segment in the row of segments used to display the bar representation is activated. An interval instruction is then executed, followed by a decision to see if (M14)=C41, thus determining whether or not the segment "OVER" has been displayed after the bar representation is displayed to its left-most segment. It is to be noted that the constant C41 represents the address of a memory area in DRAM85 which corresponds to the segment "OVER". If (M14)≠C41, a decision to see if (M14)=(M3) follows, determining whether or not the display of the bar representation has been completed. If (M14)≠(M3), "1" is again substracted from the address (M14), and the result is again stored in the area M14. Thereafrer, the operation is repeated through this loop until (M14)=C41 is found, which indicates that the segment "OVER" has been displayed. Consequently, the address (C41+1) of a memory area in DRAM85 which corresponds to the starting segment of a bar representation which is to be displayed next is stored in the area M14. It should be understood that the bar representation now extends to its left-most segment. In the event of occurrence of (M14)=(M4) when (M14)≠C41, this means that the display of the bar representation is completed, and in this instance the succeeding program portion is followed. Summarizing the manner of displaying a bar representation, it will be noted that when a bar representation is displayed for the first time after the mode changing, the bar representation starts from the right-most segment and extends to a given point, one segment by one segment. As mentioned previously, the interval instruction is executed in order to produce a time interval during which the movement or extension of the bar representation can be recognized. During a subsequent display of a bar representation, the bar representation begins its movement from the end of the previous bar representation. Subsequently, a decision to see if (M3)=C41 determines whether or not the display data (M3) represents an overexposure. If the answer is in the affirmative, the following program portion is executed in order to produce a flashing display of the segment "OVER". Initially, the constant C70 representing the flashing period is stored in the storage area M23, followed by the execution of the subrouting WAIT2 shown in FIG. 40 to produce a given delay time, and the inversion of the sign of the flashing display flag M22. The content of the flag M22 is then determined. If (M22)=1, the segment "OVER" is displayed, and if (M22)≠1, the display of the segment "OVER" is cleared. Since the sign of the flag M22 is inverted for each pass through the program, it follows that the display of the segment "OVER" flashes. In the event that (M3)≠C41, the segment "OVER" is continuously displayed. Subsequent to the display or erasure of the segment "OVER", the program goes to RETURN.

A flow of the program when the answer to the decision block of (M3)<(M14) is in the negative will now be described. In this instance, a decision to see if (M3)>(M14) determines whether or not the data (M3) to be displayed is greater than the data (M14) which has previously been displayed. If the answer is in the negative, this means that the data to be displayed remains the same as the previous data, whereby the operation goes to RETURN. If (M3)>(M14), "0" is initially stored in a memory area in DRAM85 which has the address (M14), thus erasing the segment located at the end of the bar representation. The interval instruction is then executed and thereafter a decision to see if (M14)=C40 is made, thus determining whether or not the bar representation has been erased to its right-most segment. If (M14)=C40, the address (C40−1) of a memory area in DRAM85 which corresponds to the starting segment of the bar representation to be displayed next is stored in the area M14, thereafter entering a program at a later point. On the contrary, if (M14)≠C40, one is added to the address (M14), and the result is stored in the area M14, thus updating the address (M14). A decision to see if (M14)=(M3) then determines whether or not the end of the bar representation displayed has reached a position corresponding to the data (M3). If (M14)≠(M3), "0" is stored in a memory area in DRAM85 which has the address (M14), thus repeating the described loop. The execution of the interval instruction produces a given delay time, and the segments which define a bar representation are sequentially erased, beginning from the left-hand end, at a visually recognizable rate, thus achieving the display of a given bar representation. In the decision block of (M3)=C40 which follows, it is determined whether the display data (M3) represents an underexposure. If it represents an underexposure, the segment "LONG" is displayed in a flashing manner while otherwise the segment "LONG" is displayed continuously. This program portion is similar to that mentioned above in connection with the overexposure, and therefore will not be described in detail. Summarizing the manner of displaying a bar representation, the address of a memory area in DRAM85 which corresponds to the segment located at the end of the bar representation to be displayed is stored in the area (M14), and unless the mode changing occurs, the bar representation moves from this end. On the other hand, immediately after the mode changing, the area M14 is initialized, and the bar representation starts from its right-most segment.

What is claimed is:

1. A camera including selection means which permits a selection among a plurality of photographing modes which may include an automatic mode, a manual mode, an average photometry mode and a spotwise photometry mode; comprising:

a photographing information display located within the viewfinder of the camera and including fixed photographing indicia and a plurality of display elements which are arranged in linear succession;

means for activating those display elements of the display which begins at a display region located at one end of the display and extends to another location in the display corresponding to one of said indicia for representing photographing information, thereby displaying photographing information in a bar-like form;

and means responsive to a mode changing operation by said selection means for indicating such mode changing, once devativting all of said display elements and subsequently activating those display elements which begin from the display region located at one end of the display to a further location in said display corresponding to photographing information which is to be used in the new photographing mode.

2. A camera including selection means which permits a selection among a plurality of photographing modes including an automatic mode, a manual mode, an average photometry mode and a spotwise photometry mode; comprising:

a photographing information display located within a finder of the camera and including a plurality of diplay elements which are arranged in linear succession, means for activating those display elements of the display which begins at a display region located at one end of the display and extends to another location in the display corresponding to photographing information, thereby displaying photographing information in a bar-like form;

means responsive to a mode changing operation by said selection means for indicating such mode changing, by one deactivating all of said display elements and subsequently activating those display elements which begin from the display region located at one end of the display to a further location in said display corresponding to photographing information which is to be used in the new photographing mode;

spotwise photometric means being energized responsive to selection of the spotwise photometry mode to permit a photographing operation in the spotwise photometry mode;

means for calculating a brightness value responsive to said spotwise photometric means;

exposure correction means for providing a correction of an exposure factor;

said display including means for displaying the brightness values obtained without any correction and for displaying an exposure factor incorporating the correction generated by the exposure correction means;

average photometric means being energized responsive to selection of the average photometry mode to permit a photographing operation in the average photometry mode; and means for automatically changing the photographing mode from the spotwise mode to the average mode in response to completion of a photographing operation in the spotwise ode.

* * * * *